(12) United States Patent
Anderson et al.

(10) Patent No.: US 10,876,521 B2
(45) Date of Patent: Dec. 29, 2020

(54) MULTI-THERMAL STORAGE UNIT SYSTEMS, FLUID FLOW CONTROL DEVICES, AND LOW PRESSURE SOLAR RECEIVERS FOR SOLAR POWER SYSTEMS, AND RELATED COMPONENTS AND USES THEREOF

(71) Applicant: 247Solar Inc., Great Falls, VA (US)

(72) Inventors: Bruce N. Anderson, Great Falls, VA (US); William Dean Treece, La Mesa, CA (US)

(73) Assignee: 247Solar Inc., Great Falls, VA (US)

( * ) Notice: Subject to any disclaimer, the term of this patent is extended or adjusted under 35 U.S.C. 154(b) by 1093 days.

(21) Appl. No.: 14/387,052

(22) PCT Filed: Mar. 14, 2013

(86) PCT No.: PCT/US2013/031627
§ 371 (c)(1),
(2) Date: Sep. 22, 2014

(87) PCT Pub. No.: WO2013/142275
PCT Pub. Date: Sep. 26, 2013

(65) Prior Publication Data
US 2015/0033740 A1 Feb. 5, 2015

Related U.S. Application Data

(60) Provisional application No. 61/613,947, filed on Mar. 21, 2012, provisional application No. 61/613,948, (Continued)

(51) Int. Cl.
*F03G 6/06* (2006.01)
*F24J 2/05* (2006.01)
(Continued)

(52) U.S. Cl.
CPC .............. *F03G 6/06* (2013.01); *F03G 6/065* (2013.01); *F03G 6/067* (2013.01); *F24S 10/40* (2018.05);
(Continued)

(58) Field of Classification Search
CPC ... F03G 6/06; F24S 20/20; F24S 10/40; F24S 10/70; F28D 20/00
(Continued)

(56) References Cited

U.S. PATENT DOCUMENTS 246,626 A * 9/1881 Morse ..................... F24S 70/60
126/628
608,755 A 8/1898 Cottle
(Continued)

FOREIGN PATENT DOCUMENTS

CN 1161741 A 10/1997
CN 1821679 A 8/2006
(Continued)

OTHER PUBLICATIONS

Office Communication for Australian Application No. 2013235508 dated Feb. 14, 2017 and claims pending.
(Continued)

*Primary Examiner* — Jason Lau
(74) *Attorney, Agent, or Firm* — Wolf, Greenfield & Sacks, P.C.

(57) ABSTRACT

Inventive concentrated solar power systems using solar receivers, and related devices and methods, are generally described.

10 Claims, 33 Drawing Sheets

Related U.S. Application Data filed on Mar. 21, 2012, provisional application No. 61/613,954, filed on Mar. 21, 2012, provisional application No. 61/613,950, filed on Mar. 21, 2012.

(51) Int. Cl.

| | | |
|---|---|---|
| *F24J 2/24* | (2006.01) | |
| *F24J 2/07* | (2006.01) | |
| *F24S 10/40* | (2018.01) | |
| *F24S 20/20* | (2018.01) | |
| *F24S 10/70* | (2018.01) | |
| *F28D 20/00* | (2006.01) | |
| *F24S 80/50* | (2018.01) | |
| *F24S 60/00* | (2018.01) | |

(52) U.S. Cl.
CPC .............. *F24S 10/70* (2018.05); *F24S 20/20* (2018.05); *F24S 60/00* (2018.05); *F24S 80/50* (2018.05); *F28D 20/00* (2013.01); *F24S 2080/501* (2018.05); *Y02E 10/40* (2013.01); *Y02E 10/46* (2013.01); *Y02E 60/14* (2013.01); *Y02E 60/30* (2013.01); *Y02E 70/30* (2013.01)

(58) Field of Classification Search
USPC ........ 359/228, 354–359, 644–646, 666–667, 359/726–732, 845, 846
See application file for complete search history.

(56) References Cited

U.S. PATENT DOCUMENTS

| | | |
|---|---|---|
| 2,680,565 A | 6/1954 | Lof |
| 2,692,760 A | 10/1954 | Flurschutz |
| 2,925,880 A | 2/1960 | Munters |
| 2,965,361 A | 12/1960 | Schwartz |
| 3,183,649 A | 5/1965 | Teller |
| 3,216,486 A | 11/1965 | Hall et al. |
| 3,216,487 A | 11/1965 | Gallagher |
| 3,369,541 A | 2/1968 | Thomason |
| 3,918,516 A | 11/1975 | Carrasse et al. |
| 3,918,517 A | 11/1975 | Silverstone et al. |
| 3,953,744 A | 4/1976 | Kawagoe |
| 3,970,524 A | 7/1976 | Funk |
| 3,981,151 A | 9/1976 | St Clair |
| 4,011,731 A | 3/1977 | Meckler |
| 4,024,910 A | 5/1977 | Werner |
| 4,033,325 A * | 7/1977 | Walker ................ F24J 2/30 126/638 |
| 4,057,102 A | 11/1977 | Guillot |
| 4,085,590 A | 4/1978 | Powell et al. |
| 4,085,729 A | 4/1978 | Schmidt |
| 4,117,682 A | 10/1978 | Smith |
| 4,121,564 A | 10/1978 | Schwartz |
| 4,123,003 A | 10/1978 | Winston |
| 4,135,489 A * | 1/1979 | Jarvinen ................ F24S 20/20 126/648 |
| 4,164,124 A | 8/1979 | Taylor et al. |
| 4,167,856 A | 9/1979 | Seidel et al. |
| 4,176,523 A | 12/1979 | Rousseau |
| 4,193,441 A | 3/1980 | Scaringe |
| 4,203,489 A | 5/1980 | Swiadek |
| 4,215,553 A | 8/1980 | Poirier et al. |
| 4,257,477 A | 3/1981 | Maloney |
| 4,259,836 A | 4/1981 | Finckh |
| 4,262,484 A | 4/1981 | Jubb et al. |
| 4,262,653 A | 4/1981 | Holland |
| 4,262,735 A | 4/1981 | Courrege et al. |
| 4,281,686 A | 8/1981 | Gerlitz |
| 4,304,585 A | 12/1981 | Oda et al. |
| 4,312,324 A | 1/1982 | Ross et al. |
| 4,318,393 A | 3/1982 | Goldstein |
| 4,347,892 A | 9/1982 | Clyne et al. |
| 4,360,977 A | 11/1982 | Frohbieter |
| 4,362,149 A | 12/1982 | Thomson |
| 4,373,512 A | 2/1983 | Hirt |
| 4,387,574 A | 6/1983 | Becker et al. |
| 4,394,859 A | 7/1983 | Drost |
| 4,401,103 A | 8/1983 | Thompson |
| 4,403,601 A | 9/1983 | Hunt |
| 4,405,010 A | 9/1983 | Schwartz |
| 4,433,551 A | 2/1984 | Dibrell |
| 4,446,698 A | 5/1984 | Benson |
| 4,449,573 A | 5/1984 | Pettersson et al. |
| 4,485,803 A | 12/1984 | Wiener |
| 4,489,774 A | 12/1984 | Ogawa et al. |
| 4,524,756 A | 6/1985 | Laverman |
| 4,546,758 A | 10/1985 | Ebernard |
| 4,581,897 A | 4/1986 | Sankrithi |
| 4,583,520 A | 4/1986 | Dietrich et al. |
| 4,589,938 A | 5/1986 | Drosdick |
| 4,602,614 A | 7/1986 | Percival et al. |
| 4,627,485 A | 12/1986 | Osborn |
| 4,727,930 A | 3/1988 | Bruckner et al. |
| 4,777,934 A | 10/1988 | De Laquil, III |
| 4,885,216 A | 12/1989 | Naik |
| 4,889,182 A | 12/1989 | Kosters |
| 4,901,787 A | 2/1990 | Zornes |
| 4,942,736 A | 7/1990 | Bronicki |
| 4,945,731 A | 8/1990 | Parker et al. |
| 4,947,825 A | 8/1990 | Moriarty |
| 4,953,627 A | 9/1990 | Ito et al. |
| 5,145,011 A | 9/1992 | Seike et al. |
| 5,178,785 A | 1/1993 | Dolan et al. |
| 5,182,912 A | 2/1993 | Parker et al. |
| 5,234,048 A | 8/1993 | Seike et al. |
| 5,241,824 A | 9/1993 | Parker et al. |
| 5,245,985 A | 9/1993 | Holland |
| 5,245,986 A | 9/1993 | Karni |
| 5,316,072 A | 5/1994 | Seike et al. |
| 5,323,764 A | 6/1994 | Karni et al. |
| 5,397,649 A | 3/1995 | Schienle et al. |
| 5,404,723 A | 4/1995 | Parker et al. |
| 5,417,052 A | 5/1995 | Bharathan et al. |
| 5,421,322 A | 6/1995 | Karni et al. |
| 5,444,972 A | 8/1995 | Moore |
| 5,448,889 A | 9/1995 | Bronicki |
| 5,483,950 A | 1/1996 | Keintzel et al. |
| 5,507,276 A | 4/1996 | Holland |
| 5,529,054 A | 6/1996 | Shoen |
| 5,577,551 A | 11/1996 | Kritzler et al. |
| 5,634,339 A | 6/1997 | Lewis et al. |
| 5,685,289 A | 11/1997 | Yogev |
| 5,796,892 A | 8/1998 | Karni et al. |
| 5,850,831 A | 12/1998 | Marko |
| 5,851,309 A | 12/1998 | Kousa |
| 5,862,800 A | 1/1999 | Marko |
| 5,873,250 A | 2/1999 | Lewis et al. |
| 5,876,250 A | 3/1999 | Deng |
| 5,894,838 A | 4/1999 | Yogev |
| 5,899,071 A | 5/1999 | Stone et al. |
| 5,931,158 A | 8/1999 | Buck |
| 5,947,114 A | 9/1999 | Kribus et al. |
| 5,979,438 A | 11/1999 | Nakamura |
| 5,979,439 A | 11/1999 | Hoffschmidt et al. |
| 5,997,292 A | 12/1999 | Tanaka et al. |
| 6,000,211 A | 12/1999 | Bellac et al. |
| 6,003,508 A | 12/1999 | Hoffschmidt et al. |
| 6,041,599 A | 3/2000 | Obermoser |
| 6,085,829 A | 7/2000 | Neuhaus et al. |
| 6,099,671 A | 8/2000 | Pearson et al. |
| 6,099,931 A | 8/2000 | Heller et al. |
| 6,188,820 B1 | 2/2001 | Yogev |
| 6,237,337 B1 | 5/2001 | Bronicki et al. |
| 6,321,539 B1 | 11/2001 | Bronicki et al. |
| 6,484,506 B1 | 11/2002 | Bellac et al. |
| 6,510,695 B1 | 1/2003 | Fisher |
| 6,516,794 B2 | 2/2003 | Karni et al. |
| 6,557,804 B1 | 5/2003 | Carroll |
| 6,648,063 B1 | 11/2003 | Andraka et al. |
| 6,668,555 B1 | 12/2003 | Moriarty |
| 6,681,557 B2 | 1/2004 | Wilson |
| 6,694,738 B2 | 2/2004 | Bronicki et al. |
| 6,701,711 B1 | 3/2004 | Litwin |

(56) References Cited

U.S. PATENT DOCUMENTS

| | | |
|---|---|---|
| 6,708,687 B2 | 3/2004 | Blackmon et al. |
| 6,735,946 B1 | 5/2004 | Otting et al. |
| 6,736,134 B2 | 5/2004 | Marko |
| 6,764,279 B2 | 7/2004 | Meshenky |
| 6,814,544 B2 | 11/2004 | Tsukamoto et al. |
| 6,832,485 B2 | 12/2004 | Sugarmen et al. |
| 6,838,485 B1 | 1/2005 | Quintero |
| 6,864,198 B2 | 3/2005 | Merkel |
| 6,886,339 B2 | 5/2005 | Carroll et al. |
| 6,899,097 B1 | 5/2005 | Mecham |
| 6,911,110 B2 | 6/2005 | Blackmon et al. |
| 6,929,056 B2 | 8/2005 | Meshenky et al. |
| 6,931,851 B2 | 8/2005 | Litwin |
| 6,941,759 B2 | 9/2005 | Bellac et al. |
| 6,957,536 B2 | 10/2005 | Litwin et al. |
| 6,968,991 B2 | 11/2005 | Renteria et al. |
| 6,979,911 B2 | 12/2005 | Otting et al. |
| 7,011,086 B2 | 3/2006 | Litwin |
| 7,024,857 B2 | 4/2006 | Karni et al. |
| 7,026,722 B1 | 4/2006 | Otting et al. |
| 7,028,481 B1 | 4/2006 | Morrow |
| 7,051,529 B2 | 5/2006 | Murphy et al. |
| 7,055,519 B2 | 6/2006 | Litwin |
| 7,084,518 B2 | 8/2006 | Otting et al. |
| 7,172,016 B2 | 2/2007 | Meshenky et al. |
| 7,191,597 B2 | 3/2007 | Goldman |
| 7,240,675 B2 | 7/2007 | Eickhoff |
| 7,263,992 B2 | 9/2007 | Zhang |
| 7,278,472 B2 | 10/2007 | Meshenky et al. |
| 7,294,316 B2 | 11/2007 | Harada et al. |
| 7,296,410 B2 | 11/2007 | Litwin |
| 7,299,633 B2 | 11/2007 | Murphy et al. |
| 7,325,401 B1 | 2/2008 | Kesseli et al. |
| 7,331,178 B2 | 2/2008 | Goldman |
| 7,555,891 B2 | 7/2009 | Muller et al. |
| 7,954,321 B2 | 6/2011 | Shinnar |
| 9,726,155 B2 | 8/2017 | Anderson et al. |
| 10,280,903 B2 | 5/2019 | Anderson et al. |
| 2002/0073712 A1 | 6/2002 | Kopko |
| 2002/0083946 A1 | 7/2002 | Karni et al. |
| 2003/0145596 A1 | 8/2003 | Noelscher |
| 2004/0083731 A1 | 5/2004 | Lasker |
| 2004/0112374 A1 | 6/2004 | Litwin |
| 2004/0139960 A1 | 7/2004 | Blackmon et al. |
| 2004/0139961 A1 | 7/2004 | Blackmon et al. |
| 2005/0150225 A1 | 7/2005 | Gwiazda et al. |
| 2006/0174866 A1 | 8/2006 | Zhang |
| 2006/0225729 A1 | 10/2006 | Litwin |
| 2007/0186921 A1 | 8/2007 | Swanepoel |
| 2008/0011290 A1 | 1/2008 | Goldman et al. |
| 2008/0066736 A1 | 3/2008 | Zhu |
| 2008/0072425 A1 | 3/2008 | Whittenberger et al. |
| 2008/0250788 A1 | 10/2008 | Nuel et al. |
| 2008/0276616 A1 | 11/2008 | Flynn et al. |
| 2008/0302314 A1 | 12/2008 | Gonzalez et al. |
| 2008/0308152 A1 | 12/2008 | Grip |
| 2009/0000762 A1 | 1/2009 | Wilson et al. |
| 2009/0107485 A1 | 4/2009 | Reznik et al. |
| 2009/0121495 A1 | 5/2009 | Mills |
| 2009/0133685 A1 | 5/2009 | Pham et al. |
| 2009/0173337 A1 | 7/2009 | Tamaura et al. |
| 2009/0217921 A1 | 9/2009 | Gilon et al. |
| 2009/0241938 A1 | 10/2009 | Arbogast et al. |
| 2009/0241939 A1 | 10/2009 | Heap et al. |
| 2009/0261592 A1 | 10/2009 | Kay |
| 2009/0322089 A1 | 12/2009 | Mills et al. |
| 2010/0034690 A1 | 2/2010 | Nishiyama et al. |
| 2010/0101621 A1 | 4/2010 | Xu |
| 2010/0126171 A1 | 5/2010 | Smith |
| 2010/0176602 A1 | 7/2010 | Shinnar |
| 2011/0277471 A1 | 11/2011 | Shinnar |
| 2011/0314813 A1 | 12/2011 | Cafri et al. |
| 2013/0257056 A1 | 10/2013 | Ma |
| 2013/0298557 A1 | 11/2013 | Treece et al. |
| 2019/0353146 A1 | 11/2019 | Anderson et al. |

FOREIGN PATENT DOCUMENTS

| | | |
|---|---|---|
| CN | 101413719 A | 4/2009 |
| CN | 2014-88319 U | 5/2010 |
| CN | 2014-88353 U | 5/2010 |
| CN | 101726116 A | 6/2010 |
| DE | 2401334 | 8/1974 |
| DE | 2939416 A | 4/1981 |
| DE | 2945969 | 5/1981 |
| DE | 3100090 A1 | 8/1982 |
| DE | 2948355 C | 1/1988 |
| DE | 10149806 A | 4/2003 |
| DE | 10208487 A | 9/2003 |
| DE | 102004026517 B3 | 10/2005 |
| DE | 102004031917 A1 | 1/2006 |
| EP | 0 151 045 | 8/1985 |
| EP | 0 552 732 A1 | 7/1993 |
| EP | 0 364 106 B | 11/1995 |
| EP | 0 960 598 | 12/1999 |
| EP | 1 610 073 | 12/2005 |
| FR | 2401334 A1 | 3/1979 |
| GB | 666889 | 2/1952 |
| GB | 917307 | 1/1963 |
| GB | 1255262 | 12/1971 |
| JP | 2009-191762 | 8/2009 |
| RU | 2253429 C1 | 6/2005 |
| WO | WO 83/00995 | 3/1983 |
| WO | WO 90/12989 A1 | 11/1990 |
| WO | WO 95/35469 A1 | 12/1995 |
| WO | WO 95/35470 A1 | 12/1995 |
| WO | WO 96/12918 A1 | 5/1996 |
| WO | WO 97/11321 | 3/1997 |
| WO | WO 01/61254 A1 | 8/2001 |
| WO | WO 01/096791 | 12/2001 |
| WO | WO 03/021160 | 3/2003 |
| WO | WO 03/021161 | 3/2003 |
| WO | WO 03/104629 A1 | 12/2003 |
| WO | WO 2004/023048 | 3/2004 |
| WO | WO 2005/011503 | 2/2005 |
| WO | WO 2005/071325 | 8/2005 |
| WO | WO 2005/077265 | 8/2005 |
| WO | WO 2006/030441 | 3/2006 |
| WO | WO 2006/061825 | 6/2006 |
| WO | WO 2008/069426 | 6/2008 |
| WO | WO 2008/118980 | 10/2008 |
| WO | WO 2008/153922 | 12/2008 |
| WO | WO 2008/154599 | 12/2008 |
| WO | WO 2009/015388 | 1/2009 |
| WO | WO 2009/027986 | 3/2009 |
| WO | WO 2009/048458 | 4/2009 |
| WO | WO 2009/048479 | 4/2009 |
| WO | WO 2009/101586 | 8/2009 |
| WO | WO 2009/121030 | 10/2009 |
| WO | WO 2009/121987 | 10/2009 |
| WO | WO 2010/004545 | 1/2010 |
| WO | WO 2011/000045 A1 | 1/2011 |
| WO | WO 2013/124899 A1 | 8/2013 |

OTHER PUBLICATIONS

Office Communication for Australian Application No. 2013235508 dated Dec. 21, 2017 and claims pending.

Office Communication for Chinese Application No. 201380026864.4 dated Aug. 30, 2016 and claims pending.

Office Communication for European Application No. 13713641.2 dated Mar. 30, 2017 and claims pending.

Office Communication for AE Application No. UAE/P/1009/2014 dated Jul. 19, 2017.

Office Communication for Chinese Application No. 201180054722.X dated Dec. 30, 2015.

Office Communication for U.S. Appl. No. 13/823,013 dated Oct. 7, 2014.

Office Communication for U.S. Appl. No. 13/823,013 dated Jul. 31, 2015.

Office Communication for U.S. Appl. No. 13/823,013 dated Mar. 21, 2016.

International Preliminary Report on Patentability for Application No. PCT/US2011/052051 dated Mar. 28, 2013.

(56) References Cited

OTHER PUBLICATIONS

Office Communication for Moroccan Application No. 37442 dated Jun. 17, 2015.
Office Communication for Chinese Application No. 201380026864.4 dated Jan. 22, 2016.
Invitation to Pay Additional Fees for Application No. PCT/US2013/031627 dated Jul. 15, 2013.
International Search Report and Written Opinion for Application No. PCT/US2013/031627 dated Nov. 4, 2013.
International Preliminary Report on Patentability for Application No. PCT/US2013/031627 dated Oct. 2, 2014.
[No Author Listed], High Concentration Solar Receiver. Rotem Industries, Ltd. 2007.
[No Author Listed], Solgate Solar hybrid gas turbine electric power system. European Commission. EUR 21615. Project Report. 2005.
Adkins et al., Heat Pipe Solar Receiver Development Activities at Sandia National Laboratories. The renewable and advanced energy conference for the 21$^{st}$ century conference. Apr. 1999.
Amsbeck et al., Development of a tube receiver for a solar-hybrid microturbine system. 14th Biennial CSP Solarpaces Symposium. 2008.
Bai, One dimensional thermal analysis of silicon carbide ceramic foam used for solar air receiver. Int. J Thermal Sci. Dec. 2010;49(12):2400-2404.
Brower et al., Conceptual design of advanced central receiver power systems. Sanders Associates Inc. proposal submitted by Energy Research and Development Administrations, (ERDA). Volume II. 1979.
Forsberg et al., High-Temperature Liquid-Fluoride-Salt Closed-Brayton-Cycle Solar Power Towers. J. Solar Energy Eng. May 2007;129:141-146.
Gallup, A solarized Brayton engine based on turbo-charger technology and DLR receiver. Sandia National Labs., Albuquerque, NM; James Kesseli, Northern Research & Engineering Corp., Woburn, MA. 1994.
Klein et al., Experimental Evaluation of Particle Consumption in a Particle Seeded Solar Receiver. J. Sol Energy Eng. Dec. 2007;130(1):1-8.
Konstandopoulos et al., Hydrosol advanced monolithic reactors for hydrogen generation from solar water splitting. Revue des Energies Renouvelables. 2006;9(3):121-126.
Roger et al., Multiple Air-Jet Window Cooling for High-Temperature Pressurized Volumetric Receivers: Testing, Evaluation, and Modeling. Sol. Energy Eng. Mar. 2006. 128(3):265-274.
Schwarzbözl et al., Solar Gas Turbine Systems: Design, Cost and Perspectives. Solar Energy. 2006;80;1231-1240.
Office Communication for U.S. Appl. No. 15/667,222 dated Apr. 20, 2018 and claims pending.
Office Communication for Indian App. No. 8774/DELNP/2014 dated May 29, 2018 and claims pending.
UAE/P/1009/2014, Jul. 19, 2017, Office Communication.
Office Action for AU App. No. 2018203145 dated Apr. 12, 2019 and claims pending.
Office Action for CN Application No. CN 201710257929.6 dated Apr. 28, 2020 and Claims Pending.
CN 201710257929.6, Apr. 28, 2020, Office Communication and Claims Pending.
Office Communication for EP Application No. 11 760 965.1 dated Aug. 30, 2019 and Claims Pending.
Office Communication for U.S. Appl. No. 16/361,074 dated Mar. 23, 2020 and Claims Pending.
Office Communication for AE Application No. UAE/P/1009/2014 dated Nov. 12, 2019 and Claims Pending.
Office Communication for CN Application No. 201710257929.6 dated Aug. 13, 2019 and Claims Pending.

\* cited by examiner

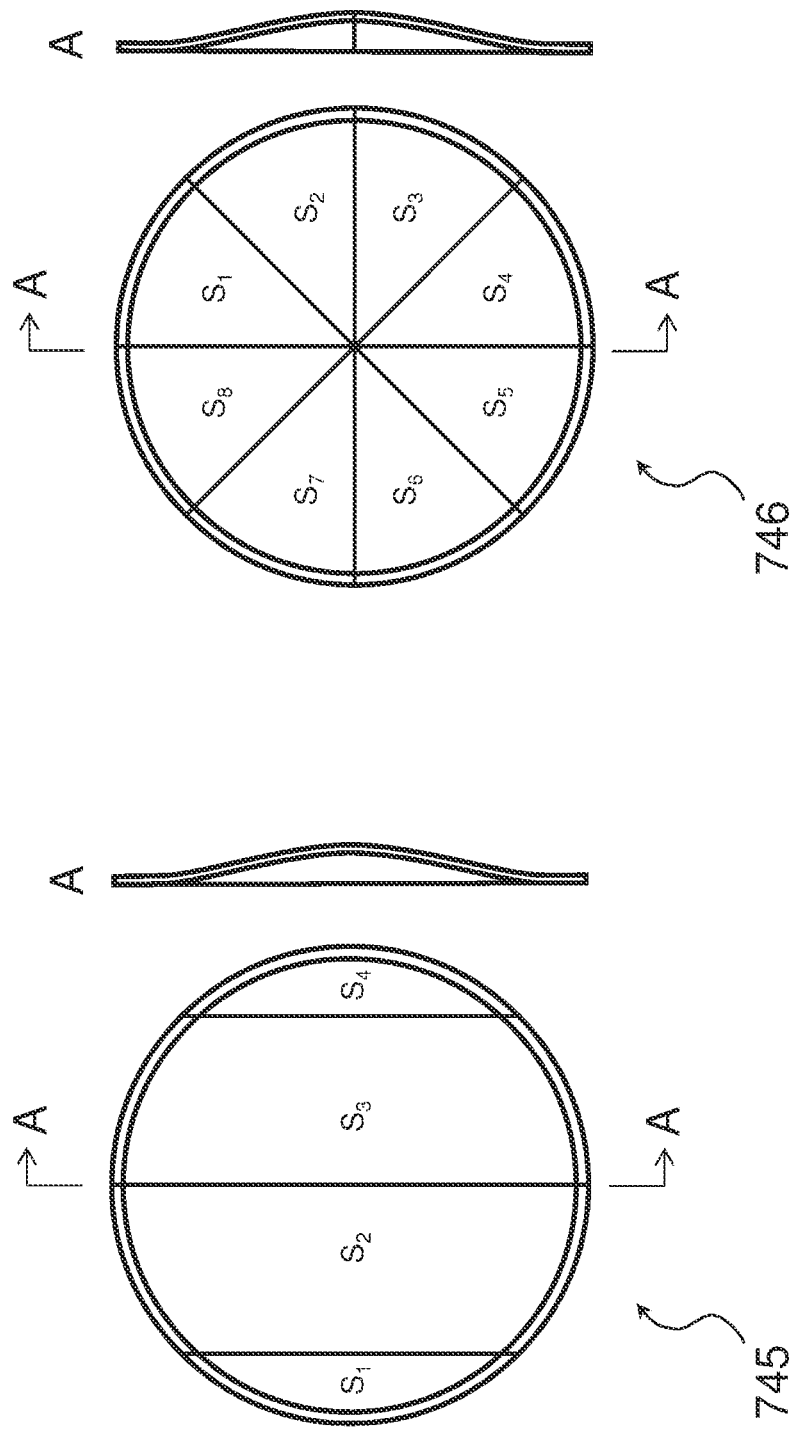

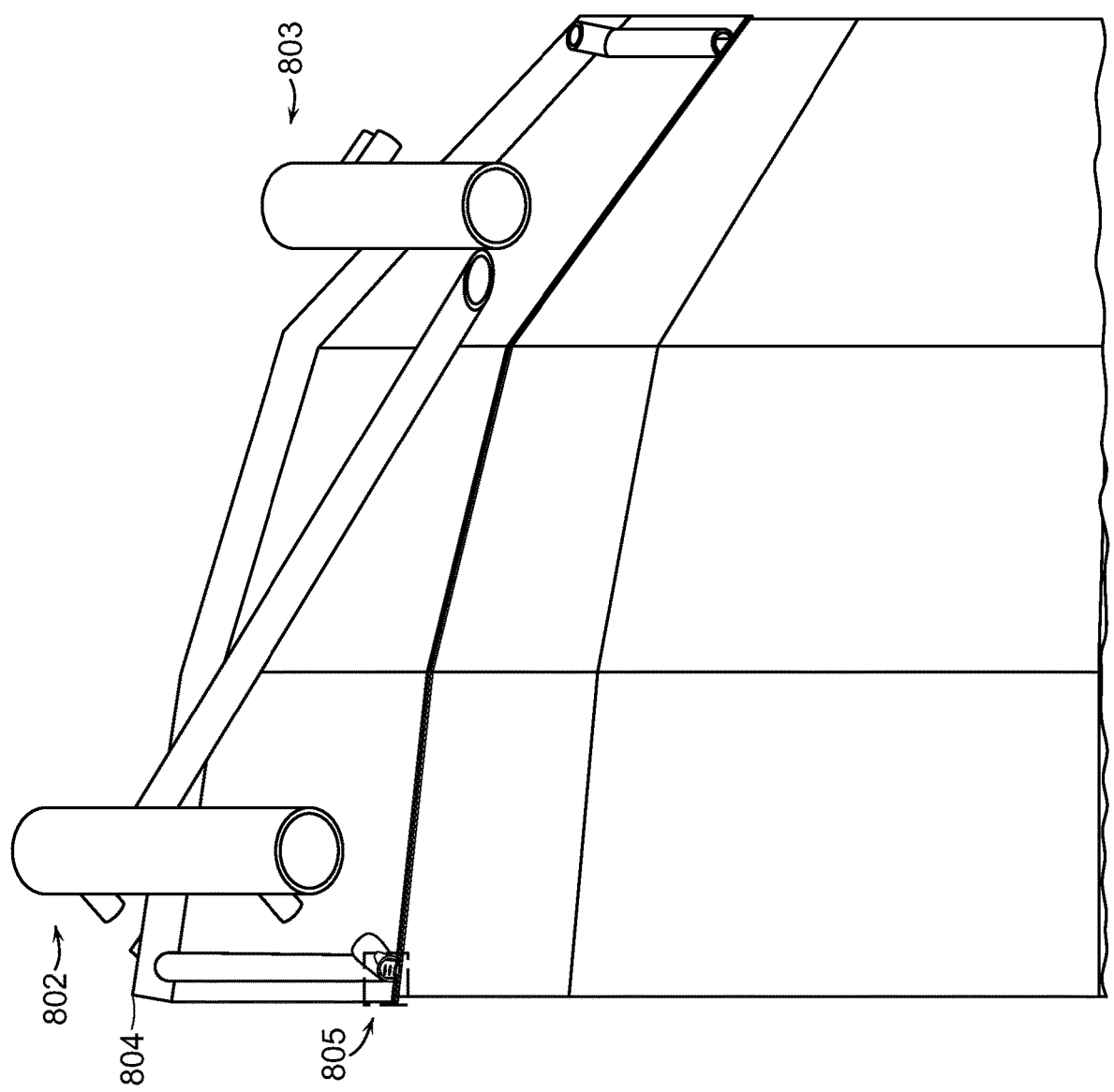

MULTI-THERMAL STORAGE UNIT SYSTEMS, FLUID FLOW CONTROL DEVICES, AND LOW PRESSURE SOLAR RECEIVERS FOR SOLAR POWER SYSTEMS, AND RELATED COMPONENTS AND USES THEREOF

RELATED APPLICATIONS

This application is a national stage filing under 35 U.S.C. § 371 of International Patent Application Serial No. PCT/US2013/031627, filed Mar. 14, 2013, which claims priority under 35 U.S.C. § 119(e) to U.S. Provisional Patent Application Ser. No. 61/613,948, filed Mar. 21, 2012, and entitled "Multi-Thermal Storage Unit Systems and Related Components"; U.S. Provisional Patent Application Ser. No. 61/613,947, filed Mar. 21, 2012, and entitled "Fluid Flow Control Devices for Solar Power Systems"; U.S. Provisional Patent Application Ser. No. 61/613,950, filed Mar. 21, 2012, and entitled "Low Pressure Solar Receivers with Double-Walled Windows and Uses Thereof"; and U.S. Provisional Patent Application Ser. No. 61/613,954 filed Mar. 21, 2012, and entitled "Low Pressure Solar Receivers with Segmented Windows and Uses Thereof." Each of these applications is incorporated herein by reference in its entirety for all purposes.

FIELD OF INVENTION

Systems, devices, and methods related to concentrated solar power generation using solar receivers are generally described.

BACKGROUND

Mounting concerns over the effect of greenhouse gases on global climate have stimulated research focused on limiting greenhouse gas emissions. Solar power generation is particularly appealing because substantially no greenhouse gases are produced at the power generation source.

Concentrated solar power (CSP) generation using solar receivers is known in the art. Briefly, concentrated solar power systems use lenses, mirrors, or other elements to focus sunlight incident on a relatively large area onto a small area called a solar receiver. The concentrated sunlight can be used to heat a fluid within the solar receiver. The fluid heated within the solar receiver can be used to drive a turbine to generate power.

SUMMARY OF THE INVENTION

Inventive concentrated solar power systems using solar receivers, and related devices and methods, are generally described. In some embodiments, the concentrated solar power systems include one or more low pressure solar receivers. In some embodiments, the concentrated solar power systems include one or more low pressure solar receivers that operate at or below atmospheric pressure. In addition, inventive solar power systems and methods making use of multiple thermal storage units are provided, which can be useful, for example, in providing substantially continuous operation. Systems and methods in which the solar receiver and the turbine are kept fluidically isolated from each other are also described. In some embodiments, fluid flow control devices are provided that facilitate switching of airflow between or among one or more thermal storage systems and one or more heat exchange systems used to transfer heat from a low-pressure fluid (e.g., at or below about 2 atmospheres) to a high-pressure Brayton cycle fluid (e.g., above about 2 atmospheres).

In one aspect, a power generation system is provided. The power generation system comprises, in some embodiments, a solar receiver, a compressor, a turbine, a first thermal storage system, a second thermal storage system, and a valving subsystem. In certain embodiments, the valving subsystem is configured such that in a first valving position, a first fluidic pathway is present between the solar receiver and the first thermal storage system, and a second fluidic pathway is present between the compressor, the turbine, and the second thermal storage system; and in a second valving position, a third fluidic pathway is present between the solar receiver and the second thermal storage system, and a fourth fluidic pathway is present between the compressor, the turbine, and the first thermal storage system.

In some embodiments, the power generation system comprises a first fluidic pathway fluidically interconnecting a solar receiver and a first thermal storage system; and a second fluidic pathway fluidically interconnecting a compressor, a turbine, and a second thermal storage system. In certain embodiments, the first thermal storage system is fluidically isolated from the second thermal storage system. In some embodiments, the system is configured such that the solar receiver heats fluid within the first fluidic pathway during at least a portion of the time during which the turbine is used to generate power using fluid within the second fluidic pathway.

In certain embodiments, a fluid flow control device is provided. The fluid flow control device comprises, in certain embodiments, a housing constructed of an investment casted metal alloy and defining a fluid chamber, the fluid chamber having a first opening, a second opening, and a third opening, each opening being configured to permit flow of a fluid into or out from the fluid chamber; a disc-shaped member having a circumferential surface about which are positioned one or more removable circumferential sealing elements, the disc-shaped member being rotatably positioned within the fluid chamber such that each of the one or more circumferential sealing elements interfaces with an inner surface of the fluid chamber, and such that in a first operating position the disc-shaped member defines within the fluid chamber a fluid flow path between the first and second openings that is fluidically isolated from the third opening, and in a second operating position the disc-shaped member defines within the fluid chamber a fluid flow path between the second and third openings that is fluidically isolated from the first opening; and a stem component having a first end positioned outside the fluid chamber, an elongated shaft extending through a passage through the housing into the fluid chamber, and a second end connected to the disc-shaped member inside the fluid chamber, the stem component being configured such that rotation of the stem component causes the disc-shaped member to rotate within the fluid chamber between at least the first and second operating positions, wherein the fluid-flow device is configured to operate at a temperature in a range of 1000° F. to 2500° F.

In some embodiments, the fluid flow control device comprises a housing defining a fluid chamber, the fluid chamber having a first opening, a second opening, and a third opening, each opening being configured to permit flow of a fluid into or out from the fluid chamber; a disc-shaped member having a circumferential surface about which are positioned at least two circumferential sealing elements, the disc-shaped member being rotatably positioned within the fluid chamber such that the each of the at least two circumferential sealing elements interfaces with an inner surface of the fluid chamber, and such that in a first operating position the disc-shaped member defines within the fluid chamber a fluid flow path between the first and second openings that is fluidically isolated from the third opening, and in a second operating position the disc-shaped member defines within the fluid chamber a fluid flow path between the second and third openings that is fluidically isolated from the first opening; and a stem component having a first end positioned outside the fluid chamber, an elongated shaft extending through a passage through the housing into the fluid chamber, and a second end connected to the disc-shaped member inside the fluid chamber, the stem component being configured such that rotation of the stem component causes the disc-shaped member to rotate within the fluid chamber between at least the first and second operating positions. In some such embodiments, the fluid-flow device is configured to operate at a temperature in a range of 1000° F. to 2500° F., and wherein the at least two circumferential sealing elements are positioned on opposite sides of where the stem component connects to the disc-shaped member, optionally wherein the two circumferential sealing elements are constructed of a cobalt base material.

The fluid flow control device comprises, in some embodiments, a housing constructed of a precision investment casted metal alloy and defining a fluid chamber, the fluid chamber having a first opening and a second opening, each opening being configured to permit flow of a fluid into or out from the fluid chamber; a disc-shaped member having a circumferential surface about which are positioned one or more circumferential sealing elements, the disc-shaped member being rotatably positioned within the fluid chamber such that each of the one or more circumferential sealing elements interfaces with an inner surface of the fluid chamber, and such that in a first operating position a fluid flow path exists between the first and second openings, and in a second operating position the disc-shaped member fluidically isolates the first and second openings; and a stem component having at least one end positioned outside the fluid chamber, and an elongated shaft extending through at least one passage through the housing into the fluid chamber, the stem component being connected to the disc-shaped member inside the fluid chamber and being configured such that rotation of the stem component causes the disc-shaped member to rotate within the fluid chamber between at least the first and second operating positions. In certain such embodiments, the fluid-flow device is configured to operate at a temperature in a range of 1000° F. to 2500° F.

In one set of embodiments, a solar receiver is provided which comprises a low pressure fluid chamber configured for operating at pressures up to 2 atmospheres, and comprising a fluid inlet, a fluid outlet, and an opening for receiving concentrated solar radiation; a solar absorber housed within the low pressure fluid chamber; a first transparent object that defines at least a portion of a wall of the low pressure fluid chamber; and a second transparent object in juxtaposition with the first transparent object, wherein the first transparent object and the second transparent object are configured such that a first fluid flow path is defined between the first transparent object and the second transparent object. In some such embodiments, concentrated solar radiation received through the opening passes through the first transparent object and second transparent object into the low pressure fluid chamber and impinges upon the solar absorber.

In some embodiments, a solar receiver is provided which comprises a low pressure fluid chamber configured for operating at pressures up to 2 atmospheres, and comprising a fluid inlet, a fluid outlet, and an opening for receiving concentrated solar radiation; a solar absorber housed within the low pressure fluid chamber; and a plurality of transparent objects that define a segmented wall of the low pressure fluid chamber. In some such embodiments, concentrated solar radiation received through the opening passes through the segmented wall and between transparent objects to pass into the low pressure fluid chamber and impinges upon the solar absorber.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIGS. 7A-7I include exemplary schematic illustrations of low-pressure solar receivers;

FIGS. 8A-8C include exemplary schematic illustrations of a secondary concentrator;

DETAILED DESCRIPTION

Figure 1A:
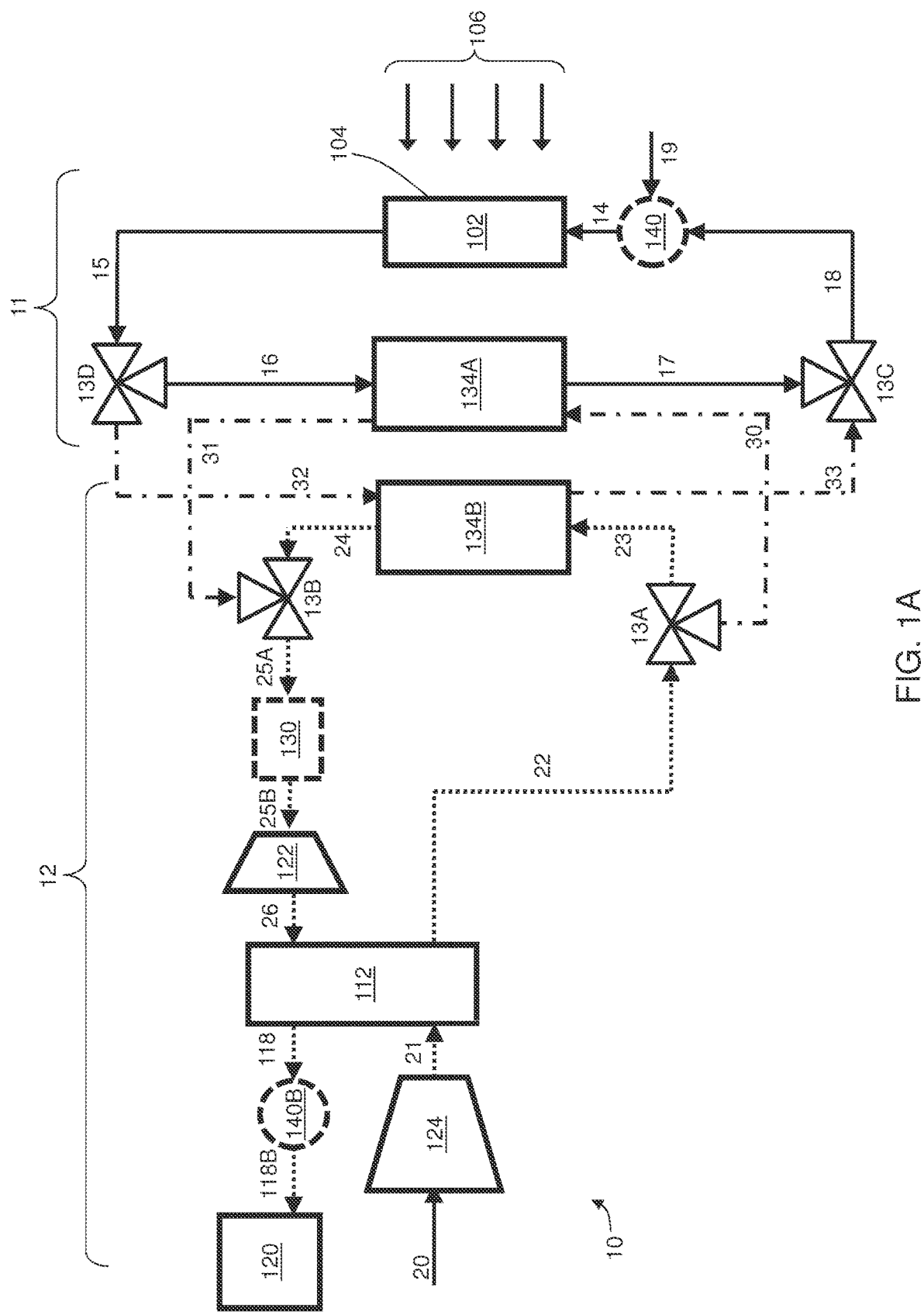
FIGS. 1A-1C are schematic diagrams of concentrated solar power generation systems including low pressure solar receivers, according to one set of embodiments.

Inventive concentrated solar power systems using solar receivers, and related devices and methods, are generally described. In some embodiments, the concentrated solar power systems include a solar receiver used to heat a fluid at a relatively low pressure. Heat from the low-pressure fluid heated by the solar receiver can be transferred to a relatively high-pressure fluid, which can be used to power a gas turbine as part of, for example, a Brayton cycle. The heat exchange between the low- and high-pressure fluids can be accomplished via the use of a heat exchange system. In certain embodiments, heat provided by the solar receiver(s) can be transferred to a separate fluidic pathway in which a relatively high-pressure fluid is transported to a turbine by changing valve configurations between one, two, or more thermal storage systems within the power generation system.

In some embodiments, the exhaust of the gas turbine can be transported to the solar receiver and used as the low-pressure heated fluid. Optionally, a blower can be used to provide additional ambient air to the low-pressure solar receiver, which can be useful, for example, for regulating the flow of fluid through the system. In some embodiments, a controller can be used to regulate the flow rate of the gas from the blower. The controller can be constructed and arranged to adjust the flow rate of the gas transported from the blower to the solar receiver based at least in part on a condition of the gas transported from the gas turbine to the solar receiver. For example, the controller can be constructed and arranged such that the flow rate of the gas transported from the blower to the solar receiver depends on one or more of the temperature, pressure, and/or flow rate of the gas transported from the gas turbine to the solar receiver.

The low-pressure fluid from the solar receiver, in addition to providing heat to the high-pressure working fluid within the Brayton cycle, can be used to provide heat to a thermal storage system, which can operate, for example, by storing sensible heat from the low-pressure fluid. The thermal storage system can be useful for operating the power cycle during periods of low sunlight, for example, by providing heat to the low-pressure fluid in addition to or in place of the heat provided by the solar receiver. In some embodiments, the thermal storage system can be operated at the high pressure of the turbine, for example, by transporting a pressurized fluid through the thermal storage unit to heat the pressurized fluid prior to, for example, transporting the pressurized fluid to a turbine.

In certain embodiments, multiple thermal storage systems (each of which can include one or more thermal storage units) can be used such that one thermal storage system can be used to store sensible heat provided by the solar receiver while another thermal storage system can be used to provide heat to the working fluid of a Brayton cycle. In some such embodiments, the first thermal storage system can be operated at a pressure near or below atmospheric pressure while the second thermal storage system can be operated at an elevated pressure. By operating the power generation system in this way, one can eliminate the need for a heat exchange system that must exchange heat between a pressurized fluid and a non-pressurized fluid, a task which is often challenging. In addition, operating the system in this manner can ensure that a heat source is always available for providing heated working fluid to the Brayton cycle. Thus, in some embodiments, substantially continuous operation of the Brayton cycle can be achieved without directly exchanging heat between a high-pressure fluid and a low-pressure fluid.

In some embodiments, the airflow from the solar receiver can be switched between the thermal storage system and the heat exchange system used to transfer heat from the low-pressure fluid to the high-pressure Brayton cycle fluid. In some embodiments, a blower can be connected to transport heated air from the thermal storage system into the solar receiver.

In some embodiments, fluid flow control devices (e.g., valves, three-way valves, flapper valves) are provided that facilitate switching of airflow between or among one or more thermal storage systems and one or more heat exchange systems used to transfer heat from a low-pressure fluid to a high-pressure Brayton cycle fluid. In some embodiments, a fluid flow control device comprises a housing defining a fluid chamber, in which the fluid chamber has a plurality of openings (e.g., a first opening, a second opening, and a third opening). In some embodiments, each opening is configured to permit flow of a fluid into or out from the fluid chamber. In certain embodiments, the fluid flow device is configured to operate at a temperature in a range of 1000° F. to 2500° F. In certain embodiments, the fluid flow device is configured to operate at a temperature in a range of 1150° F. to 2200° F. In certain embodiments, the fluid flow device is configured to operate at a temperature in a range of up to 1150° F.

In certain embodiments, the housing of the fluid flow device is constructed using precision investment casting. In some embodiments, precision investment casting is a casting process in which an expendable pattern is surrounded by an investment compound (e.g., a ceramic component) and then baked so that the investment is hardened to form a mold and the pattern material (e.g., a wax) is melted and removed. In such embodiments, a metal (e.g., a metal alloy) is entered into the mold, and allowed to solidify, after which the mold is removed (e.g., by hammering the mold into pieces) to obtain the cast metal object.

In some embodiments, the housing and/or other components (e.g., stem components, disc-shaped members) of the fluid flow control device are constructed of a metal alloy. In certain embodiments, the metal alloy is a stainless steel alloy, or a nickel base superalloy, such as IN-718, IN-713 LC or CMSX4. In some embodiments, cobalt materials are used for rubbing surfaces in fluid flow devices configured to operate at high temperatures because the cobalt forms a lubricating oxide layer with the oxygen in air or working fluid.

In some embodiments, the fluid flow devices are insulated on the outside, which may facilitate internal sealing at operating temperatures & pressures.

In some embodiments, the housing defines a connection interface for a fluid conduit at one or more of the first, second and third openings. In some embodiments, the connection interface is (i) a band flange, such as a "V" band flange, optionally which is configured for quick change assembly, (ii.) a bolted flange, optionally which is configured with a gasket surface, (iii.) a low pressure thermal fit/slip joint, (iv.) a male or female screw-type connection interface, (v.) a radiator clamp, optionally which is configured for light weight ducting, or (vi.) another appropriate connection interface.

In some embodiments, the fluid flow device also comprises a disc-shaped member (e.g., a flapper) having a circumferential surface about which are positioned one or more removable circumferential sealing elements, in which the disc-shaped member is rotatably positioned within the fluid chamber such that the one or more circumferential sealing elements interface with an inner surface of the fluid chamber. In some embodiments, the disc-shaped member is rotatably positioned within the fluid chamber such that in a first operating position the disc-shaped member defines within the fluid chamber a fluid flow path (e.g., airflow path)

between the first and second openings that is fluidically isolated from the third opening, and in a second operating position the disc-shaped member defines within the fluid chamber a fluid flow path (e.g., airflow path) between the second and third openings that is fluidically isolated from the first opening. In some embodiments, the one or more circumferential sealing elements are constructed of a cobalt base material. In some embodiments, the one or more circumferential sealing elements are piston rings.

In some embodiments, the fluid flow control device also comprises a stem component having a first end positioned outside the fluid chamber, an elongated shaft extending through a passage through the housing into the fluid chamber, and a second end connected to the disc-shaped member inside the fluid chamber. In some embodiments, the stem component is configured such that its rotation causes the disc-shaped member to rotate within the fluid chamber between at least the first and second operating positions. In some embodiments, the stem component is connected to an automatically controlled motor. In some embodiments, the stem component is configured to rotate the disc-shaped member 360 degrees. In some embodiments, the angle of rotation of the disc shaped member between the first and second operating positions is up to about 90 degrees. In some embodiments, the angle of rotation of the disc shaped member between the first and second operating positions is in a range of 45 degrees to 60 degrees, 45 degrees to 135 degrees, or 60 degrees to 120 degrees.

In some embodiments, the stem component passes through a bushing that is positioned within the passage through the housing. In some embodiments, at least a surface of the bushing that confronts the stem component is constructed of a cobalt base material. In some embodiments, the stem component is constructed of a cobalt base material. Circumferential sealing elements (e.g., piston ring seals), in some embodiments, are provided on the disc-shaped member on both forward & aft sides of the rotating stem component to provide effective sealing around (e.g., 360 degrees of) the circumference of the member. Circumferential sealing elements (e.g., piston ring seals), in some embodiments, are made from cobalt base material or similar material to enable low friction movement, long life, and minimal or no galling when operating at high temperature. In some embodiments, stem bushings are also of a cobalt or similar material to provide; low friction, low wear, long life, & low galling at high operating temperatures.

In some embodiments, the fluid flow control device comprises an adaptor/sleeve positioned within the housing at an opening to facilitate manufacturing, assembly and low leakage. In some embodiments, the sleeve is constructed of the same material as the housing.

In some embodiments, a fluid flow control device is provided that has a housing defining a fluid chamber having a first opening and a second opening. In certain embodiments, each opening is configured to permit flow of a fluid into or out from the fluid chamber. In some embodiments, the fluid flow control device comprises a disc-shaped member having a circumferential surface about which are positioned one or more circumferential sealing elements. In some embodiments, the disc-shaped member is rotatably positioned within the fluid chamber such that the at least two circumferential sealing elements interface with an inner surface of the fluid chamber. In some embodiments, the disc-shaped member is rotatably positioned within the fluid chamber such that in a first operating position a fluid flow path is defined between the first and second openings, and in a second operating position the disc-shaped member fluidically isolates the first and second openings. In some embodiments, the fluid flow control device comprises a stem component having at least one end positioned outside the fluid chamber, and an elongated shaft extending through at least one passage through the housing into the fluid chamber. In some embodiments, the stem component is connected to the disc-shaped member inside the fluid chamber and is configured such that rotation of the stem component causes the disc-shaped member to rotate within the fluid chamber between at least the first and second operating positions. In some embodiments, the fluid flow control device functions as a low pressure damper.

Figure 11A:
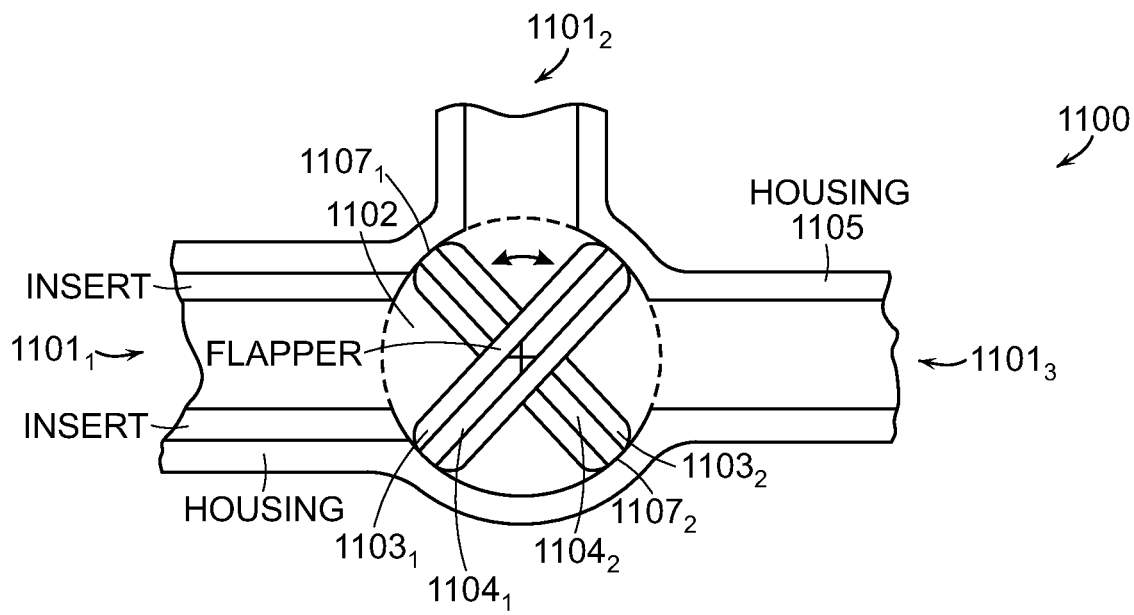
FIGS. 11A-11C include exemplary schematic illustrations of fluid flow devices.

Depicted in FIG. 11A is a cross-sectional view of an exemplary fluid flow device 1100 comprising a housing 1105 (e.g., constructed of an investment casted metal alloy) that defines a fluid chamber 1102, in which the fluid chamber 1102 has a first opening $1101_1$, a second opening $1101_2$, and a third opening $1101_3$. Each opening in this device is configured to permit flow of a fluid into or out from the fluid chamber 1102. The fluid flow device 1100 also comprises a disc-shaped member $1103_{1-2}$ (shown here as a top view, in two positions) having a circumferential surface about which is positioned a removable circumferential sealing element $1104_{1-2}$. In this device, the disc-shaped member $1103_{1-2}$ is rotatably positioned within the fluid chamber 1102 such that each of the circumferential sealing elements interfaces with an inner surface $1107_{1-2}$ of the fluid chamber 1102, and such that in a first operating position the disc-shaped member $1103_1$ defines within the fluid chamber 1102 a fluid flow path between the first opening $1101_1$ and second opening $1101_2$ that is fluidically isolated from the third opening $1101_3$, and in a second operating position the disc-shaped member $1103_2$ defines within the fluid chamber 1102 a fluid flow path between the second opening $1101_2$ and third opening $1101_3$ that is fluidically isolated from the first opening $1101_1$. The fluid flow device 1100 also comprises a stem component (not shown) that has a first end positioned outside the fluid chamber, an elongated shaft extending through a passage through the housing into the fluid chamber, and a second end connected to the disc-shaped member (at the x in the center of the disc shaped member $1103_{1-2}$) inside the fluid chamber 1102. The stem component is configured such that rotation of the stem component causes the disc-shaped member $1103_{1-2}$ to rotate within the fluid chamber 1102 between at least the first and second operating positions.

Figure 11B:
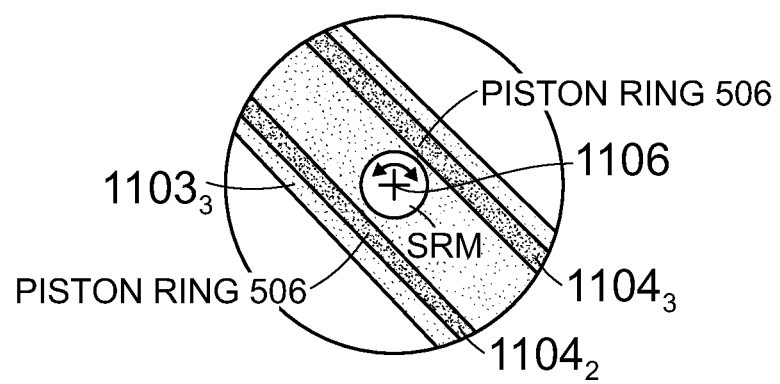
Figure 11C:
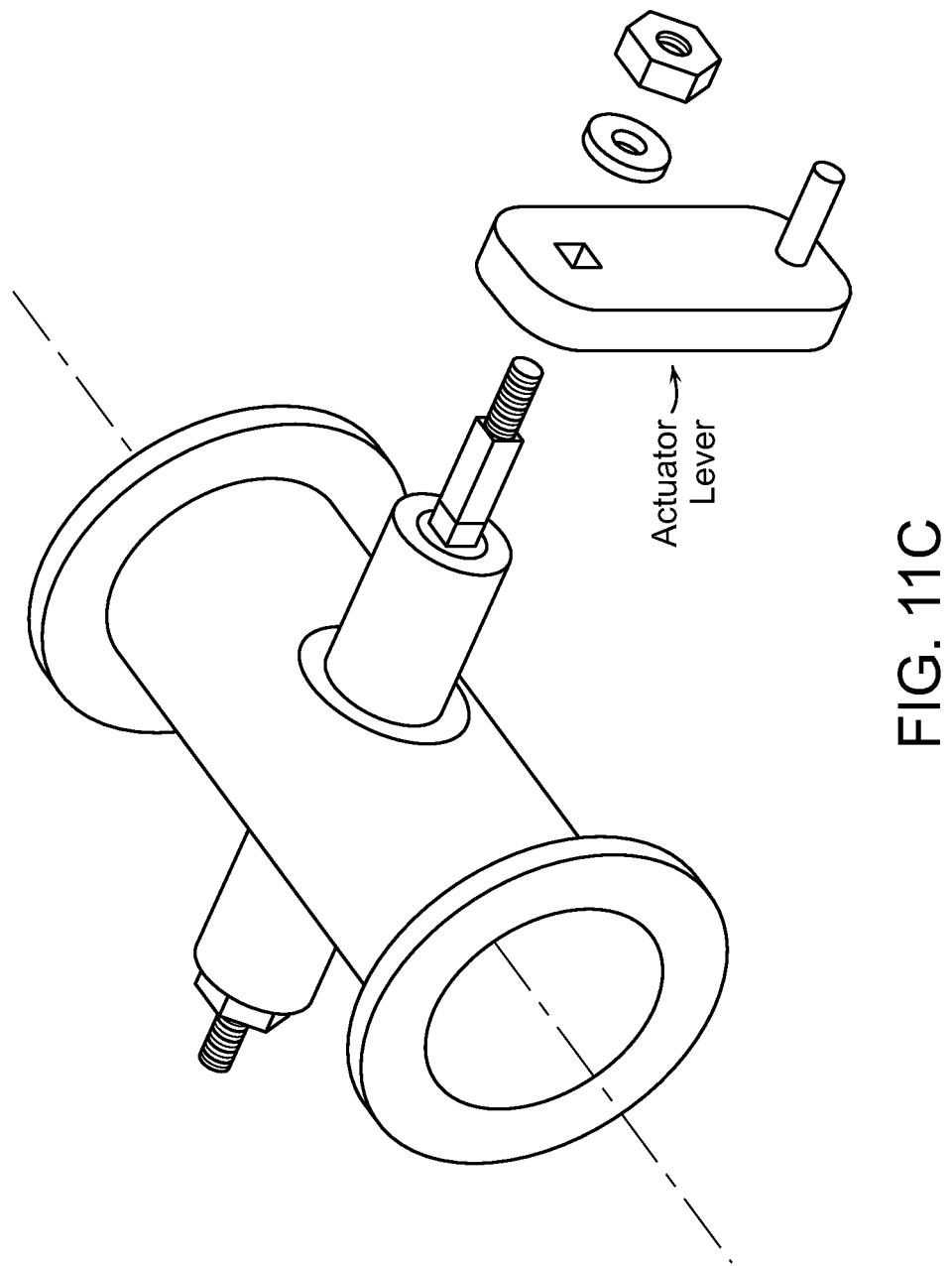

FIG. 11B depicts an example of a disc-shaped member $1103_3$ that has two circumferential sealing elements $1104_{1-2}$ positioned on opposites sides of a location 1106 where a stem component connects to the disc shaped member ($1103_3$).

The overall efficiency of the system can be improved, in some cases, by recovering heat from the low-pressure fluid exiting the heat exchange system used to transfer heat to the high-pressure fluid. For example, in some cases, the low-pressure fluid exiting the heat exchange system can be used to generate steam to power a steam turbine in a Rankine cycle. In some instances, the low-pressure fluid exiting the heat exchange system can be used to provide heat to an absorption chiller, which can be used, for example, to produce chilled water for an air conditioner and/or refrigeration system. The low-pressure fluid from the heat exchange system can also be used to provide heat for general space heating purposes (e.g., via an air to liquid heat exchanger).

Some embodiments of the invention can be used in coordination with solar power tower systems (also known as central tower solar power plants or heliostat solar power plants). Such systems include a plurality of heliostats arranged to redirect sunlight toward the top of a collector tower, sometimes called a central tower, on which one or more solar receivers are mounted. In some such embodiments, the gas turbine and/or the compressor can be mounted, along with the solar receiver, at the top of the solar tower. Other components, such as a thermal storage system can also be mounted at the top of, or within other parts of, the tower. In some embodiments, provision is made for adjusting the angle of the solar receiver relative to the ground and to ground-mounted heliostats. The angle can be adjusted, in certain embodiments, based on tower height, heliostat field size and/or shape, and/or latitude.

In some embodiments, low pressure solar receivers are provided that may be used in conjunction with the power generation systems disclosed herein. The solar receivers function, at least in part, to convert solar radiation energy to thermal energy of a working fluid, e.g., a working fluid of a power generation or thermal storage system. The solar receivers typically comprise a low pressure fluid chamber that is designed and constructed, at least in part, to provide an insulated casing that acts to reduce or eliminate thermal losses from the solar receiver, to contain a low pressure working fluid and/or to provide a support structure for a solar absorber. The low pressure solar receivers also typically comprise a transparent object (e.g., window) positioned adjacent to an opening in the receiver for receiving solar radiation. The transparent object functions, at least in part, to contain the low pressure working fluid, to permit solar radiation to pass into the solar receiver (where the radiation impinges the solar absorber) and to eliminate or reduce thermal losses associated with re-radiation from the solar absorber.

Because the low pressure receiver operates at low pressure (e.g., below 1 atmosphere, below 2 atmospheres) the chamber can be typically constructed using less material and fewer design constraints than is needed for chambers that are subjected to higher pressures. Moreover, the low pressure design enables the use of relatively large (e.g., 1 meter to 5 meters in diameter) transparent objects that enable a high solar collection capacity. Thus, according to some aspects, the low pressure solar receivers have lower cost of production and significantly larger collection capacity than currently available solar receivers.

In further embodiments, high pressure receivers are provided that may be used in conjunction with the power generation systems disclosed herein. The high pressure solar receivers function, at least in part, to convert solar radiation energy to thermal energy of a working fluid, e.g., a working fluid of a power generation system or thermal storage system. In some embodiments, the high pressure receivers include an insulated casing housing a high pressure solar absorber that acquires thermal energy by absorbing incident solar radiation. The high pressure fluid (e.g., fluid at a pressure of above 2 atmospheres to 50 atmospheres) entering the receiver passes through one or more fluid passages within the high pressure solar absorber and acquires thermal energy therein, in part, through contact with the passage wall(s). The high pressure solar absorber often has a black surface coating to promote absorption of incident solar radiation and is typically constructed from a single crystal super alloy, e.g., a nickel-based single crystal super alloy.

Current high-pressure receivers typically use metals that are often limited with respect to maximum temperatures at which they can function. For example, certain high-pressure receivers employ stainless steel or other alloys for the pressurized receiver components and these materials typically limit the receiver exit temperatures to levels that are insufficient to enable (at least at high efficiencies) certain downstream uses, such as use within a Brayton power cycle. The high-pressure solar receivers provided herein employ significantly higher temperature materials, e.g., high temperature single crystal super alloys, for the heat-exchanger elements and therefore can be operated at significantly higher temperatures. In some embodiments, high-pressure absorbers are produced from nickel-based high-temperature super alloy (e.g., using precision investment casting), and enable relatively high maximum exit temperatures (e.g., temperatures of up to ~1150° C.) from the receiver. Thus, in some embodiments, the receivers may be used within a Brayton cycle system to achieve high power output & high overall electrical efficiency.

In certain embodiments, additional heat transfer features are provided into the internals of the heat-exchanger elements (e.g., improved cross sectional shape) to facilitate heat transfer efficiency. In some embodiments, the cast single crystal tubes are attached to headers & manifolds of similar materials via a unique vacuum brazing process known as (ADB) activated diffusion bonding or (TLP) transient liquid phase. This joining technique enables, in some embodiments, a joint to retain full strength & temperature capability. In some embodiments, the high-pressure receivers also incorporate a transparent object (e.g., a Quartz glass front window). In some embodiments, the transparent object has an anti-radiation reflection coating on the inside to limit the effects of re-radiation on thermal efficiency. Moreover, in some embodiments, high resistance insulation is applied to the receivers to improve thermal efficiency.

In some embodiments, secondary concentrators are provided. The secondary concentrator provides, at least in part, a mechanism for collecting concentrated solar radiation from a primary concentrator, e.g., a heliostat field, or other source, and directing that solar radiation into the opening of a solar receiver. The secondary concentrator typically improves the solar collection efficiency of the solar receiver. In some embodiments, the second concentrator is constructed with a plurality of reflective panels, each reflective panel typically having a reflective surface and a predetermined shape. The plurality of reflective panels are typically arranged in a configuration that facilitates reflection of incident solar radiation toward the receiver opening. In certain embodiments the secondary concentrator includes cooling pipes that function in part to deliver cooling fluid to and from a cooling passage within each reflective panel.

Certain embodiments of the inventive systems and methods described herein can provide certain advantage(s) over traditional concentrated solar power techniques in certain applications. For example, low-pressure components (e.g., solar receivers, storage containers, etc.) can be relatively inexpensive to manufacture and relatively safe to operate. In addition, low-operating pressures allow for the use of relatively large windows within the solar receiver, compared to pressurized systems in which large windows can rupture at high pressures. The Brayton cycle systems described herein have a higher thermal efficiency relative to systems that employ, for example, Rankine cycles. The ability to switch the flow of low-pressure fluid between heat exchange for power generation and low-pressure storage can allow for operation at night and other low-sunlight conditions. The heat integration methods described herein can also improve overall system performance.

Figure 1B:
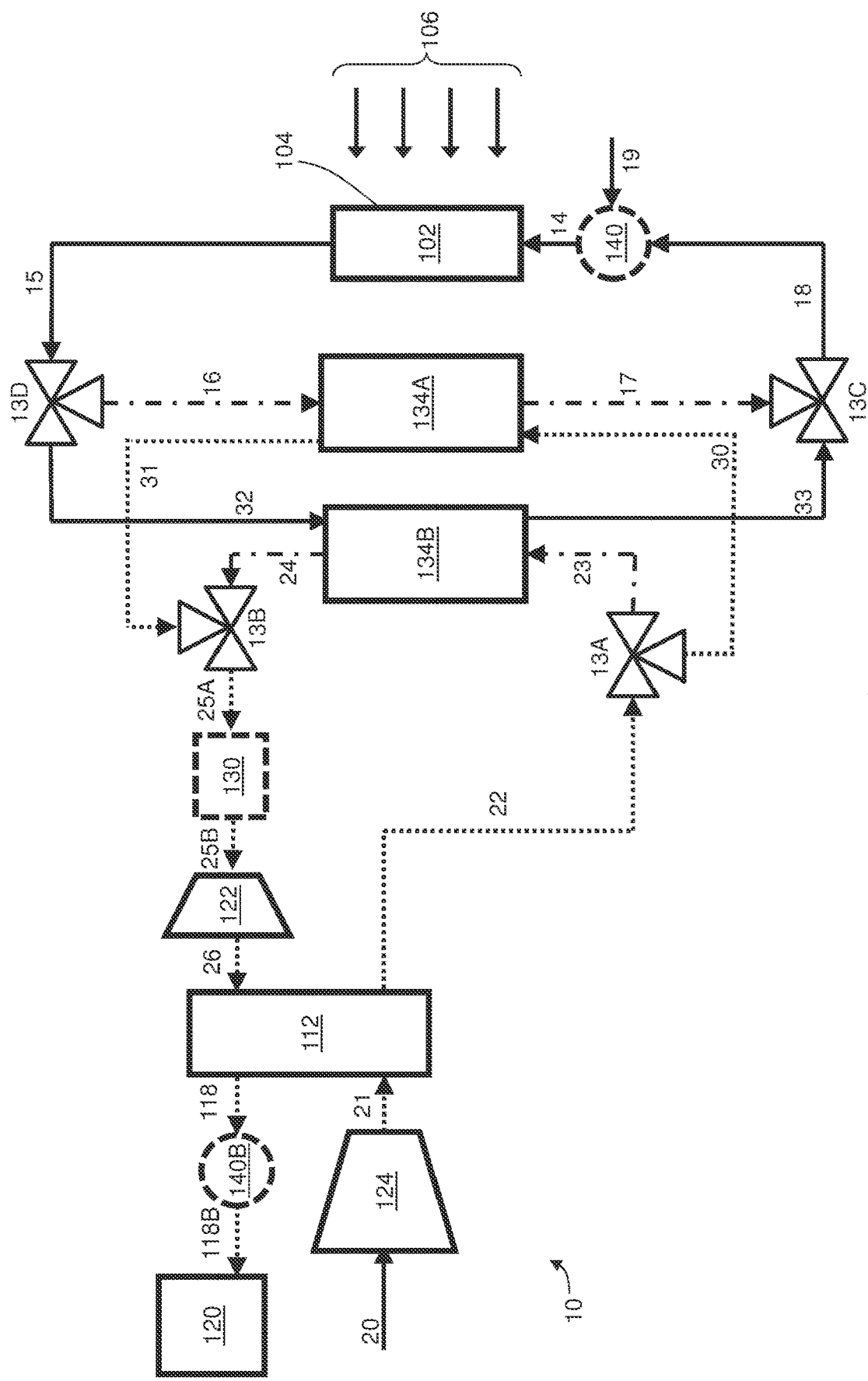

FIGS. 1A-1B are schematic illustrations of a system 10 in which concentrated solar energy is used to generate power. The fluid streams in FIGS. 1A-1B can be generally divided into streams comprising relatively high-pressure fluid (illustrated as dotted lines in FIGS. 1A-1B), streams comprising relatively low-pressure fluid (illustrated as solid lines in FIGS. 1A-1B), and streams through which substantially no fluid is transported (illustrated as dash-dot lines in FIGS. 1A-1B, such as streams 30-33 in FIG. 1A and streams 16-17 and 23-24 in FIG. 1B). It should be noted that these conventions are used for illustration purposes only, and are not meant to indicate that the pressures in all relatively low-pressure streams are the same and/or that the pressures in all relatively high-pressure streams are the same.

System 10 includes a solar receiver 102 constructed and arranged such that at least a portion of the receiver, such as face 104 in FIGS. 1A-1B, is exposed to incident solar radiation 106. The energy from the incident solar radiation can be used to heat a fluid within the solar receiver. In some embodiments, the solar receiver can be constructed and arranged to operate at relatively low pressures. For example, the pressure of the fluid within the solar receiver (and/or within any fluidic pathway that includes the solar receiver) can be up to and including about 2 atmospheres, less than about 1.5 atmospheres, less than about 1.25 atmospheres, less than about 1.1 atmospheres, less than about 1 atmosphere, between about 0.9 and about 2 atmospheres, between about 0.9 and about 1.5 atmospheres, between about 0.9 and about 1.25 atmospheres, between about 0.9 and about 1.1 atmospheres, or between about 0.9 and about 1 atmosphere. In some cases, the solar receiver can be constructed and arranged such that the fluid within the receiver is not substantially compressed, with the exception of incidental compression that might occur due to the heating and/or transport of the fluid, before being transported to the receiver. For example, the fluid transported to the solar receiver can be substantially equal to the pressure of the surrounding environment, in some cases. The reduced pressures at the receiver may allow a "window" of the receiver (e.g., a transparent portion of the receiver through which sunlight passes to heat the fluid in the receiver) to be made significantly larger than in other relatively high pressure receivers. For example, prior receivers may be limited to a window size of about 60 cm diameter, whereas a receiver in some embodiments of the invention may have a size up to about 150 cm or more. In some embodiments, the receivers have a window size of 4 meters or more. Additional details related to the design and operation of the solar receiver are described in more detail below.

System 10 also includes a turbine. In the set of embodiments illustrated in system 10, power is primarily generated using a Brayton cycle. The Brayton cycle illustrated in FIGS. 1A-1B includes gas turbine 122. While a single turbine is illustrated in FIGS. 1A-1B, it should be understood that the invention is not so limited, and that, in some embodiments, multiple turbines can be employed. For example, in some embodiments, the power generation system includes at least 2, at least 3, at least 4, at least 5, or more turbines. A single gas turbine and/or the combination of multiple gas turbines can be capable of producing any suitable amount of power (e.g., at least about 100 kW, at least about 500 kW, at least about 1 MW, at least about 4 MW). One of ordinary skill in the art would be capable of selecting an appropriate gas turbine and/or combination of gas turbines to use, given a desired power output requirement.

In order to increase system efficiency, the gas supplied to gas turbine 122 should be relatively hot and relatively highly-pressurized. To accomplish this, compressor 124 can be used to compress a relatively low-pressure gas (e.g., ambient air) in stream 20 to produce relatively high-pressure stream 21. In some embodiments, the compressor can be used to produce a fluid stream (e.g., a gas stream) with a pressure above 2, at least about 3, at least about 4, at least about 5, at least about 10, or at least about 15 atmospheres.

In the set of embodiments illustrated in FIGS. 1A-1B, independent fluidic pathways are maintained. For example, in FIG. 1A, fluidic pathways 11 and 12 are maintained. In FIG. 1B, a third fluidic pathway and a fourth fluidic pathway are maintained, as described in more detail below. In FIG. 1A, streams 30-33 are not used to transport fluid because three-way valves 13A-13D have been switched to allow flow in a first configuration, which does not include flow through streams 30-33. On the other hand, in FIG. 1B, valves 13A-13D have been switched such that streams 30-33 are used to transport fluid, and streams 16, 17, 23, and 24 (which were used to transport fluid in the configuration illustrated in FIG. 1A) are not used to transport fluid.

Referring back to FIG. 1A, first fluidic pathway 11 (comprising streams 15-18 in FIG. 1A) can fluidically interconnect solar receiver 102 and thermal storage system 134A such that a relatively low-pressure fluid can be transported between solar receiver 102 and thermal storage system 134A. In this way, heat from the solar receiver can be used to heat the media within the thermal storage system. The pressure within the low-pressure fluid stream can be, for example, up to and including about 2 atmospheres, less than about 1.5 atmospheres, less than about 1.25 atmospheres, less than about 1.1 atmospheres, less than about 1 atmosphere, between about 0.9 and about 2 atmospheres, between about 0.9 and about 1.5 atmospheres, between about 0.9 and about 1.25 atmospheres, between about 0.9 and about 1.1 atmospheres, or between about 0.9 and about 1 atmosphere. Second fluidic pathway 12 can fluidically interconnect compressor 124, thermal storage system 134B, and turbine 122. Second fluidic pathway 12 can be used to transport a relatively high-pressure fluid from compressor 124 through a thermal storage system and subsequently to turbine 122 to generate power. The pressure of the fluid within second fluidic pathway 12 (comprising streams 21-26 and 118 in FIG. 1A) can be, for example, above 2, at least about 3, at least about 4, at least about 5, at least about 10, or at least about 15 atmospheres. By operating system 10 in this way, power can be generated without directly transporting heat from fluidic pathway 11 to fluidic pathway 12. Rather, a valving subsystem (e.g., comprising three-way valves 13A-13D in FIGS. 1A-1B) can be used to modify the fluidic pathways such that fluidic isolation is maintained between fluidic pathway 11 and fluidic pathway 12, and between the third and fourth pathways that are present when the valves are switched, as described in more detail below.

An exemplary method of operating system 10, as illustrated in FIGS. 1A-1B is now described. A low-pressure fluid can be transported to solar receiver 102 via an inlet, such as inlet line 14 in FIGS. 1A-1B. Generally, fluid is transported through the solar receiver when the sun is available to provide energy to heat the fluid. The relatively low-pressure fluid can originate from any suitable source. For example, in certain embodiments, the relatively low pressure fluid can originate from the ambient atmosphere. In certain embodiments, at least a portion of the low-pressure fluid can be recycled within a low-pressure fluid pathway, illustrated as fluidic pathway 11 in FIG. 1A. In certain embodiments, the low-pressure fluid pathway can include a fluidic loop, such that substantially no fluid is expelled from the pathway during operation.

Once the relatively low-pressure fluid has been heated within the solar receiver, it can be transported out of the receiver, for example, via stream 15 in FIG. 1A. At least a portion of the fluid within stream 15 can be transported via valve 13D and stream 16 to a first thermal storage system 134A, where the heat can be used to heat a thermal storage medium. Thermal storage system 134A can include a single thermal storage unit, while in other embodiments, the thermal storage system can include a plurality of thermal storage units.

After the heat from the relatively low-pressure stream has been used to heat the medium within thermal storage system 134A, the relatively low-pressure fluid can be transported out of thermal storage system via stream 17. The relatively low-pressure fluid can then be redirected via valve 13C to stream 18 and subsequently to solar receiver 102. In certain embodiments, optional blower 140 can be used to transport additional low-pressure fluid in optional makeup stream 19 to solar receiver 102. Any suitable type of blower can be included in the system. The blower can comprise, for example, an electric driven induction flow fan.

While blower 140 and makeup stream 19 have been illustrated in FIG. 1A, it should be understood that, in other embodiments, they may not be present, and stream 18 can be fed directly to solar receiver 102. In still other embodiments, blower 140 and makeup stream 19 can be present, and stream 18 can be directly vented (i.e., in such embodiments, there is substantially no recycling of low-pressure fluid back to the solar receiver).

As noted above, a second fluidic pathway 12 can also be present within system 10, in certain embodiments. In certain embodiments, fluid can be transported through second fluidic pathway 12 during at least a portion of the time (which can be, for example, at least 5 minutes, at least 30 minutes, at least 1 hour, at least 6 hours, or at least 12 hours) that fluid is transported through first fluidic pathway 11.

In second fluidic pathway 12, inlet fluid (e.g., fluid from the ambient atmosphere or fluid originating from an exhaust of another unit operation) can be transported to compressor 124 via stream 20. Optionally, the relatively high-pressure fluid exiting compressor 124 via stream 21 can be pre-heated using residual heat exiting turbine 122 and heat exchanger 112. The use of heat exchanger 112 is optional, and in other embodiments, the high-pressure fluid exiting compressor 124 is not pre-heated.

In FIG. 1A, relatively high-pressure fluid (either in stream 21 directly from compressor 124 or in stream 22 from optional heat exchanger 112) can be transported to valve 13A, where it can be redirected to thermal storage system 134B via stream 23. In some embodiments, thermal storage system 134B can be pre-heated, and therefore, can be used to heat relatively high-pressure fluid within stream 23. Thermal storage system 134B can be pre-heated, for example, by transporting a hot fluid (e.g., a low-pressure heated fluid from solar receiver 102) through thermal storage system 134B at a relatively hot temperature (e.g., about 2000° F.). Once the relatively high-pressure fluid has been heated within thermal storage unit 134B, the fluid can be transported out of thermal storage unit 134B via stream 24. The fluid within stream 24 can be redirected by valve 13B through stream(s) 25 (e.g., potentially a single stream when optional supplemental heater 130 is not present and potentially as few as two streams (25A and 25B) when optional supplement heater 130 is present) to turbine 122. At turbine 122, the high-pressure fluid can be used to generate power. After the high-pressure fluid has been at least partially decompressed within turbine 122, it can be discharged via stream 26. In certain embodiments, optional heat exchanger 112 can be used to transport residual heat from the fluid in stream 26 to compressor exhaust stream 21, as described above. In certain embodiments, turbine exhaust (either from stream 26 directly or from stream 118) can contain residual heat, which can be recovered within heat recovery system 120 to increase system efficiency. Systems and methods for recovering the residual heat from the exhaust stream of the primary heat exchange system are described in more detail below.

In some embodiments, optional blower 140B can be included. While blower 140B is illustrated in FIG. 1A as being downstream of optional heat exchaager 112, blower 140B (when present) may be included at any position downstream of solar receiver 102. Including blower 140B downstream of solar receiver 102 can facilitate operating the gas within the solar receiver at a pressure close to atmospheric pressure (e.g., at a pressure less than or equal to about 1.1 atmospheres, such as from about 0.9 atmospheres to about 1.1 atmospheres).

After system 10 has been operated as illustrated in FIG. 1A for a given period of time, the heat storage media within thermal storage system 134B can cool down to a point where the fluid within stream 24 is not heated to a sufficiently high temperature to efficiently operate turbine 122. In addition, the heat storage media within thermal storage system 134A can become relatively hot, inhibiting further transport of heat from the fluid within stream 16 to the thermal storage system. When this state is achieved, it can be desirable to shift the fluid flow pathways such that thermal storage system 134A is used to heat fluid being transported to turbine 122 and thermal storage system 134B is used to store heat absorbed by the fluid within solar receiver 102.

As mentioned above, such fluidic switching can be achieved by actuating valves 13A-13D, which together can form at least a part of a valving subsystem, to alter the flow of fluid, as shown in FIG. 1B. In FIG. 1B, valves 13A-13D within the valving subsystem have been actuated to create third and fourth fluidic pathways. For example, in FIG. 1B, a third fluidic pathway fluidically interconnects solar receiver 102 and thermal storage system 134B. In FIG. 1B, the third fluidic pathway is generally indicated by solid stream lines (e.g., including streams 15, 32, 33, 18, and 14). In addition, in FIG. 1B, a fourth fluidic pathway fluidically interconnects compressor 124, turbine 122, and thermal storage system 134A. The fourth fluidic pathway includes streams indicated by dotted lines (e.g., including streams 21, 22, 30, 31, 25A, 25B, 26, and 118). As illustrated in FIG. 1B, the third and fourth fluidic pathways are fluidically isolated from each other.

In FIG. 1B, valve 13A has been switched such that fluid within stream 22 is transported to thermal storage unit 134A via stream 30, rather than to thermal storage unit 134B. In addition, valve 13B has been switched such that the fluid within stream 25 originates from stream 31, which is expelled from thermal storage system 134A. Thus, in the valving arrangement illustrated in FIG. 1B, the working fluid that is fed to the turbine is transported through thermal storage system 134A, rather than through thermal storage system 134B.

In addition, in FIG. 1B, valve 13D has been switched such that fluid within stream 15 is transported to thermal storage unit 134B via stream 32, rather than to thermal storage unit 134A. In addition, valve 13C has been switched such that the fluid within stream 18 originates from stream 33, which is expelled from thermal storage system 134B. Thus, in the valving arrangement illustrated in FIG. 1B, the relatively low-pressure fluid that is heated by solar receiver 102 is transported through thermal storage system 134B, rather than through thermal storage system 134A (as illustrated in FIG. 1A).

In certain embodiments, the valving subsystem comprising valves 13A-13D can be operated such that the first and second fluidic pathways are eliminated and third and fourth fluidic pathways are established substantially simultaneously. For example, using valves 13A-13D, one can switch between a first mode of operation in which heat is provided from solar receiver 102 to thermal storage system 134A to a second mode of operation in which heat is provided from solar receiver 102 to thermal storage system 134B essentially instantaneously (e.g., with a switching time of less than about 1 minute, less than about 30 seconds, less than about 10 seconds, or less than about 5 seconds). In some embodiments, using valves 13A-13D, one can switch between a first mode of operation in which heat is provided from thermal storage system 134B to the fluid used to produce power in turbine 122 to a second mode of operation in which heat is provided from thermal storage system 134A to the fluid used to produce power in turbine 122 essentially instantaneously (e.g., with a switching time of less than about 1 minute, less than about 30 seconds, less than about 10 seconds, or less than about 5 seconds). In some such embodiments, thermal storage systems 134A and 134B can be thought of as being "swapped out." For example, thermal storage system 134A can be switched from a "storage" mode (i.e., in which heat from solar receiver is transferred to the media within thermal storage system 134A) to a "providing" mode (i.e., in which heat from thermal storage system 134A is provided to the turbine 122) at substantially the same time as thermal storage system 134B is switched from a "providing" mode to a "storage" mode.

In some instances, shortly after valves 13A-13D have been switched to re-route the flow of fluid through system 10, the temperature of the fluid exiting the thermal storage system in the high-pressure fluidic pathway can be relatively low. In some such cases, an optional supplemental heater 130 can be employed to supply additional heat to the fluid in stream 25A, producing stream 25B, which can be transported to gas turbine 122. Supplemental heater 130 can comprise, for example, an auxiliary combustor, sometimes called a boost combustor, that burns fuel to supply additional heat. One of ordinary skill in the art would be capable of selecting an appropriate device to provide the required amount of supplemental heat, given the power demands and operating conditions of a given system. For example, heater 130 might comprise an induced flow combustor.

In one set of embodiments, the relatively low temperature of the fluid within the high-pressure stream shortly after switching the valves can be compensated for by adjusting the power demand of the system. For example, just after switching valves 13A-13D, the power demand of the system can be reduced (e.g., to zero or to a level of power than can be produced by a pressurized fluid at the temperature and flow rate available after switching). As the system approaches steady state, the power demand can be increased until, when steady state is reached, 100% of the system power can be demanded.

Figure 1C:
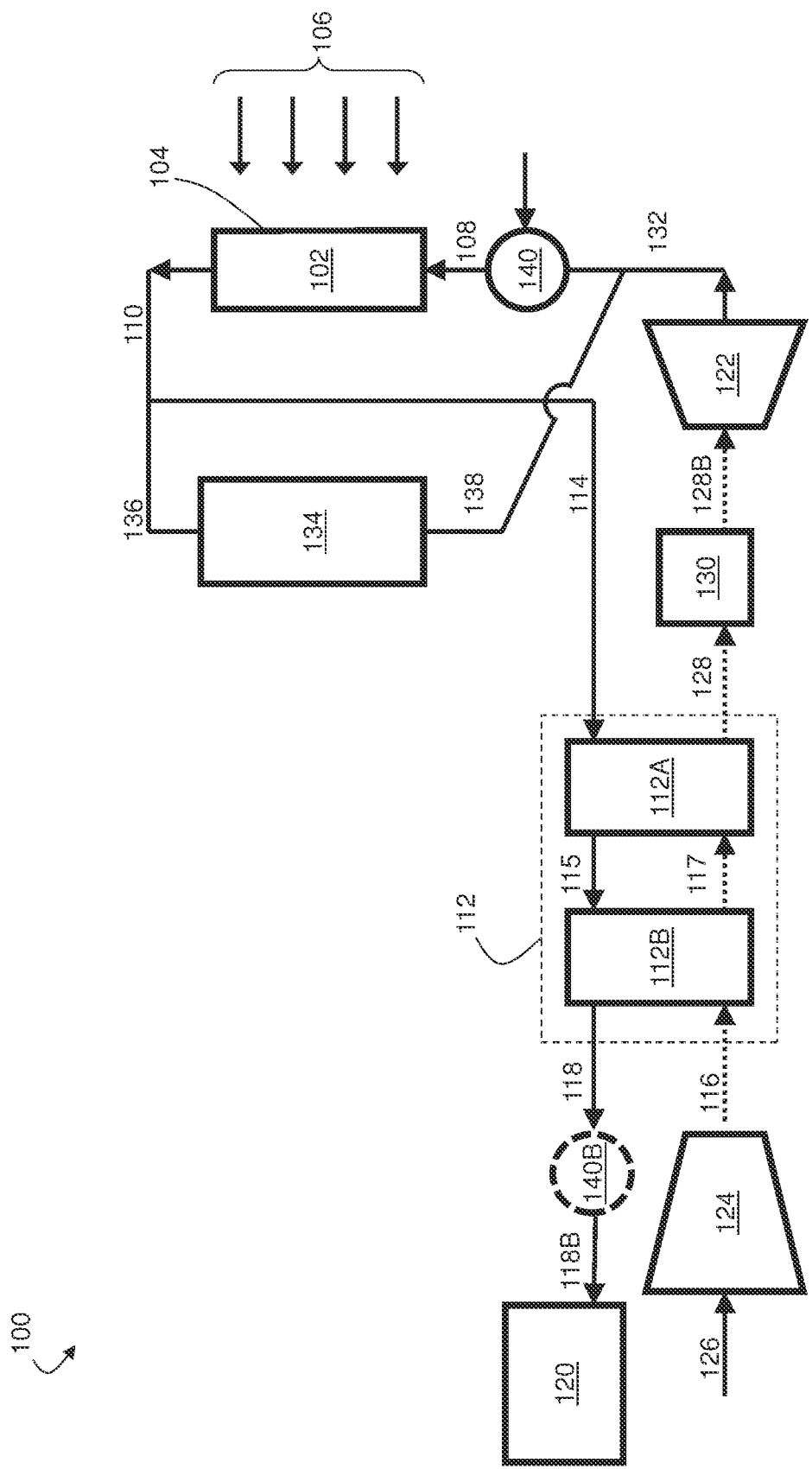

FIG. 1C is a schematic illustration of another system 100 in which concentrated solar energy is used to generate power. Similar to the convention employed in FIGS. 1A-1B, the fluid streams in the set of embodiments illustrated in FIG. 1C can be generally divided into streams comprising relatively high-pressure fluid (illustrated as dotted lines in FIG. 1C) and streams comprising relatively low-pressure fluid (illustrated as solid lines in FIG. 1C). As noted above, these conventions are used for illustration purposes only, and are not meant to indicate that the pressures in all relatively low-pressure streams are the same and/or that the pressures in all relatively high-pressure streams are the same.

System 100 includes a solar receiver 102 constructed and arranged such that at least a portion of the receiver, such as face 104 in FIG. 1C, is exposed to incident solar radiation 106. The energy from the incident solar radiation can be used to heat a fluid within the solar receiver. In some embodiments, the solar receiver can be constructed and arranged to operate at relatively low pressures. For example, the pressure of the fluid within the solar receiver can be up to and including about 2 atmospheres, less than about 1.5 atmospheres, less than about 1.25 atmospheres, less than about 1.1 atmospheres, less than about 1 atmosphere, between about 0.9 and about 2 atmospheres, between about 0.9 and about 1.5 atmospheres, between about 0.9 and about 1.25 atmospheres, between about 0.9 and about 1.1 atmospheres, or between about 0.9 and about 1 atmosphere. In some cases, the solar receiver can be constructed and arranged such that the fluid within the receiver is not substantially compressed, with the exception of incidental compression that might occur due to the heating and/or transport of the fluid, before being transported to the receiver. For example, the fluid transported to the solar receiver can be substantially equal to the pressure of the surrounding environment, in some cases. The reduced pressures at the receiver may allow a "window" of the receiver (e.g., a transparent portion of the receiver through which sunlight passes to heat the fluid in the receiver) to be made significantly larger than in other relatively high pressure receivers. For example, prior receivers may be limited to a window size of about 60 cm diameter, whereas a receiver in some embodiments of the invention may have a size up to about 150 cm or more. In some embodiments, the receivers have a window size of 4 meters or more.

Fluid can be transported to the solar receiver via an inlet, such as inlet line 108 in FIG. 1C. Generally, fluid is transported through the solar receiver when the sun is available to provide energy to heat the fluid. In some cases, the relatively-low pressure fluid transported to the solar receiver can comprise the outlet stream of a turbine used to generate power within the system. However, the relatively low-pressure fluid can also originate from other sources, in addition to or in place of the exhaust stream of a turbine. For example, in some cases, relatively low-pressure fluid transported to the solar receiver can originate from the ambient environment (e.g., atmospheric air). Additional details related to the design and operation of the solar receiver are described in more detail below.

Once the relatively low-pressure fluid has been heated within the solar receiver, it can be transported out of the receiver, for example, via stream 110 in FIG. 1C. At least a portion of the fluid within stream 110 can be transported to heat exchange (or recuperator) system 112 via stream 114. Heat exchange system 112 can be used to transfer heat from the relatively low-pressure fluid stream (e.g., from a solar receiver and/or from a thermal storage system) to a relatively high-pressure fluid stream 116, which can be used to drive a gas turbine, as described in more detail below.

After the heat from the relatively low-pressure stream has been transported to the relatively-high pressure stream, the relatively low-pressure fluid can be transported out of heat exchange system 112 via stream 118. In some embodiments, stream 118 can contain residual heat, which can be recovered within heat recovery system 120 to increase system efficiency. Systems and methods for recovering the residual heat from the exhaust stream of the primary heat exchange system are described in more detail below.

In some embodiments, optional blower 140B can be included. While blower 140B is illustrated in FIG. 1C as being downstream of optional heat exchange system 112, blower 140B (when present) can be included at any position downstream of solar receiver 102. Including blower 140B downstream of solar receiver 102 can facilitate operating the gas within the solar receiver at a pressure close to atmospheric pressure (e.g., at a pressure less than or equal to about 1.1 atmospheres, such as from about 0.9 atmospheres to about 1.1 atmospheres).

In the set of embodiments illustrated in system 100, power is primarily generated using a Brayton cycle. The Brayton cycle illustrated in FIG. 1C includes gas turbine 122. While a single turbine is illustrated in FIG. 1C, it should be understood that the invention is not so limited, and that, in some embodiments, multiple turbines can be employed. For example, in some embodiments, the power generation system includes at least 2, at least 3, at least 4, at least 5, or more turbines. A single gas turbine and/or the combination of multiple gas turbines can be capable of producing any suitable amount of power (e.g., at least about 100 kW, at least about 500 kW, at least about 1 MW, at least about 4 MW). One of ordinary skill in the art would be capable of selecting an appropriate gas turbine and/or combination of gas turbines to use, given a desired power output requirement.

In order to increase system efficiency, the gas supplied to gas turbine 122 should be relatively hot and relatively highly-pressurized. To accomplish this, compressor 124 can be used to compress a relatively low-pressure gas (e.g., ambient air) in stream 126 to produce relatively high-pressure stream 116. As mentioned above, relatively high-pressure stream 116 can be heated by transferring the heat from heated, low-pressure stream 114 (e.g., from solar receiver 102 and/or from thermal storage system 134) to stream 116 via heat exchange system 112 to produce relatively high-pressure, relatively high-temperature stream 128. In some embodiments, the compressor can be used to produce a fluid stream (e.g., a gas stream) with a pressure above 2, at least about 3, at least about 4, at least about 5, at least about 10, or at least about 15 atmospheres.

As illustrated in FIG. 1C, primary heat exchange system 112 includes two heat exchangers (or recuperators), 112A and 112B. It should be understood that, while the figures illustrate the use of two heat exchangers, the invention is not limited to the use of heat exchange systems including two heat exchangers, and, in some embodiments, a single heat exchanger or more than two heat exchangers (e.g., 3, 4, 5, or more heat exchangers) can be used in the heat exchange system. In FIG. 1C, the first heat exchanger 112A can be used to exchange heat at relatively high temperatures, for example, removing heat from high-temperature stream 114 to produce intermediate-temperature stream 115 while transferring heat to intermediate-temperature stream 117 to produce high-temperature stream 128. The second heat exchanger 112B can be used to exchange heat at relatively low temperatures, for example, removing heat from intermediate-temperature stream 115 to produce low-temperature stream 118, while transferring heat to low-temperature stream 116 to produce intermediate-temperature stream 117. High temperature heat exchange (e.g., at temperatures between about 800° C. and about 1250° C.) can involve the use of very expensive materials, such as specially engineered ceramics and/or high temperature super alloys. The use of multiple heat exchangers (e.g., one relatively small inexpensive heat exchanger and one relatively small expensive heat exchanger) instead of a single large, relatively expensive heat exchanger can allow one to achieve efficient heat exchange while reducing cost. While heat exchange system 112 in FIG. 1C is illustrated as including two heat exchangers, it should be understood that, in some embodiments, a single heat exchanger can be employed. In addition, in some cases, more than two heat exchangers can be employed in heat exchange system 112.

At least one of the heat exchangers in the heat exchanger system can be configured, in some embodiments, such that the heat exchanger simultaneously contains the first, low pressure fluid (e.g., gas) and the second, high pressure fluid (e.g., gas), which may, in certain embodiments involve simultaneous flow of the first and second fluids through the heat exchanger. For example, in some embodiments, at least one heat exchanger in the heat exchanger system comprises a first inlet through which gas at a relatively low pressure (e.g., a pressure of less than or equal to 2 atmospheres) is transported into the heat exchanger and a second inlet through which gas at a relatively high pressure (e.g., above 2 atmospheres) is transported into the heat exchanger while the first gas is transported into the heat exchanger. By configuring one or more heat exchangers in this manner, the amount of heat transferred from the high temperature fluid to the low temperature fluid can be enhanced, relative to situations in which the first and second fluids are transported subsequently through the heat exchanger (e.g., due to heat dissipation from the heat exchanger during the period between fluid flow). Heat exchangers configured in this manner can be configured to operate in countercurrent or cocurrent mode (with flow in the same or opposite directions).

In some embodiments, one or more of the heat exchangers used to transfer heat from the relatively low-pressure fluid to the relatively high-pressure fluid (e.g., heat exchangers 112A and/or 112B in FIG. 1C) can be a rotary heat exchanger (e.g., a ceramic rotary heat exchanger). Suitable rotary heat exchangers (e.g., rotary regenerators) for use in the systems described herein include those described, for example, in U.S. Pat. No. RE37134, issued on Apr. 17, 2001, filed Mar. 25, 1995, entitled "Heat Exchanger Containing a Component Capable of Discontinuous Movement"; U.S. Publication No. 2007/0089283, published on Apr. 26, 2007, filed Oct. 17, 2006, entitled "Intermittent Sealing Device and Method"; U.S. Publication No. 2008/0251234, published on Oct. 16, 2008, filed Apr. 16, 2007, entitled "Regenerator Wheel Apparatus"; U.S. Publication No. 2009/0000761, published on Jan. 1, 2009, filed Jun. 29, 2007, entitled "Regenerative Heat Exchanger with Energy-Storing Drive System"; U.S. Publication No. 2009/0000762, published on Jan. 1, 2009, filed Jun. 29, 2007, entitled "Brush-Seal and Matrix for Regenerative Heat Exchanger and Method of Adjusting Same"; and U.S. Publication No. 2006/0054301, published on Mar. 16, 2006, filed Dec. 16, 2004, entitled "Variable Area Mass or Area and Mass Species Transfer Device and Method." Ceramic rotary heat exchangers can be capable of operating at relatively high temperatures (e.g., up to about 2100° F. (1200° C.), which can allow one to supply higher temperature gas to the gas turbine, thereby increasing system efficiency. Of course, the invention is not limited to the use of rotary heat exchangers, and, in some embodiments, one or more of the heat exchangers (e.g., the heat exchangers used to transfer heat from the relatively low-pressure fluid to the relatively high-pressure fluid such as heat exchangers 112A and/or 112B in FIG. 1C)

can be any of a wide variety of suitable heat exchanger configurations, including, but not limited to, a plate heat exchanger, a tube heat exchanger (e.g., a shell and tube heat exchanger), etc.

In some embodiments, at least one of the heat exchangers can be a metallic heat exchanger. The first and second heat exchangers can be of different types. For example, in some embodiments, one of the heat exchangers within the heat exchange system can be a ceramic heat exchanger (e.g., a ceramic rotary heat exchanger, a ceramic plate heat exchanger, a ceramic tube heat exchanger, etc.) while a second of the heat exchangers can be a metallic heat exchanger. For example, gas from the solar receiver can be transported to a ceramic heat exchanger (where a relatively high maximum temperature might be observed), and subsequently transported to a metallic heat exchanger (where the maximum temperature might be lower than that observed in the ceramic heat exchanger).

In some embodiments, the system can include a heat exchanger that is configured to be operated at a relatively high temperature. For example, in some embodiments, the system can include one or more heat exchangers (e.g., heat exchangers 112A and/or 112B in FIG. 1C) that can be operated above temperatures of 1500° F. and in some embodiments at temperatures of up to 1800° F. In some embodiments, the system can include one or more heat exchangers that can be operated at temperatures of up to 2100° F. or even to 2500° F. High temperature heat exchangers can comprise one or more materials configured to withstand high temperature operation including, for example, one or more ceramics (e.g., aluminum oxides, iron oxides, silicon oxides, magnesium oxides, etc.). In some embodiments, the heat exchanger can comprise one or more metals (e.g., a super alloy such as those comprising nickel, chromium, titanium, tungsten, molybdenum, tantalum, columbium, and the like, including any of the super alloys described elsewhere herein. As specific examples, all or part of a high temperature heat exchanger can be formed of Alloy 230®, Alloy 214®, and/or Alloy 556® from Haynes International.

In some embodiments, the fluid within high-pressure, high-temperature stream 128 can be transported directly to gas turbine 122, where it can be used to produce power. The gas turbine can be constructed and arranged to operate using incoming gas streams with relatively high pressures. In some embodiments, the gas stream fed to the gas turbine has a pressure of above 2, at least about 3, at least about 4, at least about 5, at least about 10, or at least about 15 atmospheres. In some instances, for example during startup or during periods when the temperature of the fluid in stream 114 is relatively low (e.g., during periods of low sunlight and/or when storage container 112 (described below) is not sufficiently heated to supply high-temperature fluid), an optional supplemental heater 130 can be employed to supply additional heat to the fluid in stream 128, producing stream 128B which can be transported to gas turbine 122. Supplemental heater 130 can comprise, for example, an auxiliary combustor, sometimes called a boost combustor, that burns fuel to supply additional heat. One of ordinary skill in the art would be capable of selecting an appropriate device to provide the required amount of supplemental heat, given the power demands and operating conditions of a given system. For example, heater 130 might comprise an induced flow combustor.

Once the gas in stream 128 (or 128B) has been expanded, a relatively low-pressure, low-temperature turbine exhaust stream 132 can be produced. As mentioned above, in some embodiments, the turbine exhaust stream 132 can be fed to the solar receiver 102, where it can be reheated and used to supply heat to heat exchange system 112. Routing the turbine exhaust in this way can be beneficial, as the turbine exhaust may contain residual heat that would otherwise be lost if the exhaust were vented directly to the atmosphere.

In some embodiments, system 100 can include optional thermal storage system 134. In some embodiments, the thermal storage system can include a single thermal storage unit, while in other embodiments, the thermal storage system can include a plurality of thermal storage units. The thermal storage system can be used to store heat (e.g., sensible heat) for use during periods of relatively low sunlight and/or during startup of the system. During periods of relatively high sunlight, at least a portion of the fluid exiting the solar receiver (e.g., via stream 110) can be transported to the thermal storage system 134 (e.g., via stream 136), where the heat can be retained for later use. During periods of low sunlight, a relatively low-temperature fluid can be transported into the thermal storage system via stream 138. The heat stored within thermal storage system 134 can be used to heat the relatively low-temperature fluid to produce high-temperature fluid, which can be transported to heat exchange system 112, e.g., via streams 136 and 114. In some embodiments, the fluid supplied to stream 138 can comprise the exhaust stream 132 of turbine 122. For example, in some cases during periods of low sunlight, little or no fluid might be supplied to solar receiver 102 via stream 108, and low-pressure fluid from the exhaust stream 132 of turbine 122 (and, optionally, some fluid from the ambient atmosphere) can be re-directed to thermal storage system 134 via conduit 138. In some embodiments, a controller and valves can be used to regulate the distribution of low-pressure fluid through solar receiver 102 and thermal storage system 134.

In some embodiments, optional blower 140 can be incorporated into the system. Any suitable type of blower can be included in the system; the blower can comprise, for example, an electric driven induction flow fan. The blower can be used, for example, to transport the gas turbine exit stream (e.g., stream 132 in FIG. 1C) through the solar receiver during periods of relatively high sunlight. In addition, blower 140 can be used to provide the power to circulate hot air through the thermal storage system during periods of high sunlight. In some embodiments, blower 140 can be used to transport heated air from thermal storage system 134 to the solar receiver 102 (e.g., via pathway 138) to provide pre-heated air to the solar receiver (e.g., during periods of relatively low sunlight). In some embodiments, blower 140 can be shut down during periods of relatively low sunlight when the thermal storage system can provide heat for the system.

The blower can be arranged, in some cases, to accept ambient air or fluid from another source in addition to the exhaust gas from the gas turbine. In this way, the blower can be used to control the overall flow rate of the fluid within the relatively low-pressure section (i.e., from the exhaust of the gas turbine, through heat exchange system 112, and through optional heat recovery system 120). For example, when higher flow rates through the low-pressure section are desirable, the blower can take in a relatively large amount of fluid from the ambient or another, non-turbine exhaust source. When lower flow rates through the low-pressure section are desirable, the blower can take in a relatively small amount of (or no) fluid from the ambient or another, non-turbine exhaust source.

Figure 2A:
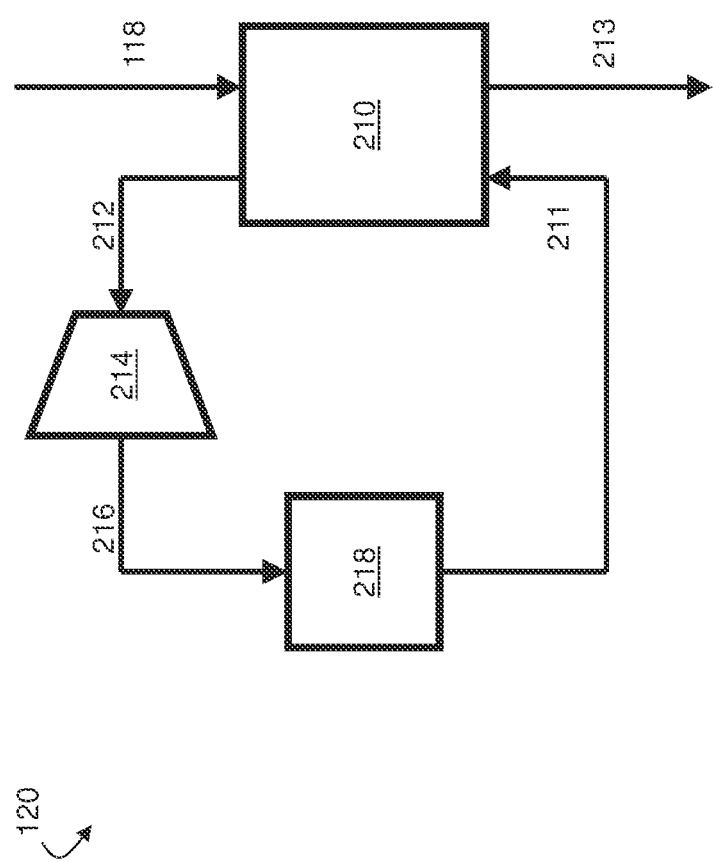
FIGS. 2A-2C include, according to some embodiments, exemplary schematic diagrams of heat recovery configurations that can be used with a concentrated solar power generation system.

As noted above, residual heat within stream 118 (e.g., from heat exchanger 112 in FIGS. 1A-1B or from heat exchange system 112 in FIG. 1C) can be exchanged within optional heat recovery system 120. Heat recovery system 120 can include a variety of configurations. For example, in some cases, a Rankine bottoming cycle can be employed to recover residual heat. FIG. 2A includes a schematic diagram illustrating the recovery of energy from stream 118 using a Rankine cycle. In FIG. 2A, stream 118, originating from heat exchanger(s) 112, is fed to a heat exchange boiler 210. The heat within stream 118 can transferred to another fluid stream containing water (e.g., stream 211 in FIG. 2A), which can result in the production of steam or hot water. The steam produced during this exchange of heat can exit via stream 212. Boiler 210 can also produce effluent stream 213, which can include cooled fluid from stream 118. Stream 212 can be fed to steam turbine 214, where it can be used to produce energy and exhaust stream 216. Exhaust stream 216 can be condensed to water in optional condenser 218, to produce heat (which can be used in other areas of the process) a condensed stream. As shown in FIG. 2A, the condensed stream from the condenser is illustrated as being used as heat exchange boiler inlet stream 211, which can be re-heated to generate steam. Optionally, steam turbine exhaust stream 216 can be used as heat exchange boiler inlet stream 211.

Figure 2B:
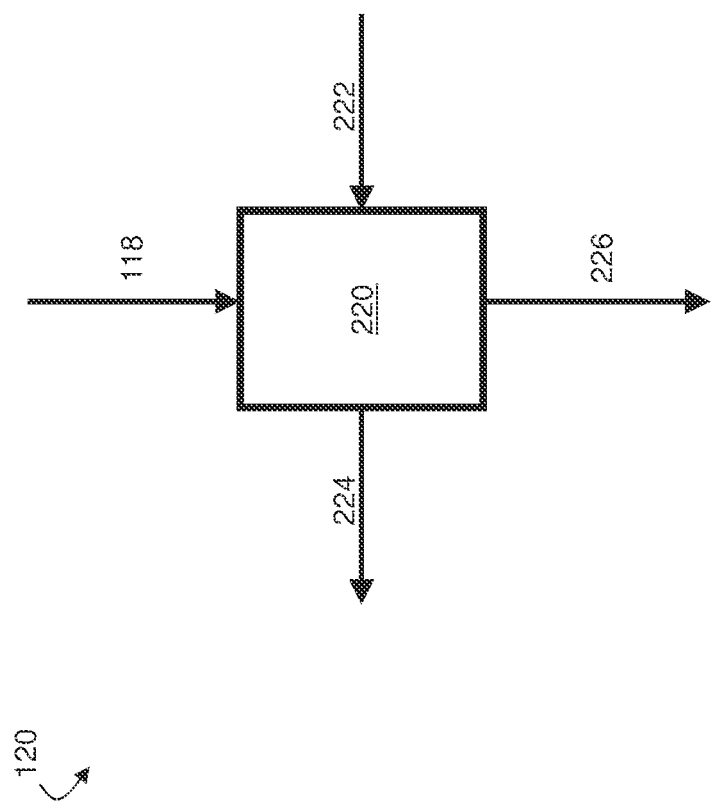

In some instances, an absorption chiller can be used to recover residual heat from stream 118. FIG. 2B includes a schematic illustration of one such set of embodiments. In FIG. 2B, stream 118 is transported to absorption chiller 220, where the heat from stream 118 is used to provide energy to the absorption chiller necessary to cool a relatively warm fluid in stream 222 (e.g., ambient air) to produce a cooled fluid stream 224. In addition to producing cooled fluid stream 224, the absorption chiller can produce exhaust stream 226, which contains fluid from stream 118 that has been cooled. Cooled stream 224 can be used, for example, as part of an air conditioning system. As another example, cooled stream 224 might be used to cool system components (e.g., the gas turbine), for example, during operation in very hot climates (e.g., temperatures of 100° F. or above). One of ordinary skill in the art would be capable of selecting a suitable absorption chiller based upon the required cooling load, temperature and flow rate of incoming fluid stream 118, and other design parameters.

Figure 2C:
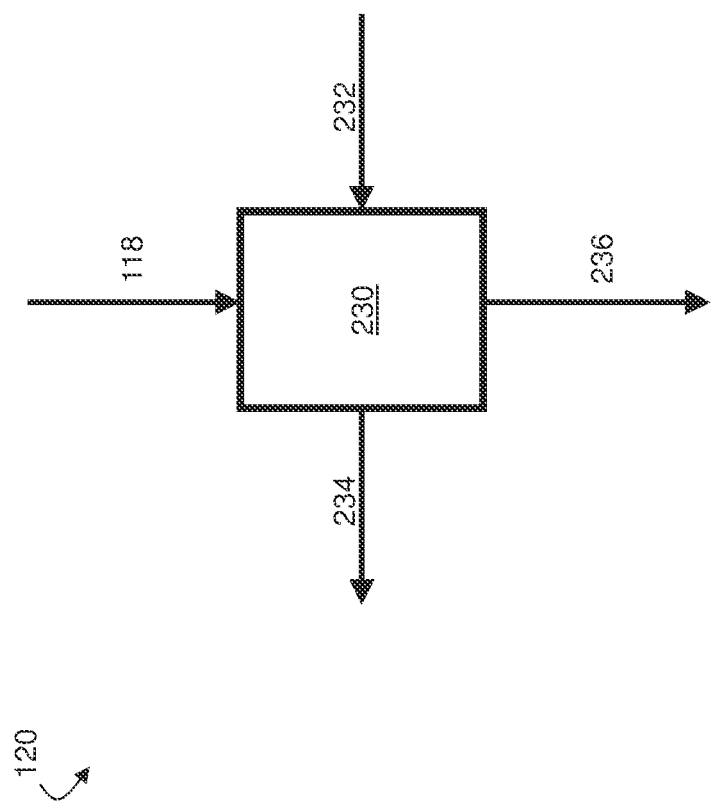

In still other cases, the residual heat within stream 118 can be used to provide heat (e.g., within other areas of the process and/or to areas outside the power generation process). FIG. 2C includes an exemplary schematic illustration of one such set of embodiments. In FIG. 2C, stream 118 is transported to heat exchanger 230, where it is used to heat relatively cool fluid in stream 232 (e.g., ambient air) to produce a heated fluid stream 234. In addition, exhaust stream 236, which contains fluid from stream 118 that has been cooled, can be produced. Heated stream 234 can be used, for example, to produce hot water or other liquids for use in a running water system, a space heating system (e.g., to provide heat one or more rooms within a building or other suitable structure), or any other suitable system in which heated fluids are required. One or ordinary skill in the art would be capable of selecting a suitable heat exchanger based upon the required heating load, temperature and flow rate of incoming fluid stream 118, and other design parameters.

The inclusion of heat recovery system 120 can lead to relatively large increases in overall system efficiency. Generally, overall system efficiency is calculated as the power produced by the system (in the form of electricity and/or in the form of a heated or cooled stream that can be used in another system, such as streams 224 and 234 in FIGS. 2B and 2C) divided by the power of the solar energy incident on the solar receiver and multiplied by 100%. In embodiments employing the Rankine bottoming cycle illustrated in FIG. 2A, the overall efficiency can approach about 50% (e.g., between about 40% and about 50%). For systems that include an absorption chiller such as the system illustrated in FIG. 2B, overall system efficiency can approach about 60% (e.g., between about 40% and about 60%). The overall efficiency of power generation systems that employ a heat exchanger to provide heat to other parts of the power generation system and/or external systems can approach about 80% (e.g., between about 40% and about 80%).

As noted above, the thermal storage system 134 in system 100 can include one or more thermal storage units. The thermal storage unit(s) can enable a practical and cost effective method to achieve thermal storage of CSP energy for use in generating electricity during hours with no or low sunlight. In some embodiments, a thermal storage unit can comprise a tank in which solid media with passages through which the fluid flows is located to store the thermal energy at relatively high temperatures (e.g., at least about 1800° F., at least about 2000° F., or higher).

Figure 3A:
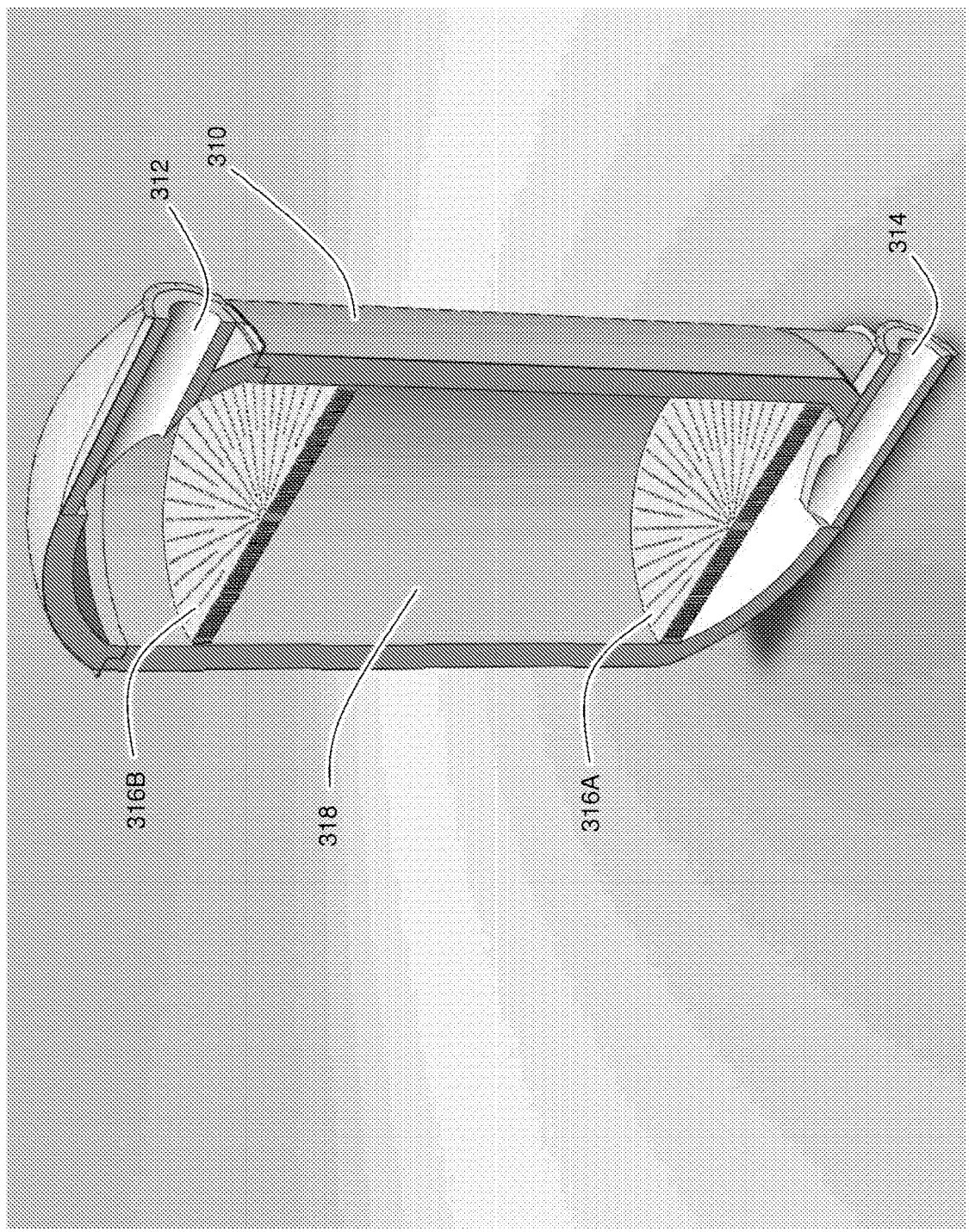
FIGS. 3A-3C include exemplary schematic illustrations of thermal storage units that can be used in a thermal storage system.
Figure 3B:
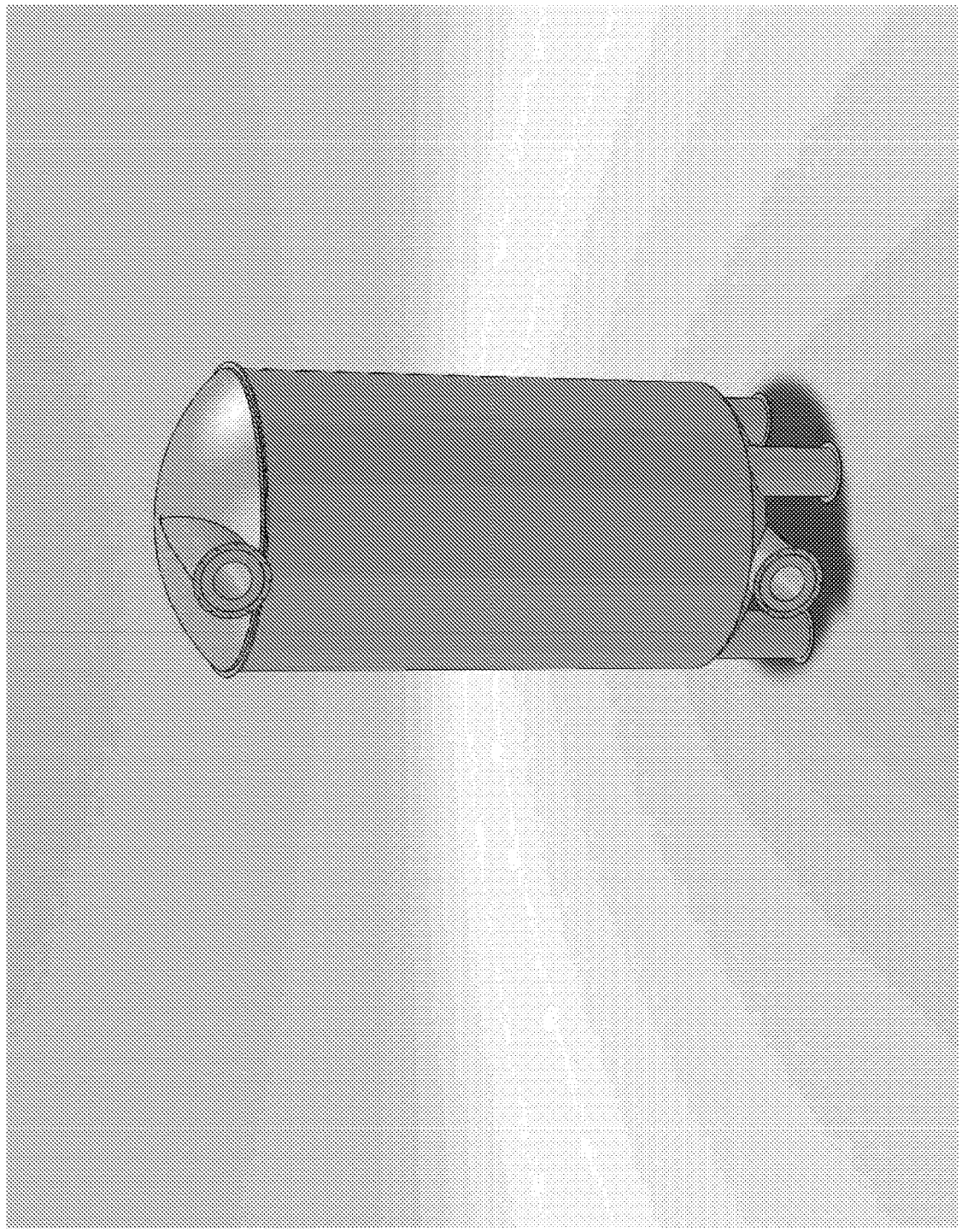
Figure 3C:
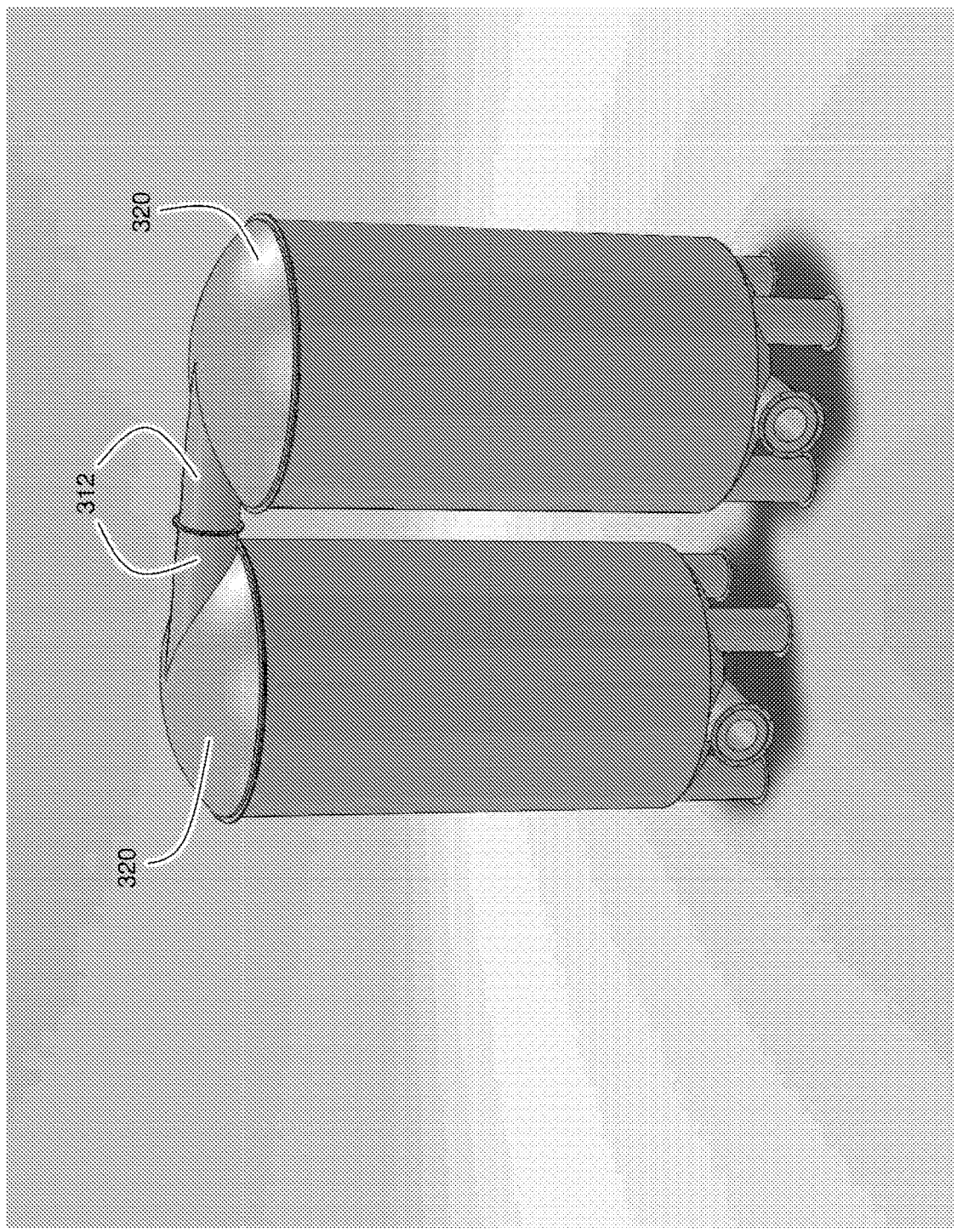

Exemplary illustrations of suitable thermal storage units are shown in FIGS. 3A-3C. FIG. 3A includes a cross-sectional view of a storage unit 310, including lines 312 and 314, each of which can function as an inlet or an outlet. Unit 310 also includes plate 316A that includes a plurality of passageways. Plate 316A is designed in this manner so fluid can be transported through the plate while the plate supports thermal storage media within volume 318, preventing the thermal storage media from entering line 314. In addition, unit 310 can include plate 316B, which can also comprise a plurality of passageways. By designing plate 316B in this manner, fluid can be transported from volume 318 and through plate 316B without entraining thermal storage media as the fluid exits line 312. By avoiding the transport of thermal storage media out of the thermal storage unit 310, one can reduce damage (e.g., erosion damage) to the turbine, blower, solar receiver, or other system components that may occur when the media contact these components.

Thermal storage unit 310 can be fabricated using a variety of materials including, for example, metals (e.g., stainless steel). In some embodiments, thermal storage unit 310 is configured such that it is a certified pressure vessel (e.g., ASME-certified, EN13445 certified, or a pressure vessel meeting a similar set of certification standards). In addition, plates 316A and 316B can be fabricated from any suitable material, including metals (e.g., stainless steel, refractory metals such as tungsten, and the like), ceramics, and/or combinations of these materials.

Thermal storage unit 310 can be fabricated in sections, such that two or more of the sections may be bolted together to assemble a storage unit having a desired volumetric capacity. Fabrication of the storage unit in sections facilitates factory construction, transport and onsite assembly of storage units having relatively large volumetric capacity. In some configurations sections of the storage unit may be in the range of 8 feet to 16 feet in length and 8 feet to 16 feet in diameter. In some configurations sections of the storage unit may be approximately 12 feet in length and 10 feet to 12 feet in diameter.

The passageways within plate 316A and/or 316B can be configured to impart a desired flow profile within volume 318. For example, the sizes (e.g., diameters, lengths), cross-sectional shapes, and/or flow angles of the pathways within plates 316A and/or 316B can be selected to achieve a desired flow profile. The openings of the fluid passageways one or both sides of plates 316A and/or 316B can be arranged in any suitable pattern including, for example, a honeycomb pattern.

As noted above, lines 312 and 314 can each function as an inlet or an outlet. For example, in some instances in which the thermal storage media within unit 310 is being heated by an incoming fluid (e.g., at a temperature of between 1800° F. and 1900° F.), line 312 can function as an inlet and line 314 can function as an outlet. In such cases, plate 316A can prevent thermal storage media from being entrained in the heating fluid and being transported through outlet 314. In some instances in which the thermal storage media within unit 310 is being used to heat an incoming fluid (e.g., at an incoming temperature of between 100° F. and 1200° F.), line 314 can function as an inlet and line 312 can function as an outlet. In such cases, plate 316B can prevent thermal storage media from being entrained in the heated fluid and being transported through outlet 312. The direction of fluid flow within unit 310 can be freely changed, depending on the mode of operation of the power generation system.

In some cases, a first portion of the gas heated by the solar receiver can be transported to the thermal storage system and a second portion of the gas heated by the solar receiver can be transported to the heat exchange system (i.e., the airflow from the solar receiver can be switched between the thermal storage system and the heat exchange system used to transfer heat from the low-pressure fluid to the high-pressure Brayton cycle fluid). In some cases, substantially all of the gas from the solar receiver is transported to the thermal storage system over a first period of time, and substantially all of the gas from the solar receiver is transported to the heat exchange system over a second period of time that does not overlap with the first period of time. For example, substantially all of the exhaust stream from the solar receiver might be transported to the thermal storage system over a first period of time, and at a later time, the flow from the solar receiver can be switched such that substantially all of the solar receiver exhaust is transported to the heat exchange system. In other cases, a first portion of the gas from the solar receiver is transported to the thermal storage system over a first period of time, and a second portion of the gas from the solar receiver is transported to the heat exchange system over the first period of time. Stated another way, the exhaust stream from the solar receiver can be split such that, simultaneously, a first portion of the solar receiver exhaust is transported to the thermal storage system and a second portion of the solar receiver exhaust is transported to the heat exchange system.

In some embodiments, the thermal storage system (including any thermal storage unit(s) within the thermal storage system) can be constructed and arranged to operate at relatively low pressures during at least a portion of the period of time over which system 100 is operated. For example, the pressure of the fluid within the thermal storage system (including any thermal storage unit(s) within the thermal storage system), for example, during heating of the thermal storage system and/or during heating of a fluid being transported through the thermal storage system, can be up to and including 2 atmospheres, less than about 1.5 atmospheres, less than about 1.25 atmospheres, less than about 1.1 atmospheres, less than about 1 atmosphere, between about 0.9 and about 2 atmospheres, between about 0.9 and about 1.5 atmospheres, between about 0.9 and about 1.25 atmospheres, between about 0.9 and about 1.1 atmospheres, or between about 0.9 and about 1 atmosphere. In some cases, the thermal storage system can be constructed and arranged such that the fluid within the thermal storage system is not substantially compressed, with the exception of incidental compression that might occur due to the heating and/or transport of the fluid, before being transported to the thermal storage system. For example, the fluid within the thermal storage system can be substantially equal to the pressure of the surrounding environment, in some cases. In some embodiments, the thermal storage system 134 is operated at relatively low pressures when being heated by a low-pressure fluid (e.g., low pressure fluid in stream 136 from solar receiver 102). In some embodiments, thermal storage system 134 is operated at relatively low pressures when being used to pre-heat a fluid that is to be transported to turbine 122.

It should be understood that the invention is not limited to the use of low-pressure fluid within thermal storage system 134, and that, in some embodiments, high-pressure fluid can be transported through thermal storage system 134 during operation of system 100. For example, in some embodiments, a relatively high-pressure fluid (e.g., at a pressure of above 2 atmospheres, at least about 2.1 atmospheres, at least about 2.25 atmospheres, at least about 2.5 atmospheres, at least about 3 atmospheres, at least about 4 atmospheres, at least about 5 atmospheres, at least about 10 atmospheres, or at least about 15 atmospheres, and, in some embodiments, up to 50 atmospheres) can be transported through and heated by thermal storage system 134 (e.g., after thermal storage system 134 has been heated by a fluid, such as a low-pressure fluid from solar receiver 102). After the high-pressure fluid is heated by thermal storage system 134, it can be transported to turbine 122 to generate power, in some embodiments.

In many previous thermal storage systems, high pressures are employed, which can increase the expense required to construct the systems. Other previous thermal storage systems have used a variety of salts or other materials that undergo a phase change, many of which materials were also very expensive. By being unpressurized and fully factory produced along with low-cost fill (thermal storage) media this approach dramatically reduces CSP thermal storage system cost. Using the CSP thermal storage tanks in modular form as part of the CSP tower could further improve the capital costs associated with the system.

The thermal storage units within the thermal storage system can be modular, in some cases, which can allow one to easily scale a system in order to allow a CSP system to operate to produce a given power for a given time without low or no sunlight. For example, FIG. 3B includes a system in which a single unit is used to store thermal energy. In FIG. 3C, two thermal storage units are connected (e.g., by rotating caps 320 such that lines 312 face each other) to double the thermal storage capacity. Of course, the amount of energy delivered by the thermal storage unit(s) can be altered in other ways by, for example, only partially filling one or more units with media and/or limiting the degree to which one or more sections of a single unit are heated (which might include establishing a thermal gradient along the longitudinal axis of one or more storage units).

In some embodiments, the tanks can be sized to achieve relatively easy transport. For example, each thermal storage unit could be between about 2 and about 12 feet in diameter, and up to 40 feet long to enable easy shipment. The thermal storage units can be filled on site or prior to delivery to the site, which can allow for cost effective production and reduce on site construction cost and/or schedule delays.

A variety of fill media can be used in the thermal storage unit(s) in the thermal storage system. The fill media can comprise a variety of materials with high heat capacities that are able to retain their structures at high temperatures, such as ceramics and other refractory materials. Exemplary materials include, but are not limited to, materials comprising aluminum oxides, iron oxides, silicon oxides, and/or magnesium oxides such as fire brick, mullite, magnetite, PYRO GRAN 35/38, PYRO KOR 60NR, PYRO KOR 95NK, and/or PYROFER 70. In some embodiments, the thermal storage media has a heat capacity of at least about 600 J/kg K, at least about 800 J/kg K, or at least about 900 J/kg K. It can be advantageous, in some embodiments, to use materials with relatively low densities (e.g., less than about 5 g/cm$^3$, less than about 3 g/cm$^3$, or less than about 2 g/cm$^3$).

The thermal storage media within the thermal storage unit(s) can be of any suitable form factor and size. For example, pellets (e.g., substantially spherical pellets or pellets with any of the shapes described below) with maximum cross-sectional diameters in mm, cm, or larger length scales can be used as the thermal storage media, in some instance. In some embodiments, the thermal storage media can comprise pellets, and at least about 50%, at least about 75%, at least about 90%, at least about 95%, or at least about 99% of the pellets have maximum cross-sectional diameters of less than about 100 cm, less than about 10 cm, less than about 1 cm, between about 1 mm and about 100 cm, or between about 1 cm and about 100 cm. Suitable pellet shapes include, but are not limited to, shapes that are substantially rectangular prisms (e.g., bricks, substantially cubic shapes), substantially triangular prisms, substantially spheres, bow ties, honeycombs, saddles, and the like. In one set of embodiments, the thermal storage media can comprise elongated tubes through which heated fluid is transported.

In certain embodiments, the thermal storage media within the thermal storage unit(s) can be selected such that a step-function change in temperature is not observed. That is to say, in such systems, the temperature profile of thermal storage media, when plotted linearly as a function of the distance along which fluid is transported through the thermal storage unit(s) would exhibit a non-step-function behavior. In certain such embodiments, one end of the thermal storage unit would be at a relatively hot temperature while the other end of the thermal storage unit would be at a relatively cool temperature, with a non-step function change in temperature (e.g., a linear change in temperature, a concave up change in temperature, or a concave down change in temperature) in between. Such profiles can be achieved, for example, by using thermal storage media with relatively low thermal conductivities, such as ceramics.

In some embodiments, the interior of the thermal storage unit(s) can be lined with a thermally insulating material and/or the outside of the thermal storage unit(s) can be covered with a thermally insulating material to reduce heat loss to the atmosphere. For example, when the tank is manufactured out of metal, the tank can be lined with and/or covered with a refractory material (e.g., ceramics such as alumina, silica, magnesia, and the like). In some embodiments, the refractory material can be cast in place and/or can comprise a multi-layered structure in which the density and/or heat capacity can vary from layer to layer. In some embodiments, the thickness of the thermally insulating lining within the unit(s) can be between about 5 inches and about 15 inches (e.g., for a tank with a diameter up to 12 feet and a length of up to 40 feet). In some embodiments, the thickness of the thermally insulating material on the exterior of the thermal storage unit(s) can be up to 1 foot or up to 2 feet in thickness.

Figure 4A:
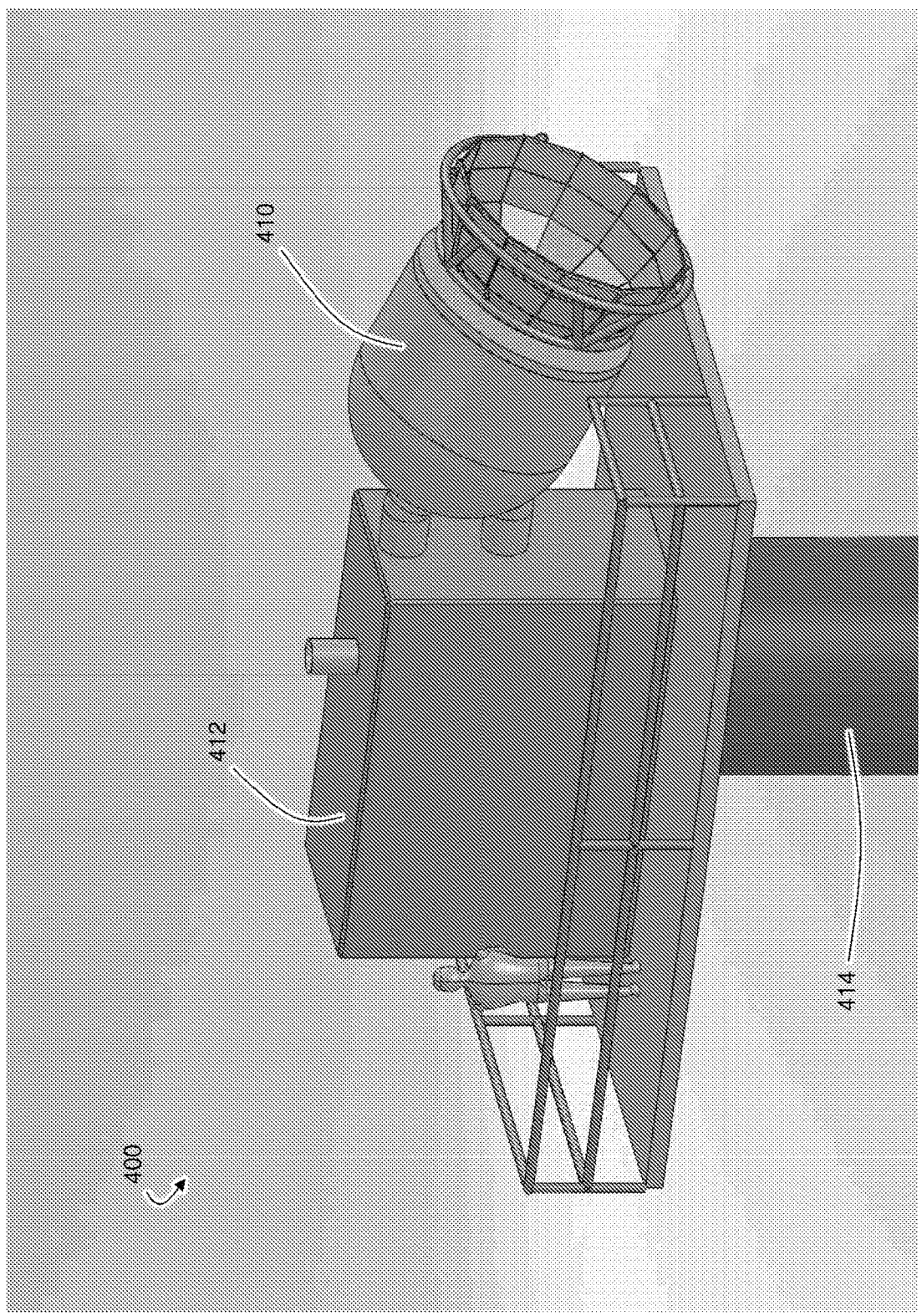
FIGS. 4A-4B include, according to one set of embodiments, schematic illustrations of power tower systems.

As noted above, the components of the CSP system can be positioned in various parts of a solar power tower. FIG. 4A includes a schematic illustration of one set of power tower embodiments. The system 400 in FIG. 4A includes solar receiver 410 fluidically connected to turbine package 412, which can include a gas turbine and a compressor. In this embodiment, the turbine package 412 is made as a single modular unit that can be completely assembled at a factory, shipped to an operation site (e.g., by truck or railroad car), and placed (e.g., by crane) onto a tower structure 414. The turbine package 412 may include not only a compressor and gas turbine, but also a heat exchanger, or recuperator, unit, an electric generator and related power electronics, a supplemental heater and/or control valves and other components to control the operation of one or more portions of the power generation system. The turbine package 412 may be made and shipped as a single unit with the receiver 410 (which in this embodiment also includes the secondary collector), or the package 412 and receiver 410 may be made as separate modular units and assembled together on the tower structure 414 at the operation site. By making turbine and receiver sections in a modular arrangement, manufacturing of the modular units may be made more efficient. That is, the turbine package 412 and receiver 410 may be made in a factory setting, with skilled technicians building and testing the package 412 and receiver 410 before being sent to an operation site. The package 412 and receiver 410 may be tested in real conditions, e.g., on a tower or other structure that received sunlight from a heliostat field, or in more artificial conditions. For example, the turbine package 412 may be tested by supplying heated air or other fluid to the package 412 that is heated by fuel combustor or other suitable arrangement. Similarly, the receiver 410 may be tested by illuminating the receiver 410 with artificial light or other radiation that does not originate from a heliostat field. In this way, the package 412 and receiver 410 may be tested individually, or as a functioning whole, under different conditions (such as low light levels, high light levels, high and/or low ambient temperature conditions, high and low power output conditions, etc.) As a result, steps may be taken to help ensure that fully functioning turbine package 412 and/or receiver 410 units are shipped to an operation site.

In some embodiments, one or more thermal storage units can be incorporated as part of a tower structure 414 which can, for example, allow for relatively easy assembly and further reduce the overall cost of the CSP system. For example, thermal storage media can be stored within tower structure 414, which can serve as the thermal storage unit. For example, in the set of embodiments illustrated in FIG. 4A, tower structure 414 can be filled with thermal storage medium and provide thermal storage capability for system 400. In another embodiment, the tower structure 414 may be arranged to house one or more thermal storage tanks like that shown in FIGS. 3A-3C. If two or more tanks are provided, the tanks may be stacked within the tower structure 414. Arranging the tanks within the tower structure 414 may provide different features such as reducing the overall footprint of the power generating unit, providing additional thermal cover for the tanks, and/or enhancing the strength of the tower structure 414. For example, the tanks may be incorporated into the tower structure 414 so as to not only provide thermal storage, but also provide structural support for the tower structure 414. Like the receiver 410 and turbine package 412, the energy storage tanks and/or tower structure 414 may be made in one or more modular units that are shipped to an operation site and assembled together.

Figure 4B:
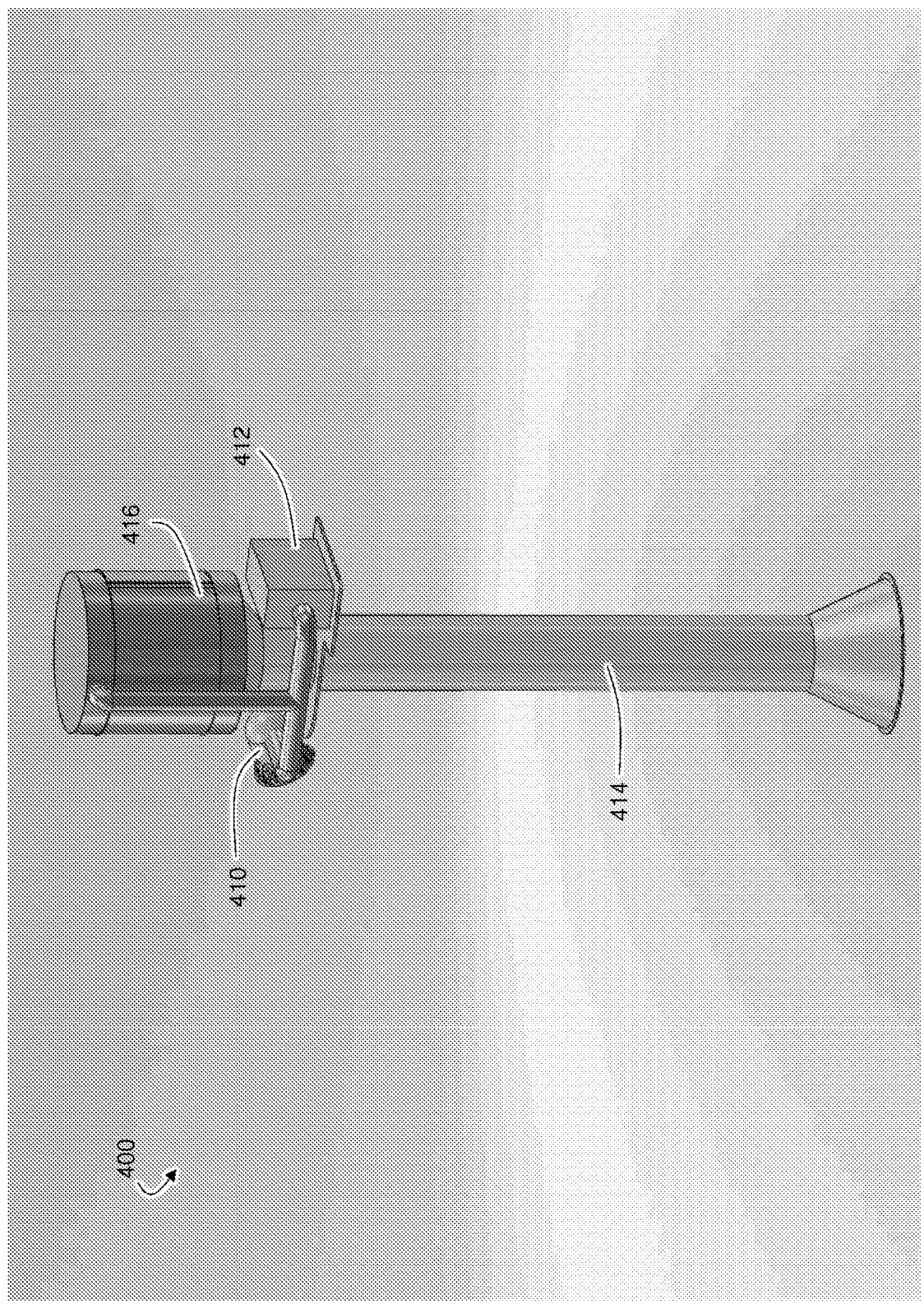

FIG. 4B illustrates another set of embodiments that includes thermal storage unit 416, independent of tower structure 414. That is, in this embodiment, a thermal storage tank 416 is mounted to the top of the tower structure 414 with the receiver 410 and turbine package 412. The receiver 401, turbine package 412 and tank 416 may be made as a single modular unit that may be manufactured at a factory and shipped (e.g., by truck or railcar) to an operation site and placed on top of a tower structure 414, or the receiver 410, turbine package 412 and/or tank 416 may be made as separate modular units. A modular structure may significantly reduce assembly costs at the operation site, e.g., because the receiver 410, turbine package 412 and tank 416 may be placed by crane on the tower structure 414 and be ready for operation with only relatively minimal assembly at the operation site. For example, if made as a single unit, placement of the receiver 410, turbine package 412 and tank 416 may require only electrical power hookups and connection to the tower 414 for the system to be ready for energy generation.

One advantage provided by aspects of the invention relates to the decreased overall weight of the power generation system, e.g., including the receiver 410 and turbine package 412 of FIG. 4A. In one set of embodiments, the total weight of the receiver 410 and turbine package 412 may be approximately 50 tons per MWe power output. For example, a 1 MWe system may have the receiver 410 and turbine package 412 weigh approximately 100,000 pounds (or 50 tons). Of course, the weight of the components may vary depending on a variety of factors, and thus the weight per MWe power output may vary from about 25 to 100 tons/MWe or more. (It is envisioned that tower-based solar power generation system according to aspects of the invention may be constructed for power output ranging from about 100 kWe to 5 MWe. Of course, smaller and larger output systems are possible, but may not be economically feasible (e.g., small output systems may not be economically justify installation costs) or technically feasible (e.g., large output systems may have receiver and turbine package weights that are too large for sensible tower deployment.)

Although the embodiments shown in FIGS. 4A and 4B show the receiver 410, turbine package 412 and/or tank 316 arranged in a modular format, the various components of the power generation system need not be arranged in modular units. Instead, in some embodiments, the individual pieces of the system (such as a gas turbine, compressor, recuperators, receiver, collector, etc.) may be assembled in place on the tower. Thus, aspects of the invention are not necessarily limited to modular arrangements of components that are attached to a tower structure 414.

As mentioned above, in some embodiments, the power generation system can include a solar receiver operating at a relatively high pressure (e.g., above 2 atmospheres, at least about 3 atmospheres, at least about 4 atmospheres, at least about 5, at least about 10, or at least about 15 atmospheres) in place of or in addition to the solar receiver operating at a relatively low pressure.

Figure 5:
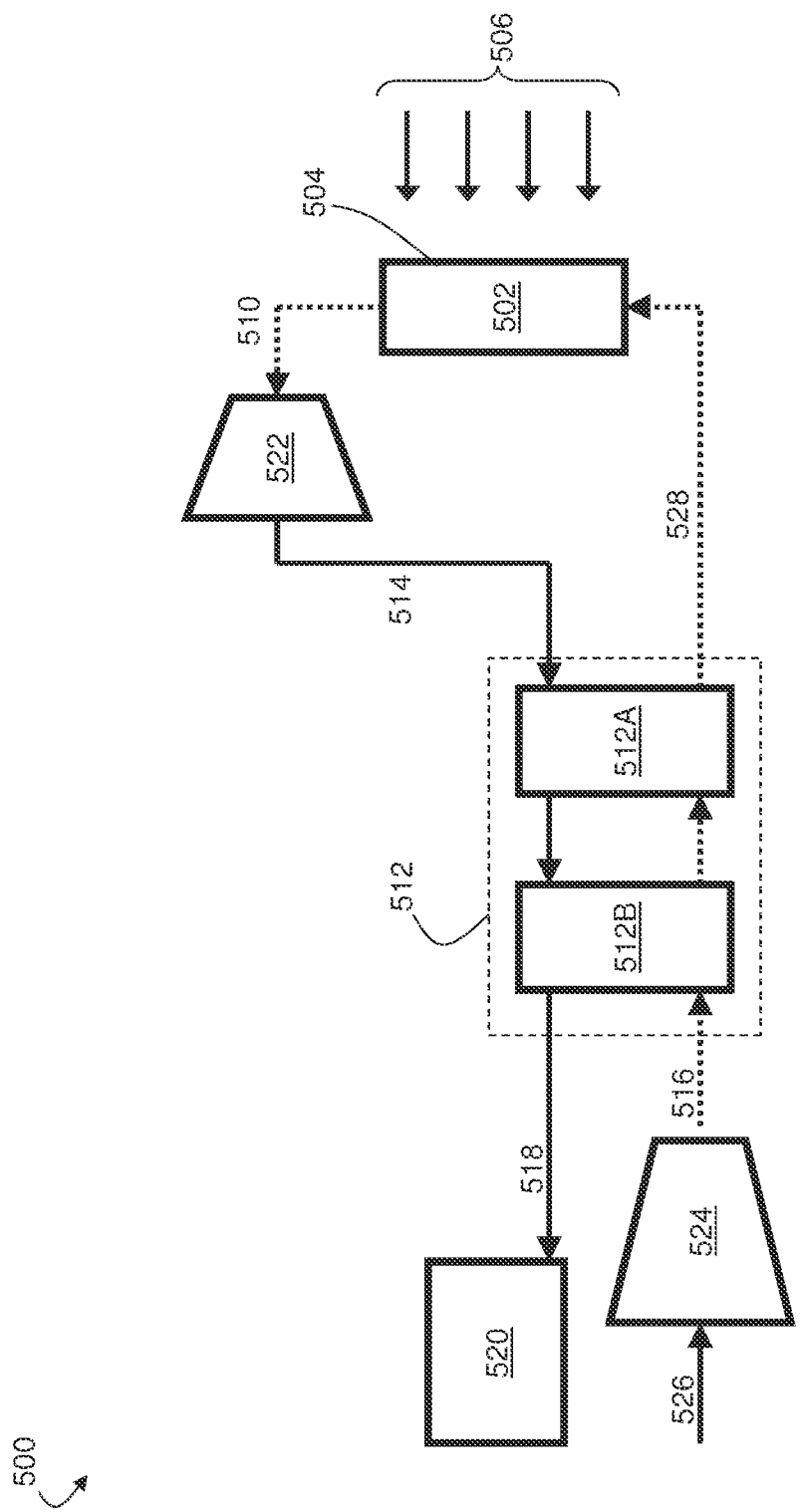
FIG. 5 includes an exemplary schematic diagram of a concentrated solar power generation system including a high pressure solar receiver.

FIG. 5 includes an exemplary schematic diagram of a concentrated solar power generation system 500 including a high pressure solar receiver. In FIG. 5, fluid stream 526 (e.g., comprising ambient air) is fed to compressor 524, where it is compressed to a relatively high pressure. High pressure stream 516 from compressor 524 is then fed to heat exchange system 512, which can comprise one or more heat exchangers. In the set of embodiments illustrated in FIG. 5, two heat exchangers (512A and 512B) are shown, although in other embodiments a single heat exchanger or more than two heat exchangers may be used. For example, in some cases, a single rotary heat exchanger (e.g., a ceramic rotary heat exchanger, a metal rotary heat exchanger) can be used in heat exchange system 512. In other cases, two or more rotary heat exchangers (e.g., ceramic rotary heat exchangers, metallic rotary heat exchangers, or combinations of the two) can be used in heat exchange system 512.

In the set of embodiments illustrated in FIG. 5, heated high pressure stream 528 from heat exchange system 512 is transported to high pressure solar receiver 502, where it is further heated via incident solar radiation 506 passed through surface 504. High pressure, high temperature stream 510 is then transported to turbine 522 (e.g., a gas turbine, which can be part of a Brayton cycle), where the stream is used to produce power. Exhaust stream 514 from gas turbine 522 can be transported to heat exchange system 512, where the residual heat in the stream can be used to pre-heat the compressor exhaust stream 516. Exhaust stream 518 can, in some cases, be used to provide energy to a heat recovery system 520, which can comprise any of the components described above in relation to heat recovery system 120. The high pressure receiver system outlined in FIG. 5 can be useful, for example, in embodiments in which a single crystal nickel receiver is employed.

Figure 6:
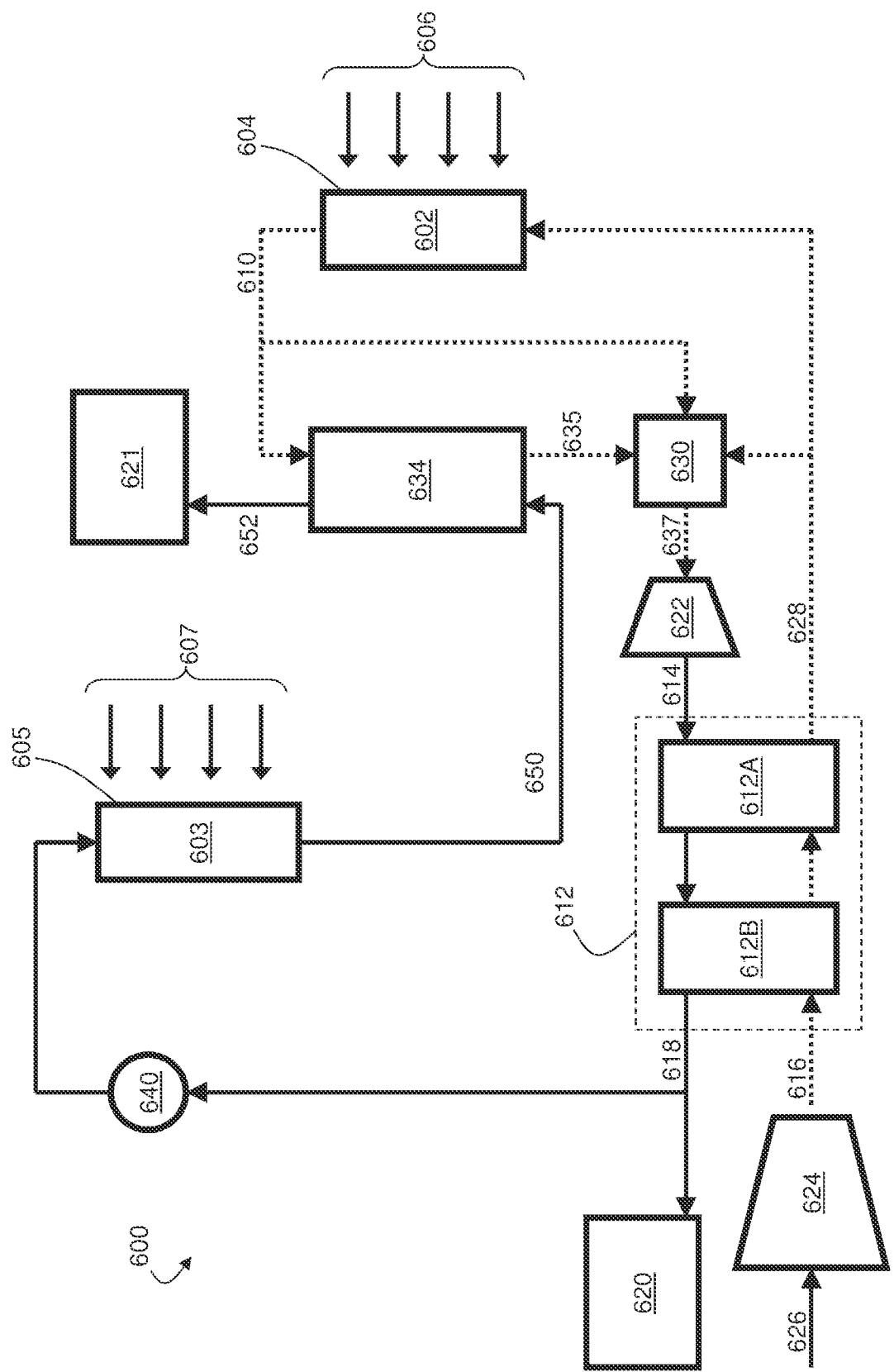
FIG. 6 includes a schematic diagram of a concentrated solar power generation system including multiple solar receivers, according to some embodiments.

FIG. 6 includes an exemplary schematic illustration of a power generation system 600 in which two solar receivers are employed. In the set of embodiments illustrated in FIG. 6, fluid stream 626 (e.g., comprising ambient air) is fed to compressor 624, where it is compressed to a relatively high pressure. High pressure stream 616 from compressor 624 is then fed to heat exchange system 612, which can comprise one or more heat exchangers. In the set of embodiments illustrated in FIG. 6, two heat exchangers (612A and 612B) are shown, although in other embodiments a single heat exchanger or more than two heat exchangers may be used. For example, in some cases, a single heat exchanger (e.g., a rotary heat exchanger such as a ceramic rotary heat exchanger or a metal heat exchanger, or any other type of high temperature heat exchanger) can be used in heat exchange system 612. In other cases, two or more heat exchangers (e.g., two or more rotary heat exchangers such as ceramic rotary heat exchangers or metallic heat exchangers, or combinations of the two, or two or more of another type of high temperature heat exchanger) can be used in heat exchange system 612.

In FIG. 6, a portion of heated high pressure stream 628 from heat exchange system 612 is transported to high pressure solar receiver 602, where it is further heated via incident solar radiation 606 passed through surface 604. In some cases, a portion of high pressure stream 628 can be transported to combustor 630, where it can be further heated. A portion of high pressure, high temperature stream 610 exiting the high pressure solar receiver 602 can be transported to combustor 630, where it can be further heated, if necessary.

In some cases, at least a portion of high pressure, high temperature stream 610 exiting the high pressure solar receiver 602 can be transported to a thermal storage system 634. Stream 610 can be used to deliver energy to the thermal storage system, in some embodiments. In some cases, thermal storage system 634 can absorb heat from a low pressure stream exiting low pressure solar receiver 603, described in more detail below. In some such cases, a high pressure, high temperature stream 635 exiting thermal storage system 634 can be transported to combustor 630, where it can be optionally further heated. The fluid streams transported to combustor 630 can be subsequently transported to gas turbine 622 via stream 637, where they can be used to generate power.

The turbine exhaust stream 614 can be transported to heat exchange system 612, where the residual heat can be used to pre-heat compressor exhaust stream 616 before it is transported to high pressure solar receiver 602. In some cases, a portion (or all) of the exhaust stream 618 from heat exchange system 612 can be transported to a second, low pressure solar receiver 603 (in some cases, via optional blower 640). The fluid within the low pressure solar receiver 603 can be heated via incident solar radiation 607 transmitted through surface 605. The low pressure receiver exhaust stream 650 can be transported to thermal storage system 634, where it can be used to supply heat (which can be used, for example, to heat all or part of high pressure solar receiver exhaust stream 610). The low pressure stream 652 exiting thermal storage system 634 can be used, in some embodiments, within thermal recovery region 621, which can include any of the components described above in relation to heat recovery system 120.

In some cases, the thermal storage system can include a first portion constructed and arranged to be operated at a relatively high pressure (e.g., at least about 3, at least about 4, at least about 5, at least about 10, or at least about 15 atmospheres), and a second portion constructed and arranged to be operated at a relatively low pressure (e.g., equal to or less than about 2, less than about 1.5, less than about 1.25, or less than about 1.1 atmospheres, less than about 1 atmosphere, between about 0.9 and about 2 atmospheres, between about 0.9 and about 1.5 atmospheres, between about 0.9 and about 1.25 atmospheres, between about 0.9 and about 1.1 atmospheres, or between about 0.9 and about 1 atmosphere). For example, in the set of embodiments illustrated in FIG. 6, thermal storage system 634 includes a first portion constructed and arranged to handle the flow of low-pressure stream 650 and a second portion constructed and arranged to handle the flow of high-pressure stream 610.

In some embodiments, a portion of exhaust stream 618 from heat exchange system 612 can be transported to thermal recovery region 620, which can include any of the components described above in relation to heat recovery system 120.

Many of the components illustrated in the figures are fluidically connected. As a specific example, receiver 102 and heat exchange system 112 in FIG. 1C are illustrated as being directly fluidically connected. In addition, in FIG. 1C, heat recovery system 120 and gas turbine 122 are illustrated as being fluidically connect (although not directly fluidically connected). Two components are said to be "fluidically connected" when they are constructed and arranged such that a fluid can flow between them. In some cases, two components can be "directly fluidically connected," which is used to refer to a situation in which the two components are constructed and arranged such that a fluid can flow between without being transferred through a unit operation constructed and arranged to substantially change the temperature and/or pressure of the fluid. One of ordinary skill in the art would be able to differentiate between unit operations that are constructed and arranged to substantially change the temperature and/or pressure of a fluid (e.g., a compressor, a condenser, a heat exchanger, etc.) and components are not so constructed and arranged (e.g., a transport pipe through which incidental heat transfer and/or pressure accumulation may occur). It should be understood that, while two components might be illustrated as being directly fluidically connected in the figures, other embodiments can include arrangements in which they are fluidically connected but not directly fluidically connected.

In some embodiments, solar receivers, such as those shown in FIGS. 7A-D, are designed and constructed to be used in conjunction with the power generation systems provided herein. The exemplary solar receivers in FIGS. 7A and 7B comprise a low pressure fluid chamber 700 that is designed and constructed to provide an insulated casing 700, which acts to reduce or eliminate thermal losses from the solar receiver and to contain a low pressure working fluid. The low pressure solar receivers comprises a transparent object 703 positioned at the front of the low pressure fluid chamber 700 adjacent to the opening 708 for receiving solar radiation.

Figure 7A:
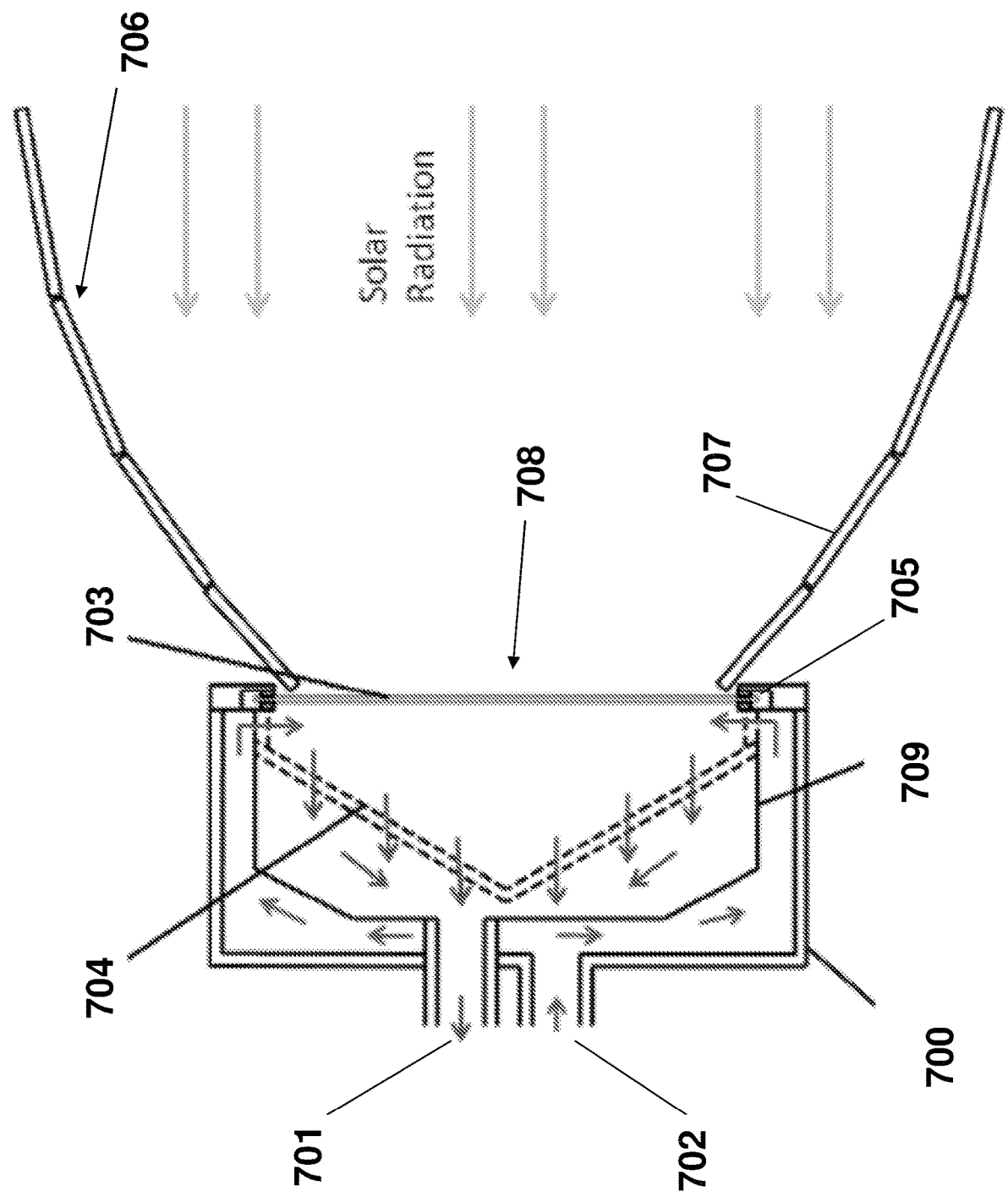
Figure 7B:
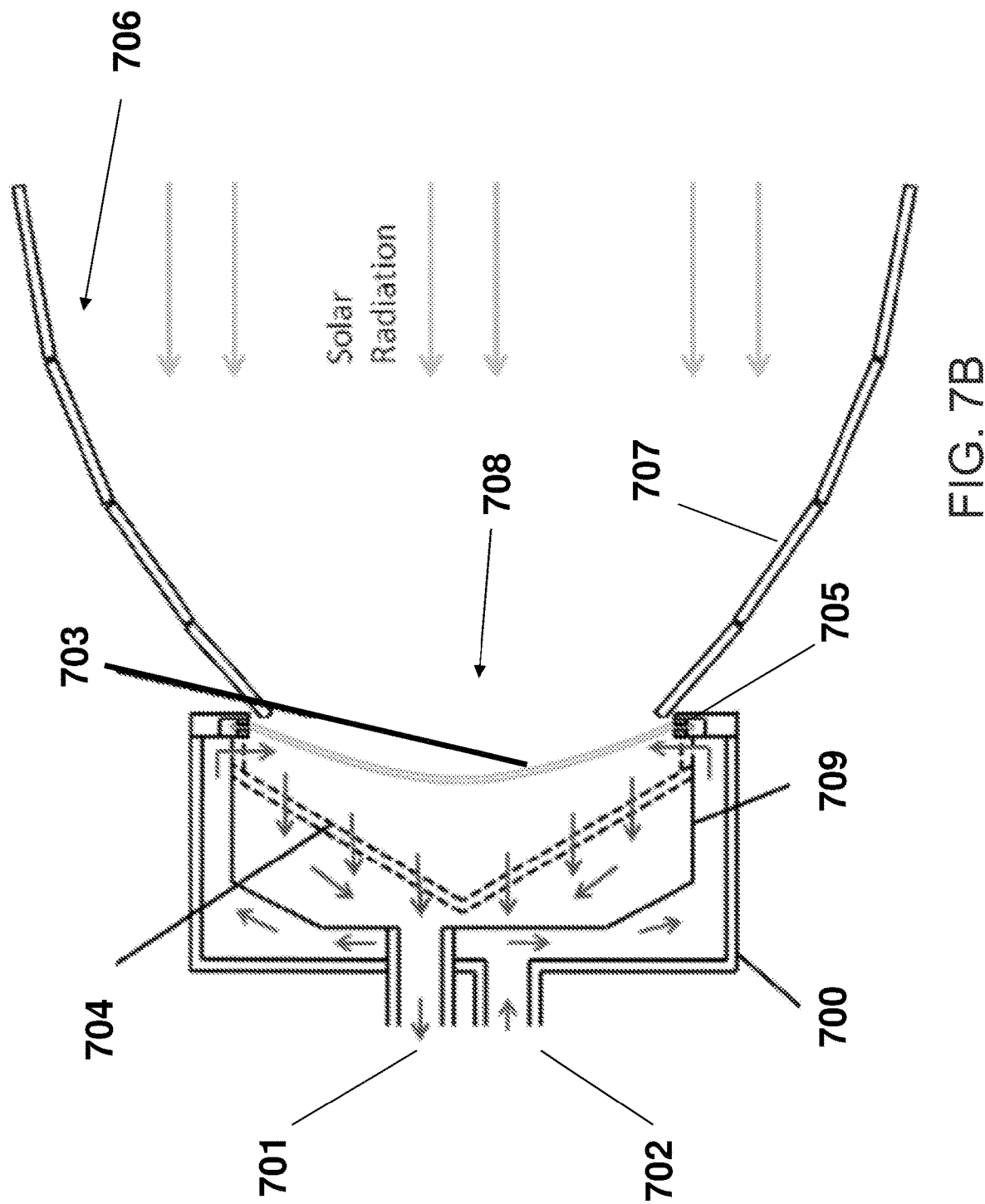

In the embodiments depicted in FIGS. 7A and 7B, a fluid path is defined within the low pressure fluid chamber 700, such that a relatively low temperature working fluid (e.g., a fluid having a temperature in a range of 300° C. to 800° C.) entering the fluid inlet 702 at the rear of the receiver, passes through the receiver around the periphery of a liner into a front region of the fluid chamber 700 and across the transparent object 703 (e.g., a window). By passing across the transparent object 703, the relatively low temperature working fluid acts, in part, to cool the transparent object 703, which is heating, in part, by incident solar radiation and thermal radiation from a solar absorber 704. The relatively low temperature working fluid passes through the solar absorber 704 wherein it is further heated by the solar absorber 704. Within the solar absorber the relatively low temperature working fluid is converted to a relatively high temperature working fluid (e.g., a fluid having a temperature in a range of above 800° C. to 1200° C.). The relatively high temperature working fluid exits the low pressure fluid chamber 700 through a fluid outlet 701. After leaving the solar receiver, in some embodiments, the relatively high temperature working fluid is directed to a gas turbine system, a thermal storage system (e.g., a sensible heat storage system), or other thermal energy system, as is exemplified elsewhere herein.

Typically, a solar absorber, such as that depicted in FIG. 7A, is constructed of a material that can withstand relatively high temperatures (e.g., temperatures in excess of 1000° C.) and that has sufficient thermal properties (e.g., thermal conductivity, emissivity) to absorb thermal energy from incident solar radiation and transfer thermal energy to a working fluid passing within the solar receiver. In some cases, the solar absorber is constructed of a material such as a metal, (e.g., high-temperature alloy, heat resistant cast alloy), a refractory material (e.g., a ceramic) or a carbon-based material. The solar absorber is often constructed of a ceramic material such as a glass ceramic, silicon carbide, silicon nitride, alumina, or silicon oxide.

The solar absorber 704 of a low pressure receiver, such as that depicted in FIG. 7A, typically has a high surface area to facilitate the transfer of thermal energy to a working fluid passing within the solar receiver. The solar absorber 704, in some embodiments, is designed and constructed to have a network (e.g., a honeycomb network, a shell and tube network, a foam network, etc.) of fluid passages through which the working fluid passes. The solar absorber 704 is immobilized within the low pressure chamber such that a relatively low temperature working fluid traveling within the fluid flow path of the low pressure chamber 700 is directed to enter the solar absorber 704, passing through the network of fluid passages of the solar absorber 704, wherein the working fluid acquires heat from the solar absorber 704.

While the solar absorber 704 depicted in FIGS. 7A and 7B has an angular shape, the solar absorbers are not so limited and other suitable shapes may be constructed and used with the solar receivers disclosed herein. For example, a solar absorber may have a planar shape, an elliptical shape, a parabolic shape, a disc shape, a polyhedron shape or other suitable shape.

The transparent object 703 of the solar receiver depicted in FIG. 7A is positioned at the front of the low pressure fluid chamber 700 adjacent to the opening 708 for receiving solar radiation. The outer rim of the transparent object 703 is fitted within a recess 705 of the low pressure fluid chamber 700. The transparent object 703 and the low pressure chamber 700 are typically constructed of materials having different coefficients of thermal expansion. For example, the transparent object 703 is typically constructed of a glass material (e.g., silica, quartz, etc.), whereas the low pressure chamber 700 is typically constructed of a metal (e.g., stainless steel, aluminum). When the transparent object 703 and low pressure chamber 700 are subjected to thermal fluctuations, such as those which occur between activity and lack of activity of the solar receiver, there is often differential thermal expansion and contraction of the two components. Thus, the connection between the transparent object 703 and the low pressure fluid chamber 700 must typically be designed and constructed to accommodate differential movement between the two components.

In some embodiments, a flexible seal is provided between an interface on the low pressure fluid chamber 700 and the transparent object 703. The interface may be within a recess 705 within which the transparent object 703 is positioned and/or secured. The recess 705 may have an internal diameter that exceeds the outside diameter of the transparent object 703, thereby allowing expansion of the transparent object 703 within the recess 705. The seal is often subjected to relatively high temperatures (e.g., temperatures in excess of 500° C.), and thus, is typically produced from a material that can withstand relatively high temperatures. The seal may be produced, in some embodiments, from a metal, a carbon-based material, or a silicone-based material. In some embodiments, the seal is produced from a room-temperature vulcanizing (RTV) silicone elastomer. In some embodiments, the seal is a metallic gasket. Other appropriate seal materials will be apparent to the skilled artisan.

The low pressure fluid chamber 700, in certain embodiments, is designed and constructed to have a maximum allowable working pressure of up to and including 2 atmospheres. The low pressure fluid chamber 700, in certain embodiments, is designed and constructed to have a maximum allowable working pressure of 1 atmosphere, 1.1 atmospheres, 1.2 atmospheres, 1.3 atmospheres, 1.4 atmospheres, 1.5 atmospheres, or 2 atmospheres. As used herein, the term "maximum allowable working pressure" refers to the maximum pressure a pressure vessel can maintain, e.g., the maximum pressure that the weakest component of an assembled solar receiver can maintain. Often the maximum allowable working pressure is determined by conducting a hydrostatic pressure test. Methods for conducting a hydrostatic pressure test are well known in the art and will be apparent to the skilled artisan. In one embodiment, the maximum allowable working pressure of a solar receiver is determined by essentially completely assembling the solar receiver, capping off the fluid inlet(s) and the fluid outlet(s), and pressurizing the low pressure chamber of the solar receiver with an inert gas, e.g., air. The low pressure chamber is pressurized, in this embodiment, with the inert gas at a relatively slow rate, e.g., at a rate in a range of 1 psi/second to 5 psi/second, until the low pressure chamber can no longer maintain pressure. The highest pressure maintained during the test is the maximum allowable working pressure of the solar receiver. In certain embodiments, the weakest component of the solar receiver, such as the solar receiver depicted in FIG. 7A, is the seal between the transparent object and the low pressure chamber.

As illustrated by FIGS. 7A and 7B, the transparent object 703 may have a variety of shapes. For example, the transparent object 703 may have a planar shape (as depicted in FIG. 7A) such as a planar disc or a planar object having a polygonal cross-section such as a rectangular or square cross-section. The transparent object may have a relatively slight curvature inward (as depicted in FIG. 7B) toward the solar absorber. The transparent object may have a semi-circular shape, a parabolic shape, an elliptical shape, etc. In some embodiments, a curvature inward toward the solar absorber serves to minimize tensile stress due to thermal expansion in the transparent object. Thus, in certain embodiments, the transparent object has a certain radius of curvature. The transparent object may, for example, have a radius of curvature of 1 foot to 50 feet, 1 foot to 10 feet, 1 foot to 5 feet or 1 foot to 2 feet. The transparent object may have a radius of curvature of up to 1 foot, 2 feet, 3 feet, 4 feet, 5 feet, 10 feet, 25 feet, 50 feet, or more.

Figure 7C:
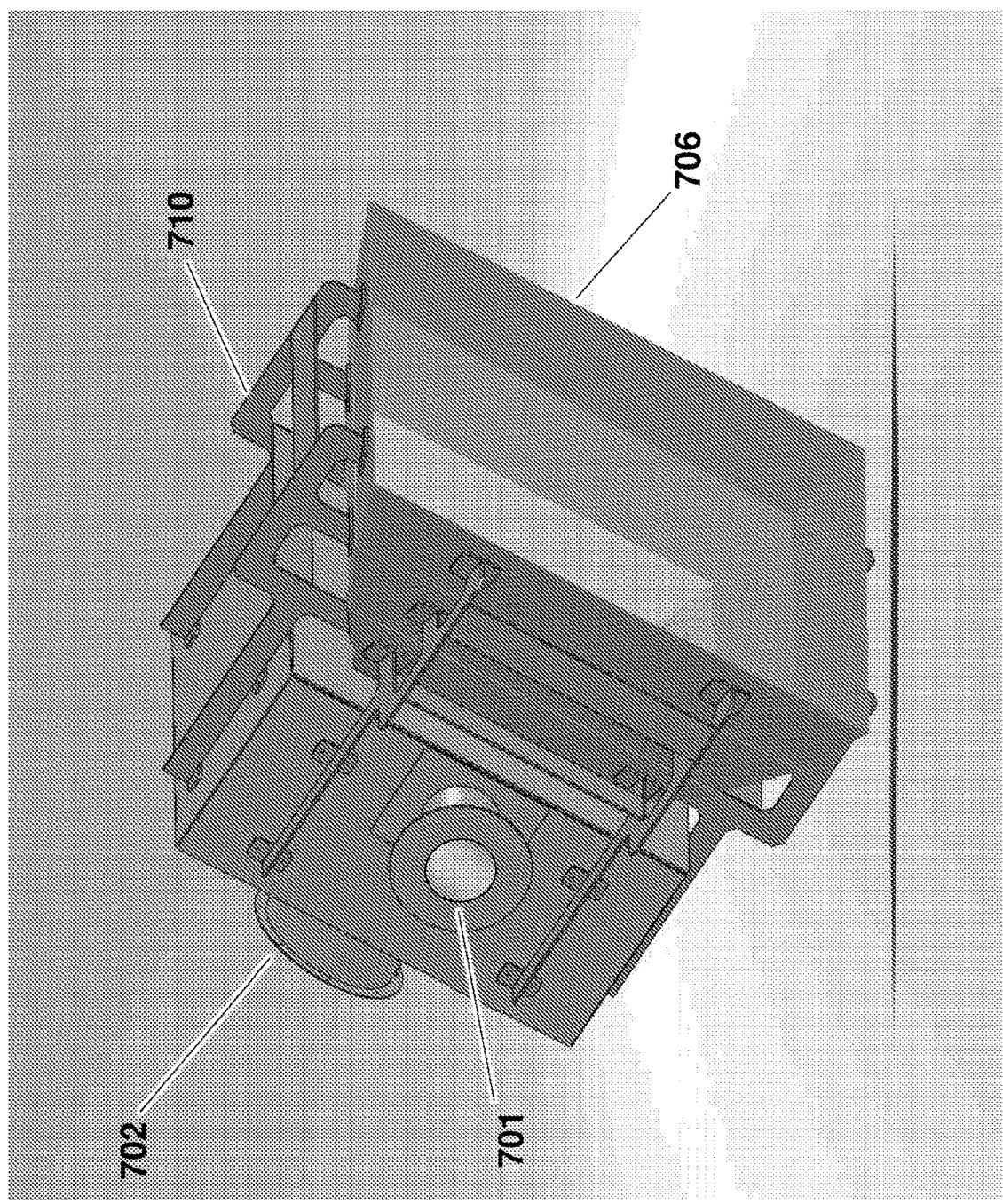

The solar receivers depicted in FIGS. 7A-7C operate at low pressure (e.g., up to and including 2 atmospheres). Because the transparent object 703 is subjected to relatively small hydrostatic stresses under normal operation, it may be constructed to have a relatively large diameter and relatively small thickness. In some embodiments, the transparent object has a diameter in a range 0.5 meter to 5 meters, 2 meters to 4 meters or 0.5 meter to 2 meters. In some embodiments, the transparent object has a diameter of 0.5 meter, 1 meter, 1.2 meters, 1.4 meters, 1.6 meters, 1.8 meters, 2 meters, 3 meters, 4 meters, 5 meters or more. In some embodiments, the diameter of a transparent object (e.g., a transparent object that has a certain radius of curvature) is the diameter of the rim of the transparent object (e.g., the edge of the transparent object 703 that fits with a recess 705 of the low pressure chamber 700).

The thickness of the transparent object 703 may influence the extent to which the transparent object 703 absorbs solar radiation, with relatively thick transparent objects typically absorbing more solar radiation than relatively thin transparent objects. Consequently, the thickness of the transparent object influences the extent to which the transparent object is subjected to thermal stress during operation of the solar receiver. It is therefore often desirable for the transparent object to have a relatively small thickness, in order to minimize thermal stress. In some embodiments, the thickness of the transparent object is in a range of 0.25 inch to 4 inches, 0.5 inch to 2 inches, or 0.5 inch to 1 inch. In some embodiments, the thickness of the transparent object is 0.25 inch, 0.5 inch, 1 inch, 1.5 inch, 2 inches, 3 inches, 4 inches or more. However, the invention is not limited to transparent objects having these thicknesses. Other thicknesses may be suitable in some cases.

The solar absorber is typically constructed of a material that can withstand relatively high temperatures, that can absorb incident radiation and that can readily transfer thermal energy to a working fluid that is in contact with the absorber. For example, solar absorbers may be constructed of a metals, stainless steels, ceramics, heat-resistant cast alloys, high temperature metallic materials, refractory materials, thoria-dispersed alloys, graphite, or carbon-fiber-reinforced carbon-based materials. Appropriate ceramics for solar absorbers include, for example, glass ceramics, silicon carbide, silicon nitride, alumina, and silicon oxide. The solar absorber may have any of a variety of forms. Typically, the solar absorber is designed and constructed to have a relatively high surface area for contact with a working fluid. The solar absorber typically comprises a plurality of channels or passages through which a working fluid may pass. In passing through the fluid channels or passages of the solar absorber, the working fluid acquires thermal energy through contact with the absorber. The absorber may have a wire mesh, honeycomb or foam configuration, for example. Often, the solar absorber comprises a black surface coating, covering at least a portion of the absorber surface, to facilitate absorption of incident solar radiation. In some embodiments of the foregoing solar receivers, the solar absorber is a combination of both a wire mesh absorber and a ceramic absorber. In such embodiments, the wire mesh absorber can be the air inlet absorber and the ceramic absorber can be the air exit absorber. In other embodiments, the ceramic absorber can be the air inlet absorber and the wire mesh absorber can be the air exit absorber.

In some embodiments of the solar receivers, the multiple segments of the solar absorber are held in position by a ceramic support structure system. In some embodiments of the solar receivers, flow-regulation structures are placed on the air inlet and/or outlet/exit side of the absorber. In some embodiments, the flow-regulation structure is an orifice plate having one or more orifices through which air may pass. In some embodiments of the foregoing solar receivers, the flow-regulation structures are made of ceramic, metal or other suitable material in which small holes are present for the passage of air. In some embodiments, the flow-regulation structure is configured to produce a relatively laminar air flow. In some embodiments, the flow-regulation structure is configured to direct air flow in a relatively uniform manner across an absorber.

The low pressure solar receivers depicted in FIGS. 7A-7B are fitted with a secondary concentrator 706. The secondary concentrator 706 serves to collect concentrated solar radiation from a primary concentrator, e.g., a heliostat field, or other source, and direct that solar radiation into the opening 708 of the solar receiver. The secondary concentrator 706, in some embodiments, improves the solar collection efficiency of the solar receiver. The second concentrator 706 is often constructed with a plurality of reflective panels 707, each reflective panel typically having a reflective surface and a predetermined shape. The plurality of reflective panels 707 are typically arranged in a configuration that facilitates reflection of incident solar radiation toward the receiver opening 708. In some embodiments, the plurality of reflective panels are arranged such that the secondary concentrator has an overall parabolic shape, although other shapes may be suitable. For example, the secondary concentrator may have an elliptical shape, a semi-circular shape, a hyperbolic shape, etc.

A cross-section of the secondary concentrator that is parallel with the opening of the receiver may also have a variety of shapes. For example, the cross-section of the secondary concentrator that is parallel with the opening of the receiver may have a circular shape, an elliptical shape, a polygonal shape, a rectangular shape, etc.

The size and shape of the secondary concentrator 706 (e.g., the diameter of the outer most portion of the secondary concentrator, the depth of the secondary concentrator, etc.) may vary depending on a variety of factors, including, for example, the desired collection efficiency, the size and arrangement of the primary concentrator(s), the size of the opening of the receiver, the thermal properties of the solar absorber, etc. In some embodiments, the ratio of the depth of the secondary concentrator to the diameter of the opening of the receiver is 1, 1.25, 1.5, 2, 2.5, 3, 4, 5, or more. In some embodiments, the ratio of the depth of the secondary concentrator to the diameter of the opening of the receiver is in a range of 1 to 1.5, 1 to 2.5, 1 to 3, 1 to 4, or 1 to 5. In some embodiments, the ratio of the outer most diameter of the secondary concentrator to the diameter of the opening of the receiver is 1.5, 2, 2.5, 3, 3.5, 4, 4.5, 5.5, 6 or more. In some embodiments, the ratio of the depth of the secondary concentrator to the diameter of the opening of the receiver is in a range of 1.5 to 2, 1.5 to 3, 1.5 to 4, 1.5 to 5, or 1.5 to 6.

FIG. 7C depicts an exemplary solar receiver having a fluid inlet 701 and fluid outlet 702 that enter and exit, respectively, the solar receiver on different sides of a low pressure fluid chamber. In this embodiment, the solar receiver is connected to a secondary concentrator 706 that has a rectangularly shaped opening.

Figure 7D:
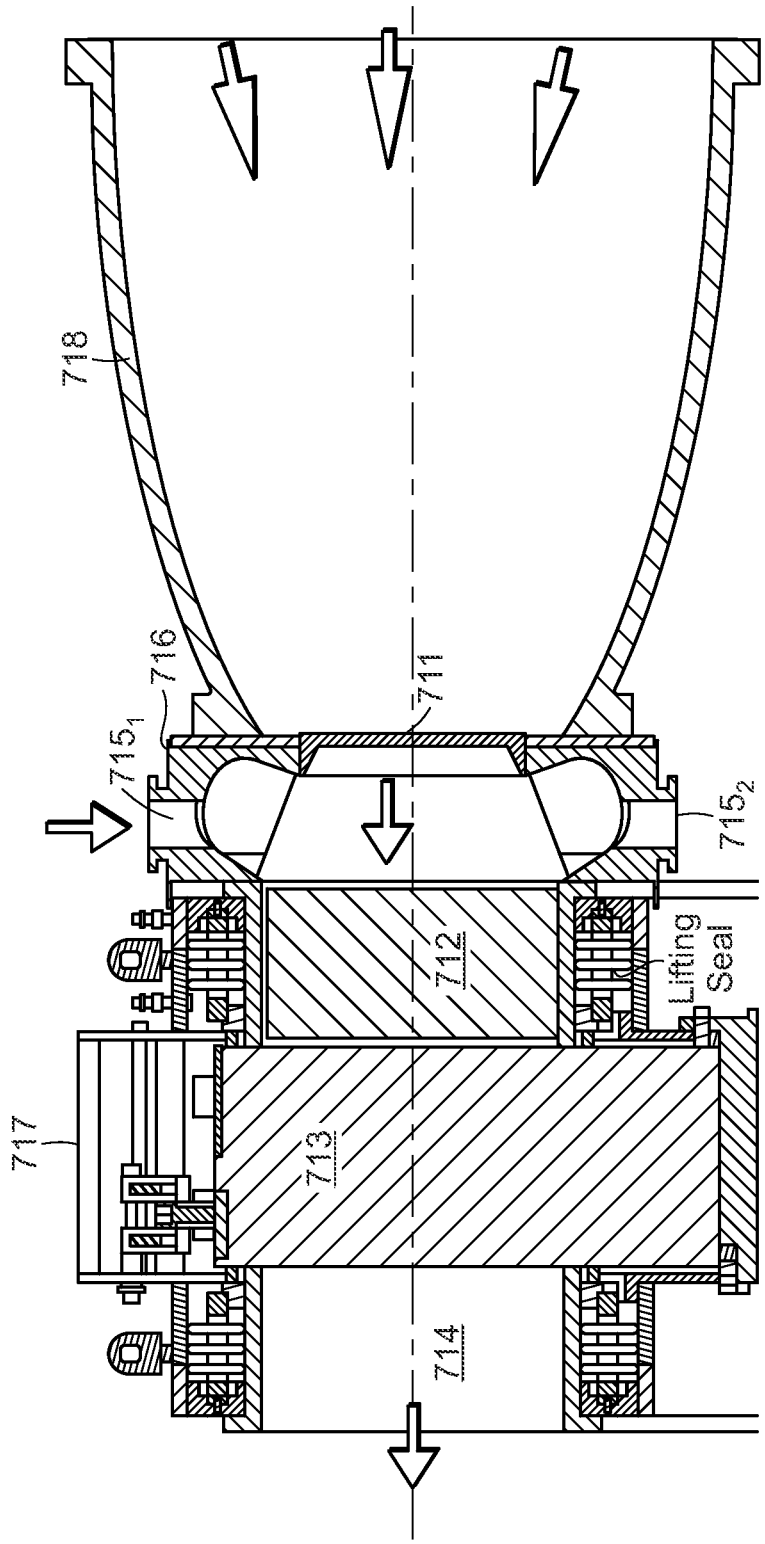

FIG. 7D depicts an exemplary solar receiver having a low pressure fluid chamber 716 comprising one or more fluid inlets $715_{1-2}$ and a fluid outlet 714, a solar absorber 712, and a regenerator structure 717 housing a rotary regenerator matrix 713. In this embodiment, thermal energy from concentrated solar radiation is directed and concentrated, at least in part, by a secondary concentrator 718 into the low pressure fluid chamber 716 through a transparent object 711 and impinges a solar absorber 712 thereby heating the solar absorber 712. The solar absorber 712 transfers thermal energy to a relatively low temperature working fluid passing within the low pressure fluid chamber 716, thereby creating a relatively high temperature working fluid. The relatively high temperature fluid leaving the low pressure fluid chamber passes through a rotary regenerator matrix 713 and transfers thermal energy to the rotary regenerator matrix 713.

The rotary regenerator matrix 713, in FIG. 7D, rotates between two fluidically isolated conduits. The first conduit being a flow path for fluid exiting the low pressure fluid chamber 716 of the solar receiver, and the second conduit being a flow path of a second fluid system. For example, the rotary regenerator matrix 713 may transfer thermal energy from the relatively high temperature fluid leaving the low pressure fluid chamber 716 to a second fluid passing through a conduit adjacent to the receiver that is in fluid communication with the rotary regenerator matrix. The second fluid may be, for example, a fluid, e.g., ambient air, entering the compressor of a gas turbine, or a fluid used to heat a secondary thermal storage material.

Figure 7E:
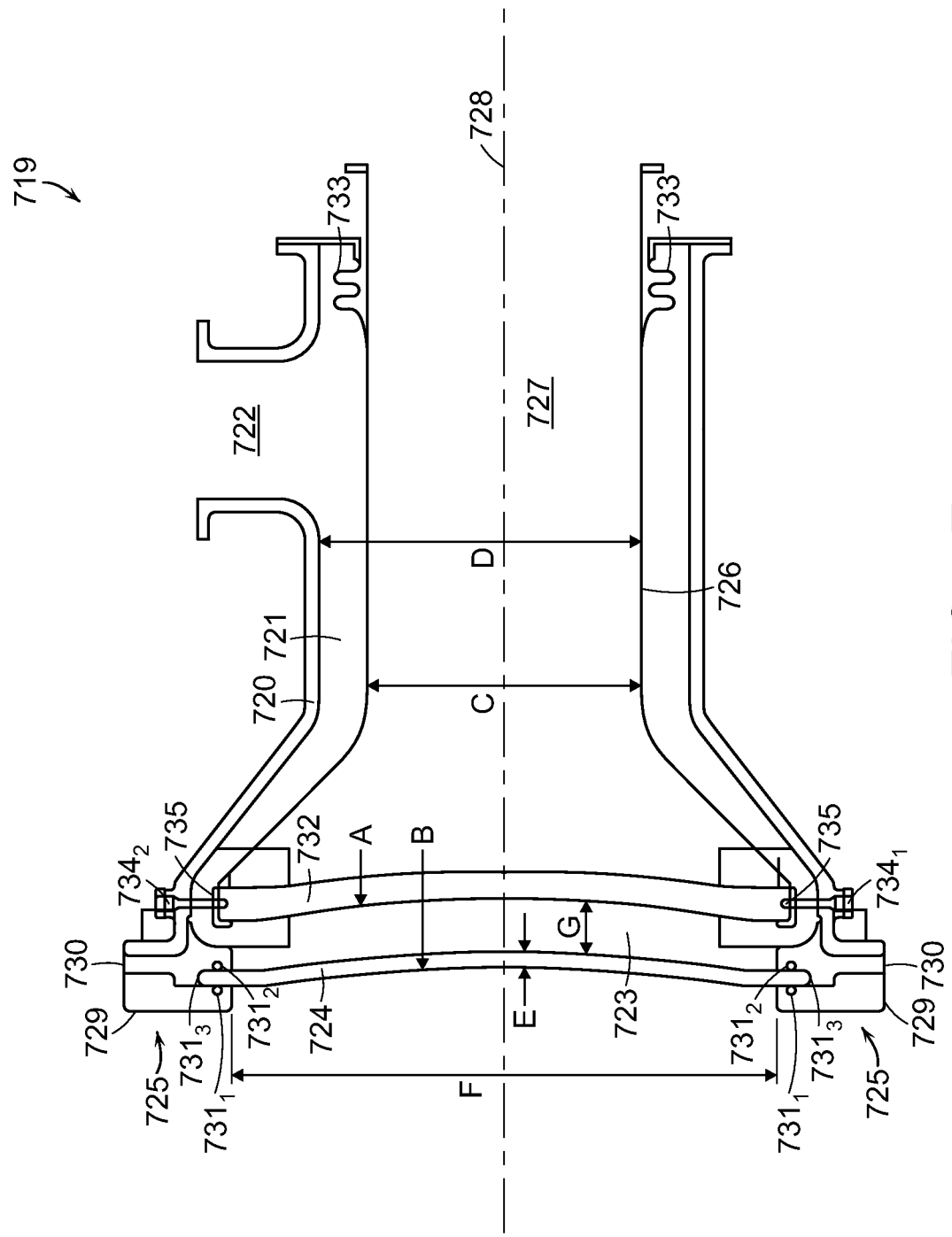

FIG. 7E depicts a cross-sectional view of an exemplary solar receiver 719 that transfers thermal energy from concentrated solar radiation to a low pressure working fluid. The solar receiver 719 includes an outer housing 720 defining a first fluid conduit 721 and a fluid inlet 722. The outer housing 720 further defines an aperture 723 for receiving solar radiation at the front end of the solar receiver 719. A transparent object 724 is connected to the outer housing 720 through a flange assembly 725 at the aperture 723. The solar receiver 719 also includes an inner housing 726 that defines a second fluid conduit 727 and a fluid outlet 728. As described further below, the second fluid conduit 727 is co-axial with the first fluid conduit 721. In addition, a solar absorber 732 is connected to the inner housing 726 at a position in proximity to the aperture 723. While inlet conduits and outlet conduits may be co-axial, it should be appreciated that, in some embodiments, the inlet conduit and outlet conduit are not co-axial.

In an exemplary implementation, concentrated solar radiation is directed to the aperture 723, passes through the transparent object 724 and, after passing through the transparent object 724, and impinges the solar absorber 732, thereby heating the solar absorber 732. The solar receiver 719 defines a fluid path beginning from the fluid inlet 722, traversing forward through the first fluid conduit 721 toward the aperture 723. The fluid traverses across the inner side of the transparent object 724, passes through a plurality of passages in the solar absorber 732, passes through the second fluid conduit 727, and exits the solar receiver 719 through the fluid outlet 728.

In certain embodiments, a fluid inlet 722 is at a position in relative proximity to the transparent object 724 such that fluid enters the receiver in relative proximity to the transparent object 724. When fluid enters the receiver in this manner it can more readily pass through the solar absorber in some configurations, such as, for example, when the receiver has a relatively large diameter.

The fluid inlet 722 may be fluidically connected with a gas turbine exhaust outlet or other working fluid supply conduit, such that a relatively low temperature (e.g., approximately 1100° F.) fluid enters the solar receiver 719. The solar absorber 732 transfers thermal energy to the relatively low temperature fluid as it travels through the plurality of passages in the solar absorber 732, thereby heating the fluid to a relatively high temperature (e.g., approximately 1800° F.). The fluid outlet 728 may be fluidically connected with a gas turbine compressor inlet, a heat storage unit, or other downstream component that uses the relatively high temperature fluid.

The solar receiver 719 includes a flange assembly 725 for connecting the transparent object 724 at the aperture 723. The flange assembly 725 includes an outer flange 729 that is connected to an inner flange 730. The flange assembly 725 is generally composed of materials that are tolerant to operation at relatively high temperatures (e.g., capable of operating at temperatures in the range of 1700 to 2000° F.). Use of a high temperature tolerant materials ensures that the flange assembly 725 will not fail (e.g., melt or degrade) if concentrated solar radiation (e.g., radiation directed to the receiver from a heliostat field) is improperly directed such that excess solar radiation impinges on the flange assembly 725. Moreover, in certain embodiments the flange assembly 725 is composed of materials having thermal properties similar to that of the transparent object 724 to minimize the risk of damage to the flange assembly 725 or transparent object 724 due to differential thermal expansion of the components. For example, if the transparent object 724 is composed of quartz, then it may be advantageous to select materials for the flange assembly 725 that have a similar coefficient of thermal expansion as quartz. Exemplary materials for the flange assembly 725 include, for example, ceramics and other high temperature tolerant materials disclosed herein or otherwise known in the art. The outer flange 729 and inner flange 730 are connected, in the illustrated embodiment, by a plurality of bolts positioned around the flange assembly 725. Flange assembly 725 is also bolted to the outer housing 720. In some configurations, bolts connecting the outer flange 729 and inner flange 730 serve to join the entire flange assembly 725 to the outer housing 720. In other configurations, separate bolts join the flange assembly 725 to the outer housing 720. The holes for bolts joining the flange assembly 725 to the outer housing 720 may be shaped as radial slots to permit differential thermal expansion of the flange assembly 725 and outer housing 720, and to allow for bolt movement within the slots.

The transparent object 724 is connected to the aperture 723 by way of a flange assembly 725. Flexible seals 731$_{1-3}$ are positioned in seal cavities within the flange assembly 725 and provide contact between the flange assembly 725 and transparent object 724 at front, rear and circumferential surfaces of the transparent object 724. The flexible seals 731$_{1-3}$ allow for differential thermal expansion (thermal growth) between the flange assembly 725 and the transparent object 724 in the axial direction (forward and rearward expansion) and radial direction (circumferential expansion). The flexible seals 731$_{1-3}$ prevent direct contact (hard points) between the transparent object 724 and the flange assembly 725 by providing sealing surfaces with relatively low contact stress. The flexible seals 731$_{1-3}$ provide support for the transparent object 724 during operation and shipping, and spread the sealing contact load to enhance component life. The flexible seals 731$_{1-3}$ may be made from ceramic fiber rope or an equivalent sealing material suitable for high temperature operation and for conforming to the dimensions of the seal cavity in the flange assembly 725.

The solar receiver 719 includes a transparent object 724 (which may be referred to as a window) that is composed quartz silica glass. The transparent object 724 may have a curved shaped to contain and distribute internal pressure, and to tolerate thermal stresses from differential temperature exposure. The curved shape of the transparent object 724 also limits the formation of destructively high tensile stresses. The transparent object 724 may be designed to accommodate implementations that give rise to relatively high temperatures at its center portion and relatively cooler temperatures at portions in proximity to the flange. Thus, the transparent object 724 may function in some implementations as a thermal hinge to accommodate thermal growth without developing destructively high tensile stresses. The curved (or bowl shape) of the transparent object 724 in the illustrated embodiment also facilitates, and to an extent directs, flow of a relatively low temperature fluid toward and through the solar absorber 732. The relatively low temperature fluid may also function to cool the transparent object 724 as it passes over the internal surfaces of the transparent object 724.

In some embodiments the transparent object is constructed of one piece, e.g., a single solid quartz silica glass window. However, in other embodiments, the transparent object is constructed of several segments that are fitted together, joined together or butted together. In some embodiments, a transparent object having a diameter in a range of 2 meters to 4 meters, or more, is constructed of multiple segments (e.g., 2, 3, 4 or more segments).

The solar receiver 719 is configured and arranged with coaxial (co-annular) first and second fluid conduits, with the first fluid conduit 721 providing a passage for a relatively low temperature fluid and the second fluid conduit 727 providing a passage for a relatively high temperature fluid that has acquired thermal energy from the solar absorber 732. The solar receiver 719 accommodates a relatively low temperature fluid (e.g., approximately 1100° F.) passing through the first fluid conduit 721 and relatively high temperature fluid (e.g., approximately 1800° F.) passing through the second fluid conduit 727 with minimal insulation, and minimal thermal losses, in certain embodiments. For example, thermal losses from the second fluid conduit 727 are transferred into the first fluid conduit 721 and thus not lost in the overall thermal cycle.

Moreover, the low pressure operation (e.g., operation at up to 1.1 atm) of the solar receiver 719 can allow for the housings that define the first and second fluid conduits 721, 727 to be constructed of light weight and low cost materials, and enable factory fabrication and easy on-site installation. In certain configuration, the outer housing 720 is constructed of materials suitable for operation at temperatures in a range of 1000° F. to 1200° F. (e.g., approximately 1100° F.). For example, the outer housing 720 may be constructed of stainless steel or other similar material. The outer housing 720 may have an external insulation to conserve thermal energy and provide a safe work environment. The inner housing 726 in a typical configuration is constructed of materials suitable for operation at temperatures in a range of 1700° F. to 2000° F. (e.g., approximately 1800° F.). For example, the inner housing 726 may be constructed of nickel-based super alloy or other similar material. The inner housing 726 may have insulation to minimize the extent to which thermal energy is transferred back to the low temperature fluid in the first fluid conduit 721. Because of the low pressure operation conditions of the receiver, in some embodiments, the outer housing 720 and/or inner housing 726 has a thickness in a range of 0.001 to 0.1 inch (e.g., approximately 0.05 inch).

A bellows 733 is connected between the outer housing 720 and inner housing 726 and allows for differential thermal expansion between the two housings. The bellows 733 is typically constructed of a high temperature tolerant material such as for example a nickel-based super alloy or other suitable material. The bellows 733 may be connected to the outer and inner housings 720, 726 by brazing or welding or other suitable method. It should be appreciated, that the solar receiver 719 may be configured with any suitable component to control the axial and radial centering of the two housings and to allow for differential thermal expansion between the two housings. Vertical support and slip joints may be included between the housings, for example.

The solar absorber 732 may be constructed of a porous material that defines a plurality of passages traversing through the absorber. The solar absorber 732 may for example have a honey comb or foam structure. The solar absorber 732 in certain embodiments is constructed of a silicon carbide material. In other embodiments, the solar absorber 732 may be constructed of other suitable materials, including any of the materials disclosed herein for solar absorbers. The solar absorber 732 is positioned in a recess 735 defined by the inner housing 726. The inner housing 726 is fixed to the outer housing 720 at the position of the recess 735 by bolts 734$_{1-2}$, which comprise set pins at their ends that enter into holes in the solar absorber 732 to position the solar absorber 732.

The overall shape of the solar absorber 732 may be curved. For example, the solar absorber 732 may have radius of curvature that is similar to that of the transparent object 724. The overall shape of the solar absorber 732 may alternatively be substantially planar. The solar absorber 732 may be single solid object or may be arranged as a set of segmented components. The solar absorber 732 may be arranged, for example, as a set of pie-shaped segments in a bowl configuration that fits within the solar receiver 719. The segmented design allows for differential thermal expansion of the different segments and thus accommodates uneven temperature distributions across the solar absorber. In some configurations temperature distributions across the solar absorber 732 may be controlled, at least to an extent, by including an orifice plate (e.g., a ceramic orifice plate) at the front end of the solar absorber. The orifice plate may include a series of orifices configured and arranged to facilitate a substantially even distribution of fluid passing into the solar absorber 732 across the entire absorber fluid inlet 722 face. The orifice plate may be retained in the receiver around its outer rim to control axial and radial movement. In some embodiments, orifice plates are designed to achieve uniform flow. In other embodiments, orifice plates are designed to have different numbers and/or diameters of holes with respect to a specific location in the plate. In some embodiments, the orifice plates are designed to vary flow through one or more regions of an absorber. In some embodiments, orifice plates that vary flow through one or more regions of an absorber are configured to manage heat transfer from the absorber to air flowing the absorber and thereby to manage temperatures on the exit side of the absorber. In some embodiments, orifice plates that vary flow are advantageous because solar flux may vary from one part of the absorber to another and the orifice plate can compensate for differences in absorber temperature by altering the flow over the absorber to create a more uniform heat transfer.

It should be appreciated that the solar receiver 719 may operate at pressures of up to 1.1 atm, up to 1.2 atm, up to 1.3 atm, up to 1.4 atm, up to 1.5 atm, or up to 2 atm. In particular embodiments, the receiver is configured and arranged for operating at pressures in the range of above 1 atm to 1.5 atm. In other embodiments, the receiver is configured and arranged for operating at pressures in the range of above 1 atm to 1.2 atm. Moreover, in some embodiments, the solar absorber 732 has a radius of curvature (A) in a range of 50 to 250 inches. In some embodiments, the solar absorber 732 has a radius of curvature (A) in a range of 150 to 200 inches. In some embodiments, the solar absorber 732 has a radius of curvature (A) of 170 to 190 inches. Alternatively, the solar absorber may be substantially planar. In some embodiments, the transparent object 724 has a radius of curvature (B) in a range of 50 to 250 inches. In some embodiments, the transparent object 724 has a radius of curvature (B) in a range of 150 to 200 inches. In some embodiments, the transparent object 724 has a radius of curvature (B) of 170 to 190 inches. In some embodiments, at least a portion of the inner housing 726 has an internal diameter (C) in a range of 10 to 50 inches. In some embodiments, at least a portion of the inner housing 726 has an internal diameter (C) in a range of 20 to 40 inches. In some embodiments, at least a portion of the inner housing 726 has an internal diameter (C) in a range of 30 to 35 inches. In some embodiments, at least a portion of the outer housing 720 has an internal diameter (D) in a range of 25 to 65 inches. In some embodiments, at least a portion of the outer housing 720 has an internal diameter (D) in a range of 35 to 55 inches. In some embodiments, at least a portion of the outer housing 720 has an internal diameter (D) in a range of 40 to 50 inches. In some embodiments, the thickness (E) of the transparent object is in a range of about 0.5 inch to about 3 inches. In some embodiments, the thickness (E) of the transparent object is in a range of about 1 inch to about 2.5 inches. In some embodiments, the thickness (E) of the transparent object is in a range of about 1.5 inches to about 2 inches. In some embodiments, the flange assembly defines an opening having a diameter (F) in a range of 46 inches to 86 inches. In some embodiments, the flange assembly defines an opening having a diameter (F) in a range of 56 inches to 76 inches. In some embodiments, the flange assembly defines an opening having a diameter (F) in a range of 60 inches to 70 inches. In some embodiments, the distance (G) between the inner face of the transparent object 724 and the outer face of the solar absorber 732 is in a range of 2 to 12 inches. In some embodiments, the distance (G) between the inner face of the transparent object 724 and the outer face of the solar absorber 732 is in a range of 5 to 8 inches. However, other sizes may be suitable in some configurations.

Figure 7F:
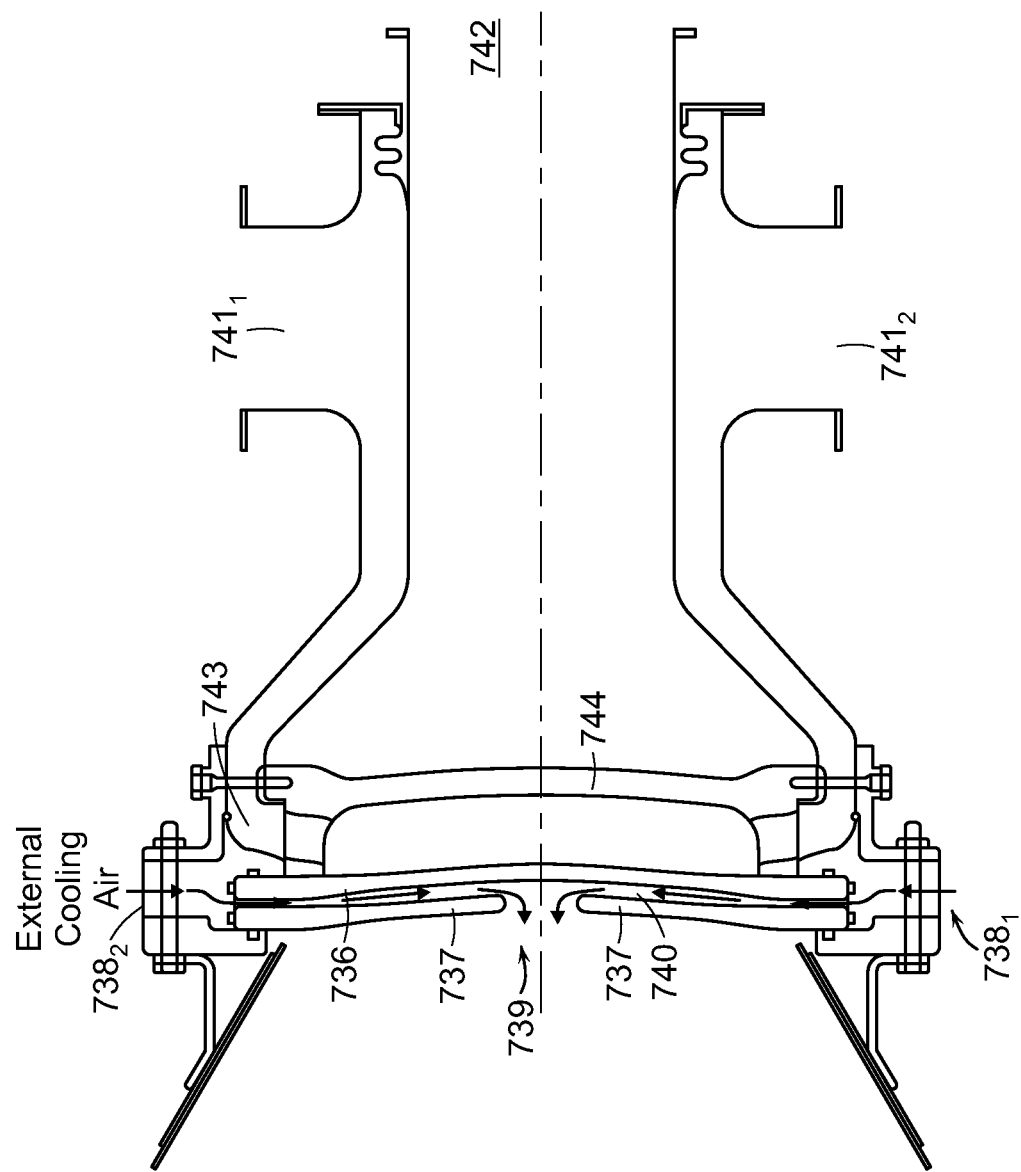
Figure 7G:
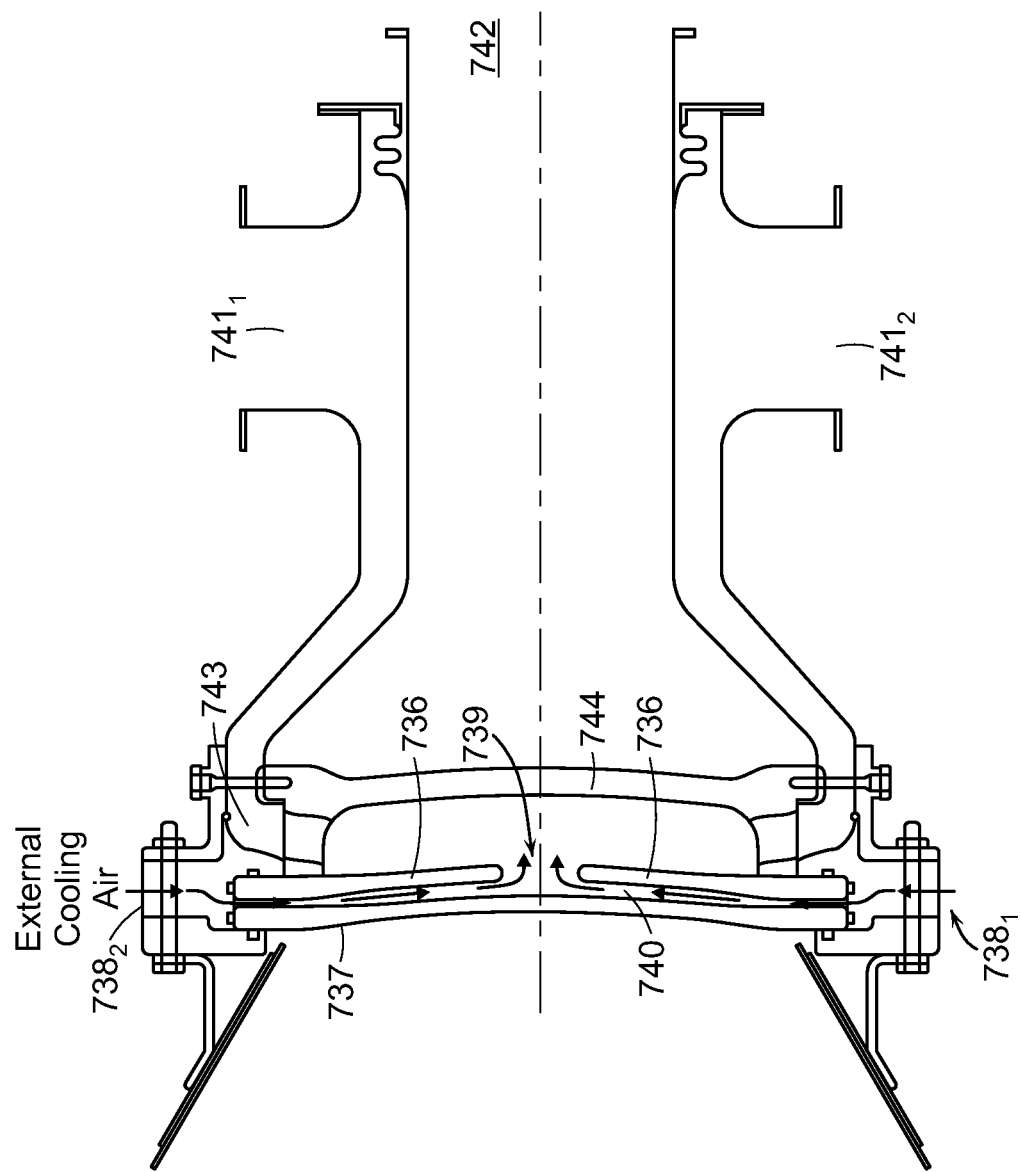

FIGS. 7F and 7G each depict an example of a low pressure solar receiver having a low pressure fluid chamber comprising a fluid inlet 741$_{1-2}$, a fluid outlet 742, and an opening for receiving concentrated solar radiation; and a solar absorber 744 housed within the low pressure fluid chamber, similar to that depicted in FIG. 7E. The low pressure solar receivers in FIGS. 7F-G each include a first transparent object 736 that defines at least a portion of a wall of the low pressure fluid chamber; and a second transparent object 737 in juxtaposition with the first transparent object 736. The first transparent object 736 and the second transparent object 737 are configured such that a first fluid flow path 740 is defined between the first transparent object 736 and the second transparent object 737. In each example, concentrated solar radiation received through the opening passes through the transparent objects into the low pressure fluid chamber and impinges upon the solar absorber, in a similar manner to that depicted in FIG. 7E.

In the configurations depicted in FIGS. 7F and 7G, external cooling air enters the first fluid flow path 740 at external air inlets 738$_{1-2}$, and exits the first fluid flow path 740 through outlet 739. External air passing through the first fluid flow path 740 between the first transparent object 736 and second transparent object 737 cools the first transparent object 736 and second transparent object 737. In some configurations, the low pressure fluid chamber defines a second fluid flow path 743 extending from the fluid inlet(s) 741$_{1-2}$ to the fluid outlet(s) 742, in which, between the fluid inlet(s) 741$_{1-2}$ and the fluid outlet(s) 742, the second fluid flow path 744 extends across at least a portion of a transparent object 736 and through one or more passages within the solar absorber 744.

In the configuration depicted in FIG. 7F, the first transparent object 736 and the second transparent object 737 are configured such that the first fluid flow path 740 is fluidically isolated from the second fluid flow path 743. Also, in the configuration depicted in FIG. 7F, the second transparent object 737 comprises one or more openings 739 that fluidically connect the first fluid flow path 740 with the environment surrounding the solar receiver. In the configuration depicted in FIG. 7G, the first transparent object 736 comprises one or more openings 739 that fluidically connects the first fluid flow path 740 and the second fluid flow path 743.

In some embodiments, a solar receiver is provided that comprises a low pressure fluid chamber comprising a fluid inlet, a fluid outlet, and an opening for receiving concentrated solar radiation; a solar absorber housed within the low pressure fluid chamber; and a plurality of transparent objects that define a segmented wall of the low pressure fluid chamber. FIGS. 7H and 7I illustrate examples of pluralities of transparent objects arranged to produce segmented walls for a receiver. The segmented wall 745 in FIG. 7H is composed of four longitudinally arranged transparent objects $S_1$-$S_4$. The segmented wall 746 in FIG. 7I is composed of eight radially arranged transparent objects $S_1$-$S_8$. These illustrations are not intended to be limiting. Other appropriate arrangements and pluralities of transparent objects may be used to produce segment walls that permit the passage of solar radiation into the low pressure fluid chamber. In some embodiments, the plurality of transparent objects are half tubes (e.g., tubes that have been cut lengthwise) and are arranged side by side at the opening of the receiver. In some embodiments, the tubes are up to 9 inches or more in diameter. In some embodiments, the convex side of a tube faces the absorber, and the concave side faces heliostats that direct concentrated solar radiation toward the opening of the receiver. In other embodiments, the concave side of a tube faces the absorber, and the convex side faces the heliostats. In some embodiments, the tubes are made of quartz silica.

Figure 8A:
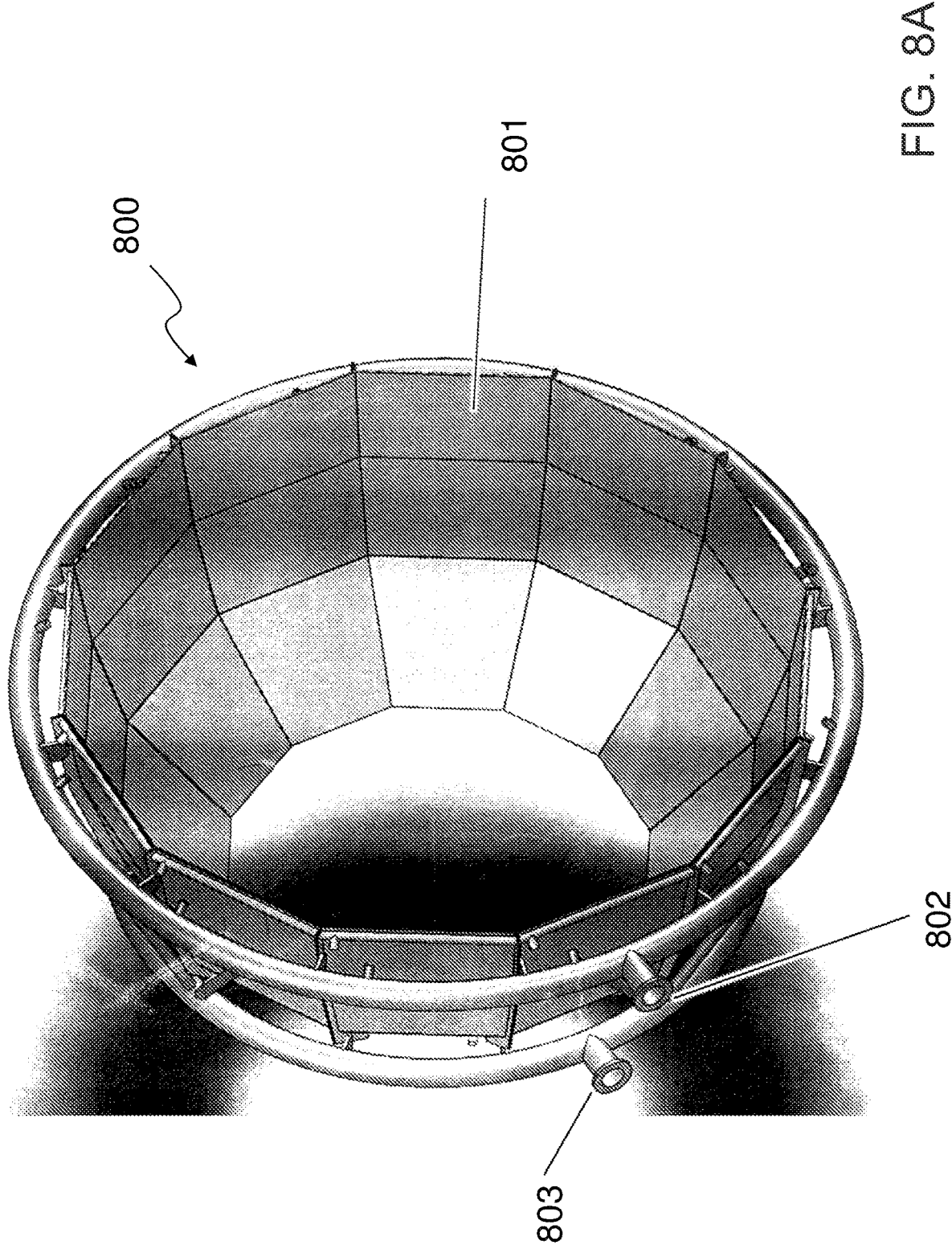
Figure 8C:
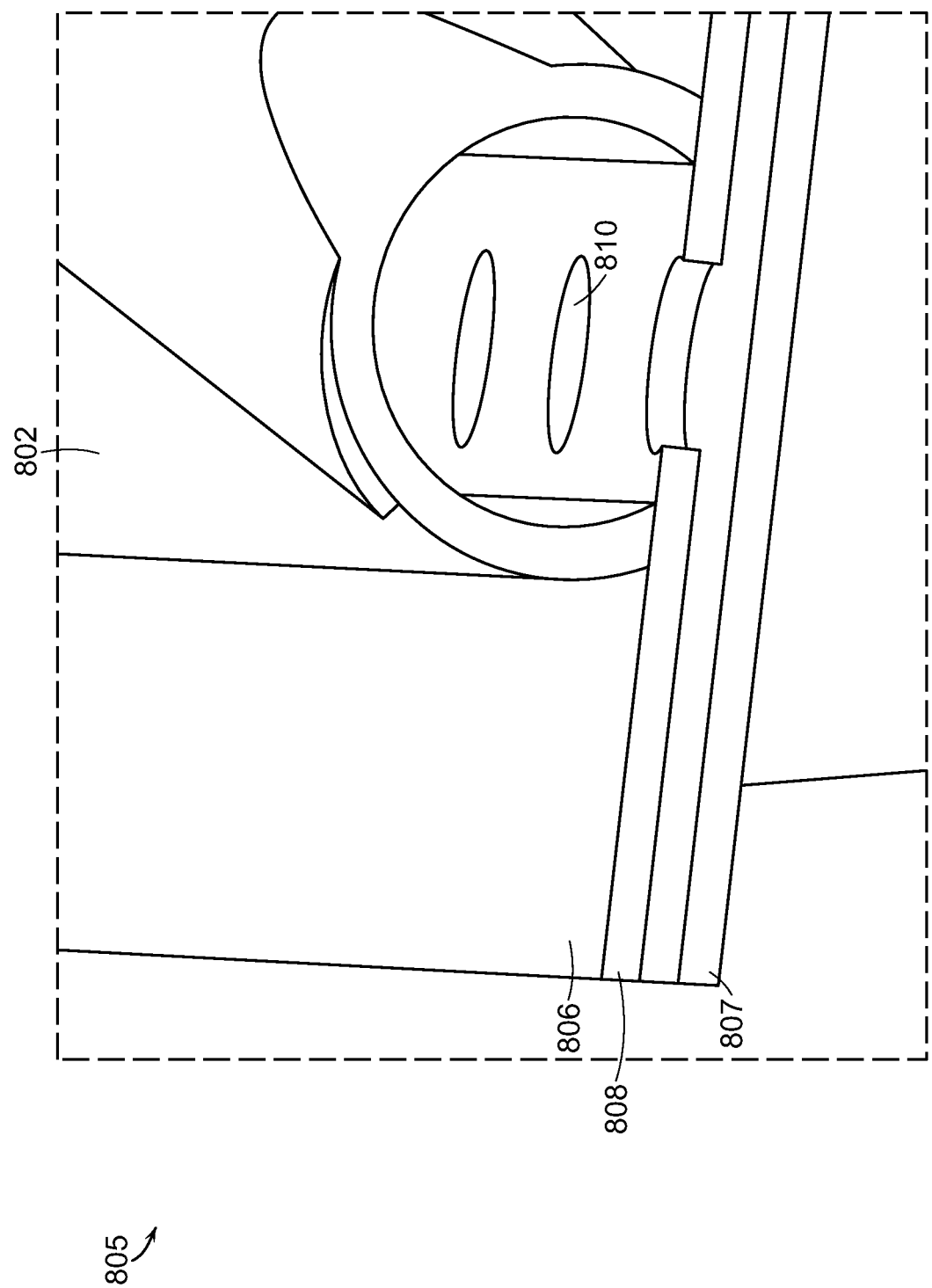

In some embodiments, the solar receiver is configured such that concentrated solar radiation received through the opening passes through the plurality of transparent objects into the low pressure fluid chamber and impinges upon the solar absorber. In some embodiments, the low pressure fluid chamber defines a fluid flow path from the fluid inlet to the fluid outlet, in which, between the fluid inlet and the fluid outlet, the fluid flow path extends across at least a portion of the plurality transparent objects and through one or more passages within the solar absorber. In some embodiments, the plurality of transparent objects are configured such that when the pressure within the low pressure fluid chamber is lower than the environmental pressure surrounding the solar receiver, a fluid (e.g., ambient air) surrounding the solar receiver is drawn into the low pressure fluid chamber through gaps between transparent objects of the plurality. In some embodiments, the low pressure fluid chamber is configured such that the fluid (e.g., ambient air) that is drawn into the low pressure fluid chamber through gaps between transparent objects of the plurality enters the fluid flow path within the low pressure fluid chamber and passes through the solar absorber. In some embodiments, as the fluid (e.g., ambient air) is drawn into the low pressure fluid chamber through gaps between transparent objects of the plurality it cools the transparent objects. FIGS. 8A-8C illustrate a secondary concentrator 800 having an integrated fluid cooling system. The secondary concentrator 800 depicted in FIG. 8A includes a plurality of connected reflective panels 801. Each of the plurality of reflective panels 801 has a planar shape having a polygonal cross-section. Each reflective panel has an inner reflective surface that is positioned to face the inner side of the secondary concentrator 800 and an outer surface. The reflective panels 801 are arranged such that the secondary concentrator 800 deflects concentrated solar radiation to the opening of the receiver to which the secondary concentrator 800 is connected. In some embodiments, the reflective panel, e.g., as depicted in FIG. 8A, has a thickness in a range of 0.1 inch to 1 inch or 0.1 inch to 0.5 inch.

In the secondary concentrator 800 depicted in FIG. 8A, the reflective panels are arranged to form three conical rings. The arrangement of conical rings is such that the conical ring having the smallest diameter is positioned to the rear of the secondary concentrator 800 and the conical ring having the largest diameter is positioned to the front of the secondary concentrator 800. In FIG. 8A the secondary concentrator 800 includes two relatively large diameter cooling pipes 802, 803 that function in part to deliver cooling fluid to and from a cooling passage within each reflective panel and also to provide a support for arranging and immobilizing the reflective panels 801 into the predetermined shape that facilitates concentration of incoming solar radiation and reflection of the incoming concentrated solar radiation to the opening of a low pressure receiver.

FIG. 8B depicts an alternative view of the secondary concentrator 800 showing the supply conduit 802, an outlet pipe 803, a smaller diameter pipe 804 in fluid communication with the supply conduit 802 and a cooling passage 806 of a reflective panel. The inset at 805 depicts an inlet to a cooling passage 806 of a reflective panel.

FIG. 8C provides an expanded view of the inset 805 in FIG. 8B. As shown, the supply conduit 802 is in fluid communication with cooling passage 806 of the reflective panel 801. A series of open slots 810 define passages through which cooling fluid flows from the supply conduit 802 to the cooling passage 806 within the reflective panel 801. The casing 808 of the reflective panel 806 and the inner reflective surface 807 are also shown. In some embodiments, the casing 808 is a metal sheet having a thickness in a range of 0.01 inch to 0.5 inch or 0.1 inch to 0.5 inch.

Any appropriate cooling fluid may be used to cool a reflective panel having a cooling system such as is depicted in FIGS. 8A-8C. In some embodiments, the cooling fluid is a mixture of water and a refrigerant, e.g., ethylene glycol. In some embodiments, the cooling fluid is a 50:50 mixture of water and a refrigerant, e.g., ethylene glycol.

Reflective panels of a secondary concentrator may comprise any of a variety of materials. Typically metals, polymers, glass, or combinations thereof are used. Reflective panels may comprise a metal, such as aluminum, silver, or a combination thereof. Reflective panels may comprise a non-reflective material having a reflective coating, e.g., a reflective silver or reflective aluminum coating. Reflective panels may comprise a glass substrate, a reflective layer for reflecting solar energy, and optionally an interference layer (e.g., a layer between the glass and reflective layer comprised of, for example, titanium dioxide). Typically, the reflective panel has at least one surface for reflecting solar radiation.

Figure 9C:
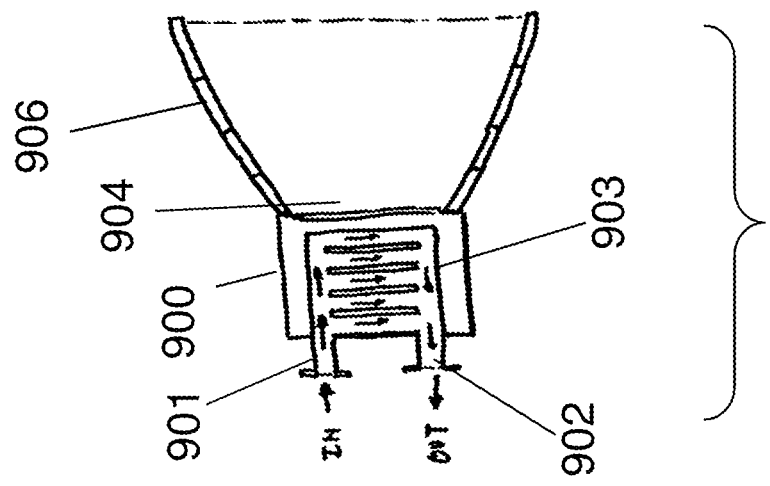
FIGS. 9A-9C include exemplary schematic illustrations of high-pressure solar receivers.
Figure 9B:
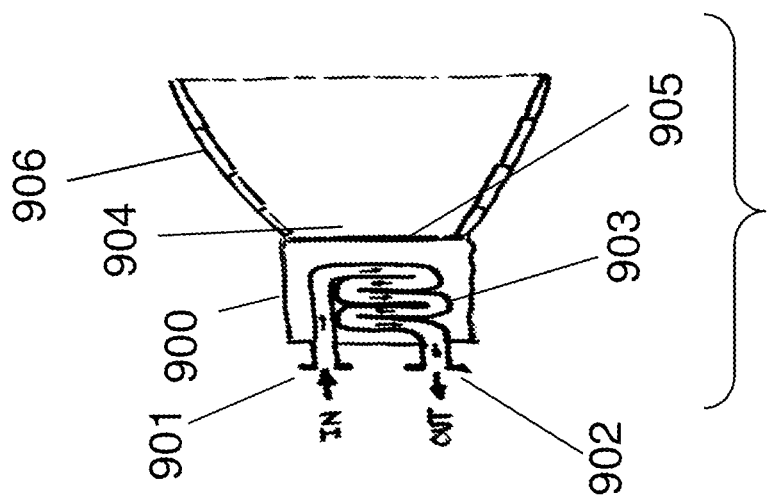
Figure 9A:
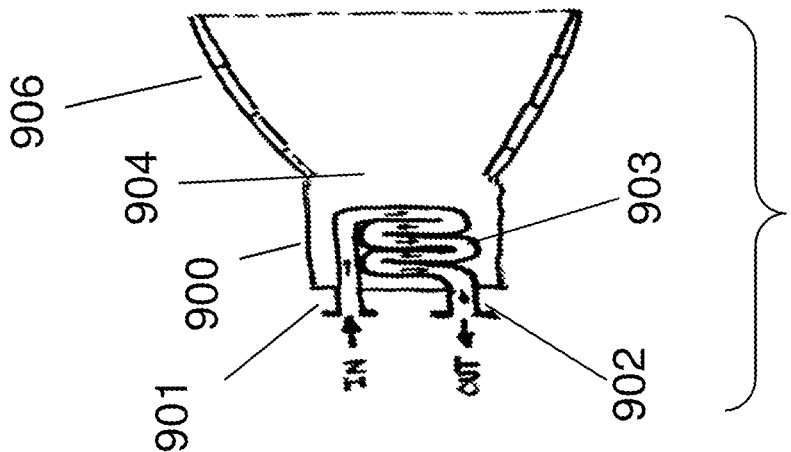

FIGS. 9A-9C depict exemplary high pressure receivers that may be used in conjunction with the power generation systems disclosed herein. In these embodiments, the high pressure receivers include an insulated casing 900 having, a working fluid inlet 901, a working fluid outlet 902, and an opening 904 connected to the rear portion of a secondary concentrator 906. In some embodiments, such as is depicted in FIGS. 9B-9C, the high pressure receiver includes a transparent object 905, e.g., a window, adjacent to the opening 904 for receiving solar radiation. As in the low pressure receiver context, the secondary concentrator 906 serves to collect concentrated solar radiation from a primary concentrator, e.g., a heliostat field, or other source, and direct that solar radiation into the opening 904 of the solar receiver.

The high pressure fluid (e.g., fluid at a pressure of above 2 atmospheres to 50 atmospheres) passing through the receiver is retained within the high pressure solar absorber 903. The high pressure absorber 903, as exemplified in FIGS. 9A-9C, typically comprises a network of passages (e.g., a tubular network) for containing a high pressure fluid and directing flow of the high-pressure fluid into and out of the high-pressure solar absorber 903.

The high-pressure working fluid enters into the high pressure solar absorber 903, passes through the network of passages and acquires thermal energy therein, in part, through contact with the passage walls. The high pressure solar absorber 903 often has a black surface coating to promote absorption of incident solar radiation. The surface coating may be applied using methods well known in the art including, for example, by chemical vapor deposition (e.g., a pack cementation process, a gas phase coating process, etc.). Moreover, the high pressure absorber is typically constructed from a material that can withstand extremely high temperatures, including, for example, temperatures in excess of 1000° C.

The high pressure solar absorber 903 can be designed and constructed in any of a variety of forms. As exemplified in FIGS. 9A and 9B, the tubular network may be a network of tubular coils. As exemplified in FIG. 9C, the tubular network may have a shell and tube-type form. Still other configurations, such as, for example, a plate type heat exchanger, are envisioned. In some embodiments, the high pressure solar absorber comprises a tubular network, wherein tubes of the network have a diameter in a range of 0.5 inch to 5 inches in diameter and, in some embodiments, a wall-thickness in a range of 0.1 inch to 1 inch. In some embodiments, the high pressure solar absorber comprises a tubular network, wherein tubes of the network have a diameter in a range of 1 inch to 3 inches in diameter and, in some embodiments, a wall-thickness in a range of 0.1 inch to 0.5 inch.

In some embodiments, the high-pressure solar absorber is constructed from a single crystal super alloy. Often the super alloy contains a nickel base, chromium at a level sufficient for oxidation resistance (e.g., at a level of about 10%), aluminum and/or titanium (e.g., at levels of about 2.5% to 5%) for the formation of the strengthening gamma prime phase and refractory metals such as tungsten, molybdenum, tantalum and columbium (e.g., at a level of about 2.5% to 5%) as solid solution strengtheners. Typically, nickel base super alloys also contain cobalt (e.g., at a level of about 10%) and carbon (e.g., at a level of about 0.1%) which acts as a grain boundary strengthener and forms carbides which strengthen the alloy. Boron and zirconium are also often added in small amounts as grain boundary strengtheners.

Exemplary single crystal super alloys that may be used in the construction of high-pressure solar absorber are disclosed in the following United State Patents, the contents of which, relating to single crystal super alloys, are incorporated herein by reference in their entireties: U.S. Pat. Nos. 4,371,404, 4,222,794; 4,514,360; 4,643,782; 4,765,850; 4,923,525; 5,047,091; 5,077,004; 5,100,484; 5,154,884; 5,366,695; 5,399,313; 5,540,790; and 6,074,602.

Components (e.g., tubes, plate walls, etc.) of the high-pressure solar absorber may be manufactured by any appropriate techniques, e.g., extruded or cast. Furthermore, components of the high-pressure solar absorber may be bonded together using any one of a variety of methods known in the art, including, for example, laser welding, electron beam welding, activated diffusion bonding, etc.

The transparent object 905 provides a barrier for reducing re-radiation losses, whereby the transparent object 905 allows transmission of concentrated solar radiation in the non-infrared range (e.g., in the visible range) into the solar receiver but does not allow transmission of radiation in the infrared range. Thus, thermal re-radiation, which emits in primarily the infrared range from the heated high pressure solar absorber, is reflected back into in the receiver by the transparent object 905.

The casing 900 of the receiver is designed and constructed to insulate and provide structural support for the high pressure absorber 903 and to mount the secondary concentrator 906. In the exemplary high-pressure receivers depicted in FIGS. 9A-9C, the casing 900 operates essentially at ambient pressures. As a result, the transparent object, in these embodiments, is not subjected to substantial hydrostatic pressure induced stress. Thus, the transparent object can be designed and constructed to relatively large sizes (e.g., sizes in excess of 5 meters, e.g., 5 meters to 10 meters) without concern for hydrostatic pressure induced stress. In some embodiments, the transparent object is constructed as a combination of multiple transparent objects (e.g., a combination of overlapping transparent objects) to obtain a transparent window that functions to prevent re-radiation losses. In certain embodiments, the multiple transparent objects are flat. In certain embodiments, the multiple transparent objects are curved. In certain embodiments, the multiple transparent objects stand substantially vertically. In certain embodiments, the multiple transparent objects are arranged substantially horizontally. In certain embodiments, the multiple transparent objects are in the shape of cylinders that have been sliced in the longitudinal direction into segments. In certain embodiments, the multiple transparent segments represent one-half of the cylinder. In certain embodiments, the multiple transparent segments represent one-third of the cylinder, or tube. In certain embodiments, the multiple transparent segments represent one-quarter of the cylinder. In certain embodiments, the multiple transparent segments represent one-sixth of the cylinder. In certain embodiments, the multiple transparent segments are arranged with the concave face of the curved shape directed toward the opening. In certain embodiments, the multiple transparent segments are arranged with the convex face of the curved shape directed toward the opening. In certain embodiments, the multiple transparent segments are arranged with substantially no gaps, or no gaps, between them. In certain embodiments, the multiple transparent segments are arranged with gaps between them.

Unless otherwise indicated, all pressures described herein refer to absolute pressures.

The following patents and patent applications are incorporated herein by reference in their entirety for all purposes: U.S. Patent Publication No. 2002/0124991, published on Sep. 12, 2002, filed Feb. 1, 2002, entitled "Low Cost High Efficiency Automotive Turbines"; U.S. Pat. No. 6,681,557, issued on Jan. 27, 2004, filed Feb. 1, 2002, entitled "Low Cost High Efficiency Automotive Turbines"; U.S. Pat. No. 5,259,444, issued on Nov. 9, 1993, filed Nov. 5, 1990, entitled "Heat Exchanger Containing a Component Capable of Discontinuous Movement"; U.S. Pat. No. RE37134, issued on Apr. 17, 2001, filed Mar. 25, 1995, entitled "Heat Exchanger Containing a Component Capable of Discontinuous Movement"; U.S. Publication No. 2007/0089283, published on Apr. 26, 2007, filed Oct. 17, 2006, entitled "Intermittent Sealing Device and Method"; U.S. Publication No. 2008/0251234, published on Oct. 16, 2008, filed Apr. 16, 2007, entitled "Regenerator Wheel Apparatus"; U.S. Publication No. 2009/0000761, published on Jan. 1, 2009, filed Jun. 29, 2007, entitled "Regenerative Heat Exchanger with Energy-Storing Drive System"; U.S. Publication No. 2009/0000762, published on Jan. 1, 2009, filed Jun. 29, 2007, entitled "Brush-Seal and Matrix for Regenerative Heat Exchanger and Method of Adjusting Same"; U.S. Publication No. 2006/0054301, published on Mar. 16, 2006, filed Dec. 16, 2004, entitled "Variable Area Mass or Area and Mass Species Transfer Device and Method"; and International Patent Application Serial No. PCT/US2011/052051, filed Sep. 16, 2011, and entitled, "Concentrated Solar Power Generation Using Solar Receivers." The following three U.S. provisional patent applications, filed on even date herewith, are also incorporated herein by reference in their entirety for all purposes: a U.S. Provisional Patent Application, filed on Mar. 21, 2012, under 61/613,847, entitled Fluid Flow Control Devices for Solar Power Systems"; a U.S. Provisional Patent Application, filed on Mar. 21, 2012, under 61/613,950, entitled "Low Pressure Solar Receivers with Double-Walled Windows and Uses Thereof"; and a U.S. Provisional Patent Application, filed on Mar. 21, 2012, under 61/613,954, entitled "Low Pressure Solar Receivers with Segmented Windows and Uses Thereof."

The following examples are intended to illustrate certain embodiments of the present invention, but do not exemplify the full scope of the invention.

Example 1

Figure 10A:
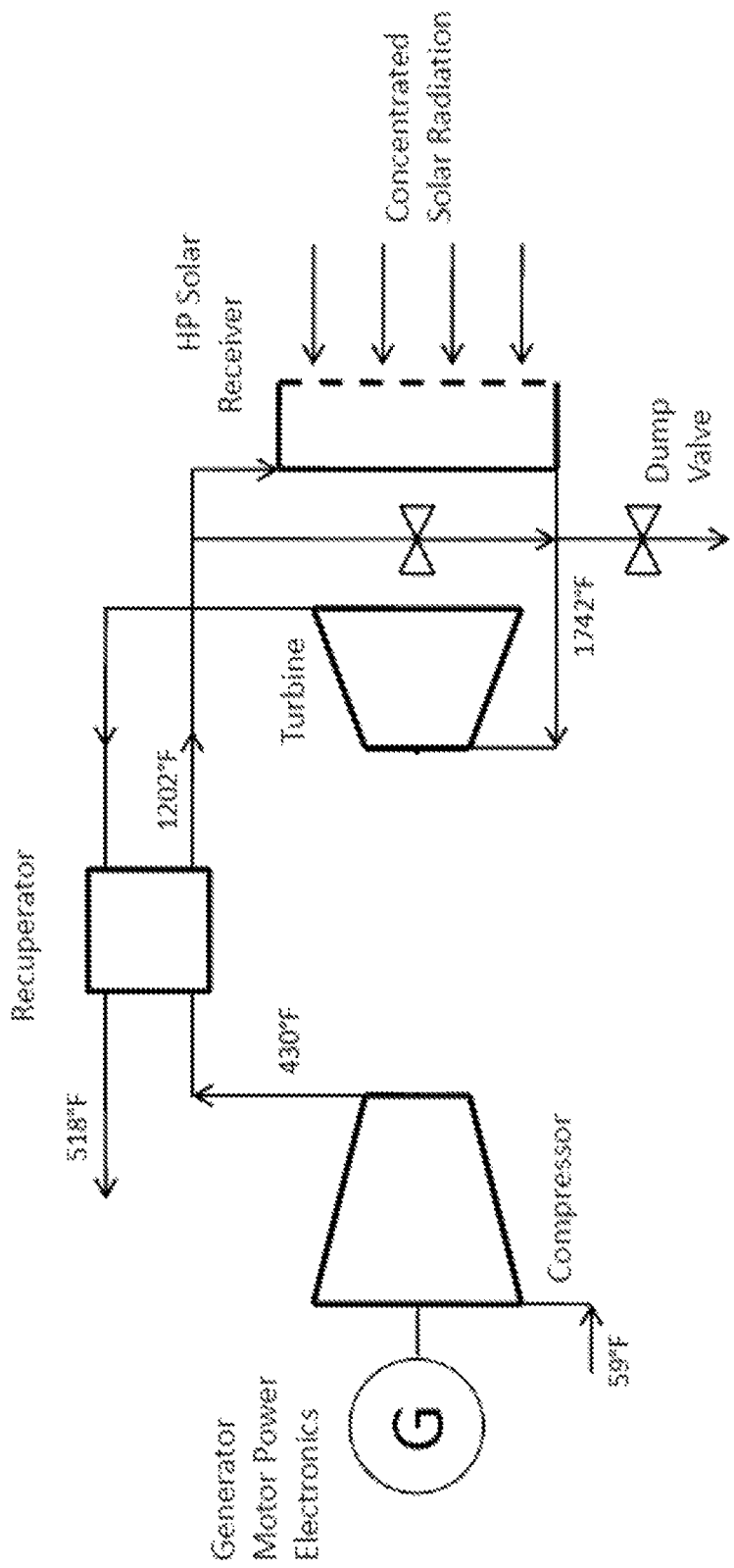
FIGS. 10A-10F include exemplary schematic illustrations of concentrated solar power generation systems.

This example describes a concentrated solar power generation system in which a pressurized solar receiver is used. FIG. 10A includes a schematic diagram of such a system. In this example, compressed air from the compressor is fed to the solar receiver and heated while pressurized. The heated effluent from the solar receiver is then expanded through the gas turbine to produce power. The exhaust from the gas turbine is used to pre-heat the pressurized gas from the compressor before it is transported to the solar receiver.

Example 2

Figure 10B:
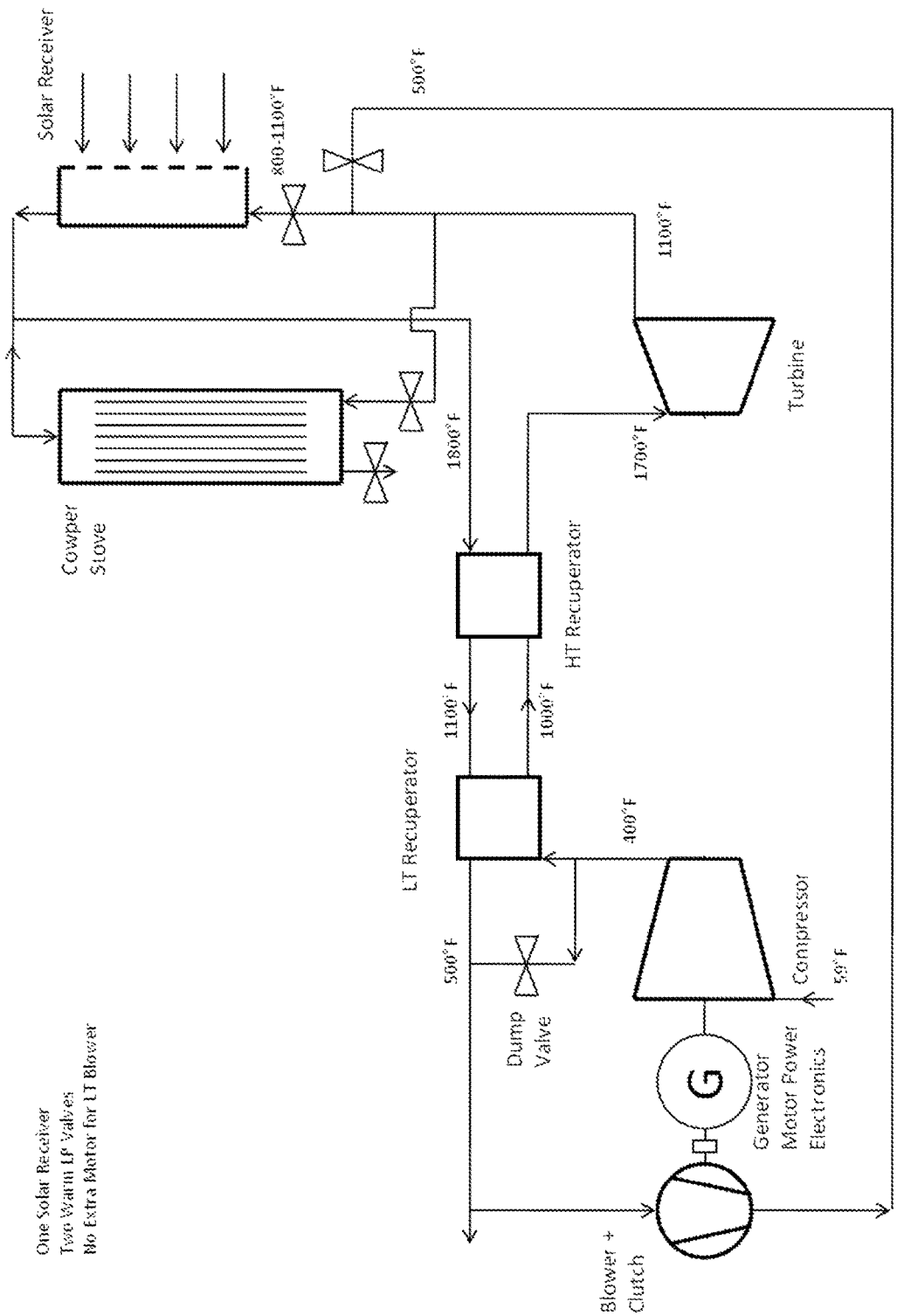

This example describes a concentrated solar power generation system in which a thermal storage system is incorporated. FIG. 10B includes a schematic diagram of the exemplary system. Air is used as the fluid in this system. The temperatures of process streams are indicated in the figure. In this example, ambient air at 59° F. is supplied to the compressor, where it is compressed and heated to a temperature of 1700° F. in a heat exchange system comprising one, two or more recuperator heat exchangers. The 1700° F. air is passed through a turbine to generate power, which produces an exhaust stream at 1100° F. The turbine exhaust and a portion of the heat exchange system exhaust are transported to the solar receiver, where they are heated to 1800° F. A portion of the solar receiver-heated air can be transported to the thermal storage system (similar to a cowper stove) for storage. The balance of the solar receiver-heated air is passed to the two-stage heat exchanger, where it is used to heat the compressed air upstream. It should be noted that other components, such as a startup combustor and/or a thermal recovery unit, could also be included in this example.

Example 3

Figure 10C:
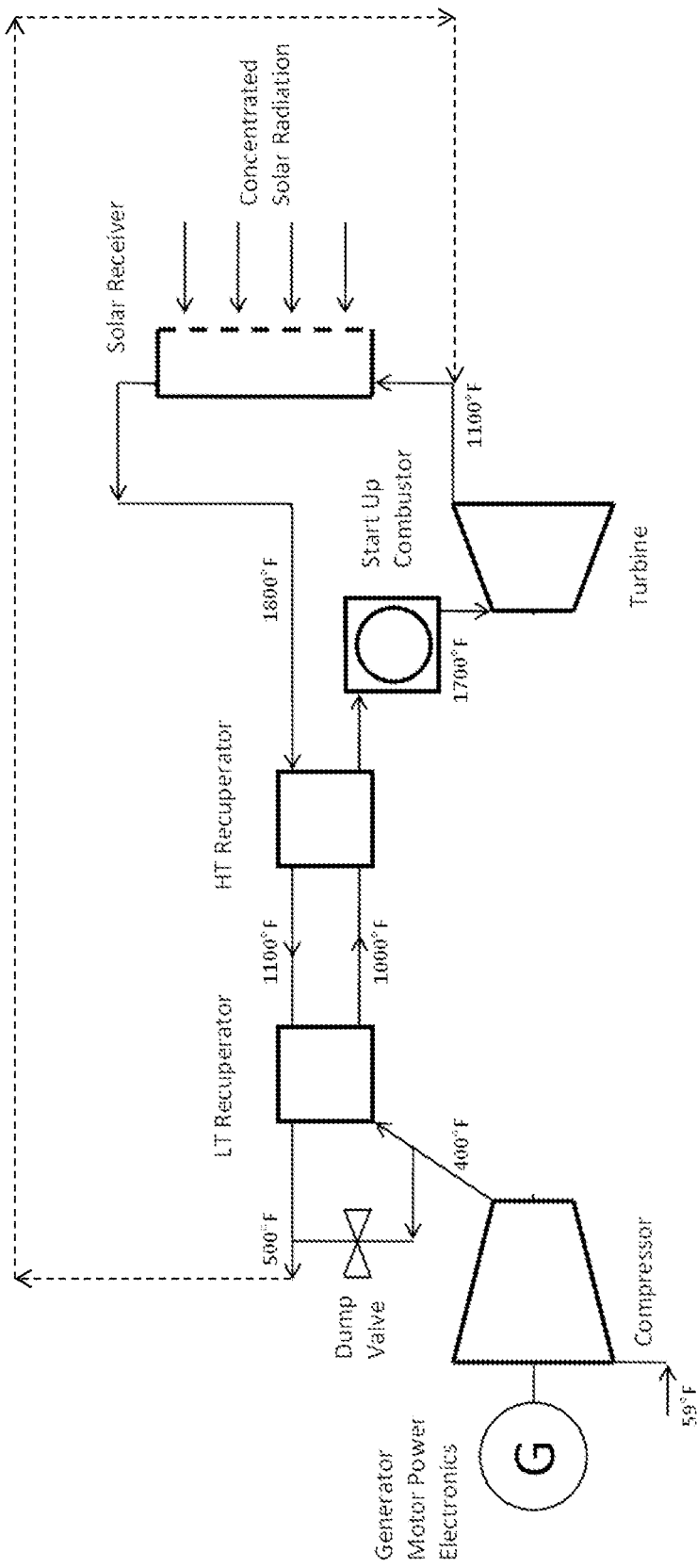

This example describes a concentrated solar power generation system in which thermal storage is not included. FIG. 10C includes a schematic diagram of the exemplary system. Air is used as the fluid in this system, and the temperatures of process streams are indicated in the figure. Similar to the system described in Example 1, ambient air at 59° F. is supplied to the compressor, where it is compressed and heated to a temperature of 1700° F. in a heat exchange system comprising one, two or more recuperator heat exchangers. The 1700° F. air is passed through a turbine to generate power, which produces an exhaust stream at 1100° F. The turbine exhaust (and optionally, a portion of the heat exchange system exhaust) is transported to the solar receiver, where they are heated to 1800° F. The solar receiver-heated air is then passed to the two-stage heat exchanger, where it is used to heat upstream compressed air.

Example 4

Figure 10D:
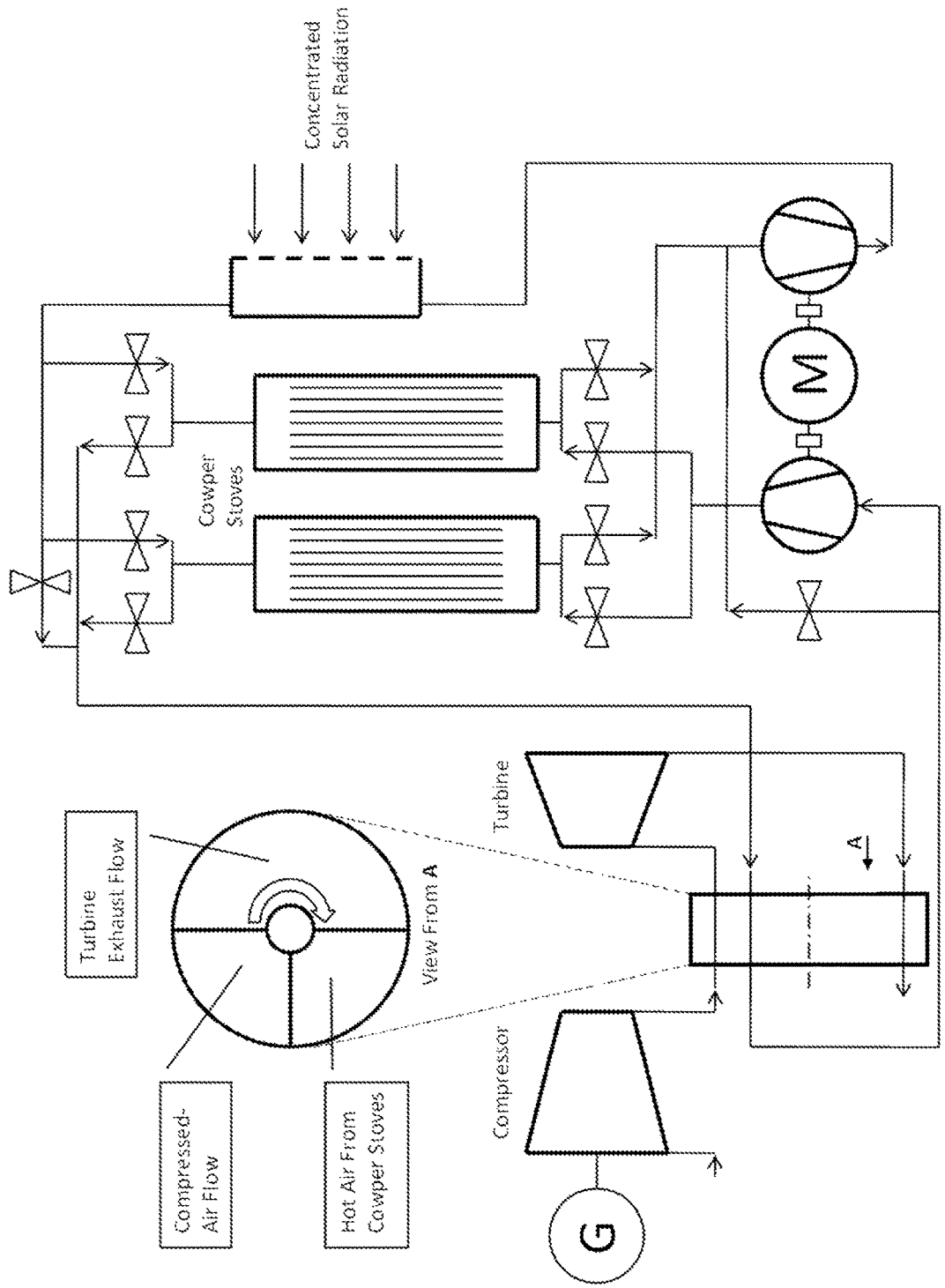

This example describes a concentrated solar power generation system in which one, two or more thermal storage units and one, two or more rotary heat exchangers are used within the system. FIG. 10D includes a schematic diagram of the exemplary system. In this example, rather than using a two-stage heat exchanger to heat the compressed air from the compressor, a single rotary heat exchanger is used. A cross-sectional view of the rotary heat exchanger is shown in the upper-left corner of the figure.

FIG. 10D also includes two thermal storage units. The units can be configured such that none, one, or both of the units is able to accept heated air from the solar receiver and/or provide heated air to the rotary regenerator for heating the compressed air stream to the turbine.

Example 5

Figure 10E:
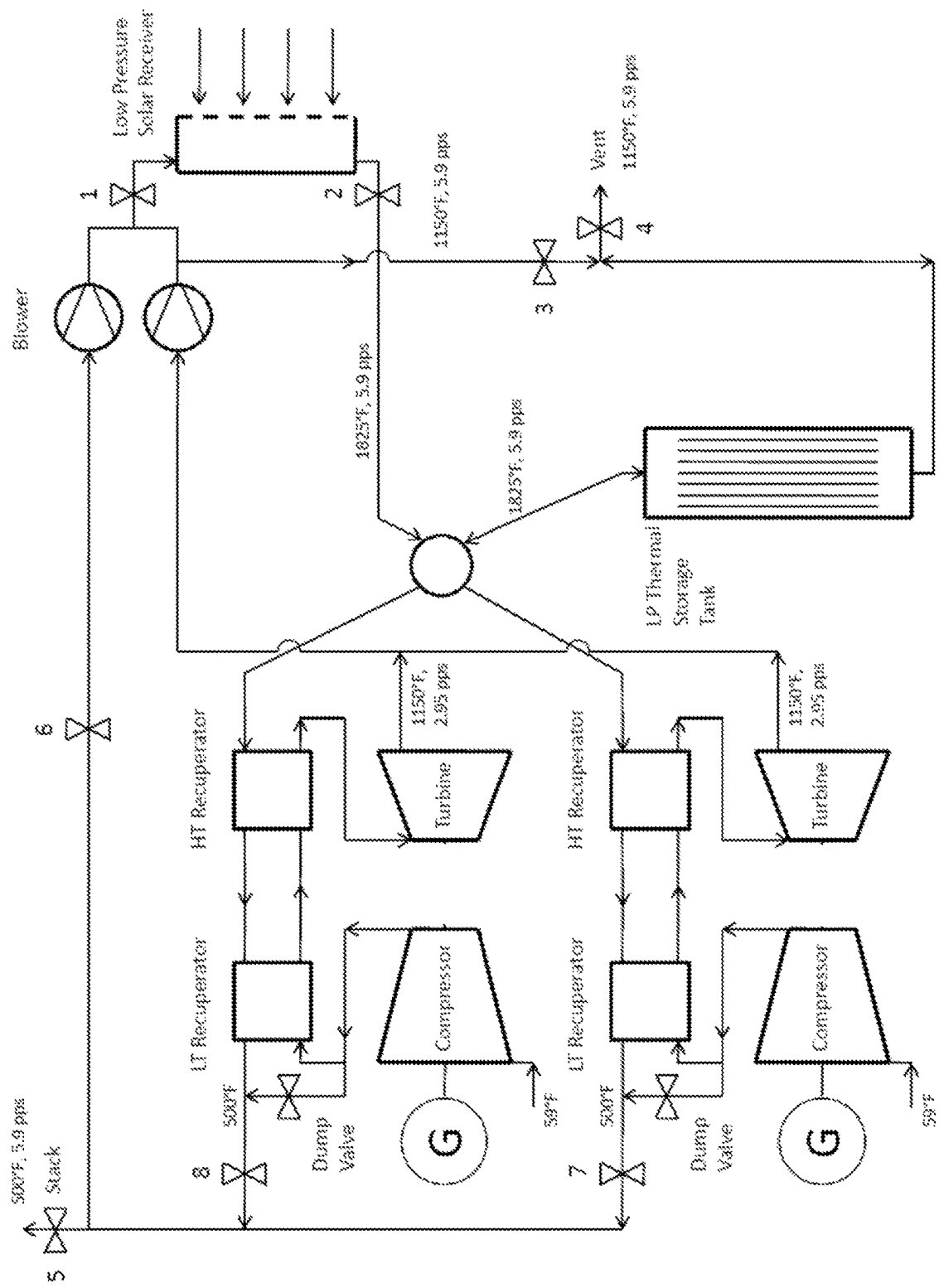

This example describes a concentrated solar power generation system in which two or more compressors and two or more turbines are used to produce energy. FIG. 10E includes a schematic diagram of the exemplary system. As in the previous examples, stream temperatures are provided in the figure.

Example 6

Figure 10F:
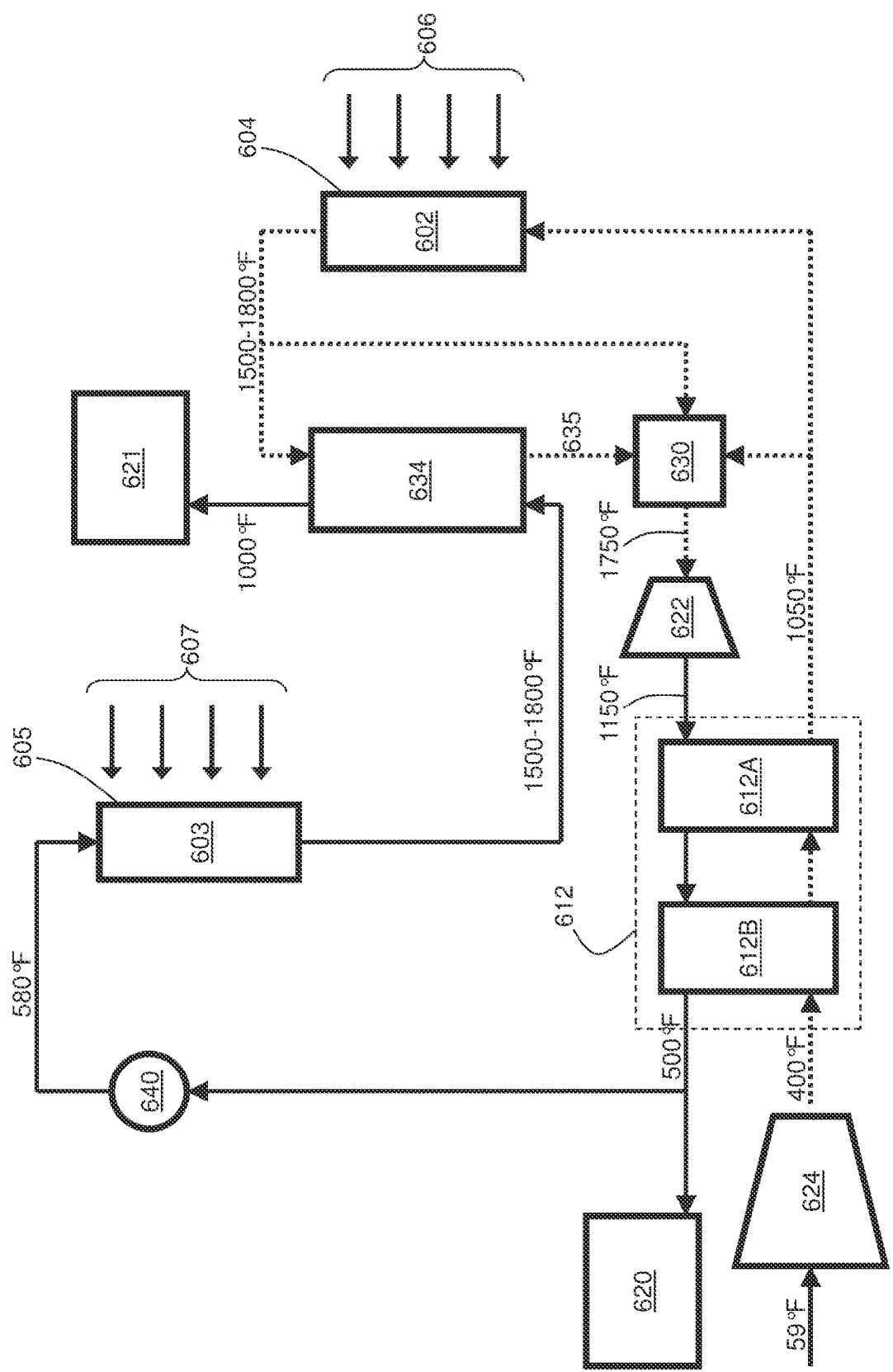

This example describes a concentrated solar power generation system in which a high-pressure solar receiver and a low-pressure solar receiver are used in a single system. FIG. 10F includes a schematic diagram of the exemplary system. As in the previous examples, stream temperatures are provided in the figure. The layout of the components in this example is similar to the layout described in association with FIG. 10E.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A solar receiver comprising:
  a fluid chamber configured for operating at a pressure between 0.9 atmospheres and 1.25 atmospheres absolute pressure, comprising a fluid inlet, a fluid outlet, and an opening for receiving concentrated solar radiation;
  a solar absorber housed within the fluid chamber; and
  a plurality of transparent objects that define a segmented wall of the fluid chamber, wherein the plurality of transparent objects are in the form of separate panels arranged adjacent to each other to collectively form the segmented wall, wherein the segmented wall defines at least a portion of an outermost wall of the fluid chamber, wherein the outermost wall is in contact with an environment surrounding the solar receiver, and wherein the segmented wall is configured with gaps between the transparent objects that allow for a fluid surrounding the solar receiver to pass at ambient pressure through the segmented wall and into the fluid chamber when a pressure within the fluid chamber is lower that an environmental pressure surrounding the solar receiver during operation;

wherein concentrated solar radiation received through the opening passes through the segmented wall and between transparent objects to pass into the fluid chamber and impinges upon the solar absorber.

2. The solar receiver of claim 1, wherein the fluid chamber defines a fluid flow path from the fluid inlet to the fluid outlet, wherein, between the fluid inlet and the fluid outlet, the fluid flow path extends across at least a portion of the transparent object and through one or more passages within the solar absorber.

3. The solar receiver of claim 1, wherein the plurality of transparent objects are configured such that when the pressure within the fluid chamber is lower than the environmental pressure surrounding the solar receiver, a fluid surrounding the solar receiver is drawn into the fluid chamber through the gaps between the transparent objects of the plurality.

4. The solar receiver of claim 3, wherein the fluid chamber is configured such that the fluid that is drawn into the fluid chamber through the gaps between the transparent objects of the plurality enters the fluid flow path.

5. The solar receiver of claim 1, wherein the fluid chamber is configured for operating at pressures below atmospheric.

6. A solar receiver comprising:

a fluid chamber configured for operating at a pressure between 0.9 atmospheres and 1.25 atmospheres absolute pressure, comprising a first fluid inlet for a working fluid, a fluid outlet for the working fluid, and an opening for receiving concentrated solar radiation;

a solar absorber housed within the fluid chamber;

a first transparent object that defines at least a portion of an outermost wall of the fluid chamber, wherein the outermost wall is in contact with an environment surrounding the solar receiver; and a second transparent object positioned in juxtaposition with the first transparent object, wherein the first transparent object and the second transparent object are configured such that a supplemental fluid flow path is defined between the first transparent object and the second transparent object, wherein the supplemental fluid flow path provides fluid communication between the fluid chamber and the environment surrounding the solar receiver via a second inlet, wherein concentrated solar radiation received through the opening passes through the first transparent object and second transparent object into the fluid chamber and impinges upon the solar absorber.

7. The solar receiver of claim 6, wherein the fluid chamber defines a working fluid flow path from the first fluid inlet to the fluid outlet, wherein, between the first fluid inlet and the fluid outlet, the working fluid flow path extends across at least a portion of the first and/or second transparent objects and through one or more passages within the solar absorber.

8. The solar receiver of claim 7, wherein at least one of the first transparent object and the second transparent object comprises one or more openings that fluidically connect the supplemental fluid flow path and the working fluid flow path.

9. The solar receiver of claim 6, wherein the fluid chamber is configured for operating at pressures below atmospheric.

10. The solar receiver of claim 1, wherein the plurality of transparent objects comprises longitudinally arranged panels.

* * * * *